US012588691B2

(12) United States Patent
Marchal et al.

(10) Patent No.: US 12,588,691 B2
(45) Date of Patent: Mar. 31, 2026

(54) DIET FORMULATIONS

(71) Applicant: INTERNATIONAL N&H DENMARK APS, Kongens Lyngby (DK)

(72) Inventors: Leon Marchal, Oegstgeest (NL); Yueming Dersjant Li, Oegstgeest (NL); Abiodun Bello, Wilmington, DE (US)

(73) Assignee: International N&H Denmark APS, Kongens Lyngby (DK)

( * ) Notice: Subject to any disclaimer, the term of this patent is extended or adjusted under 35 U.S.C. 154(b) by 506 days.

(21) Appl. No.: 17/784,597

(22) PCT Filed: Dec. 18, 2020

(86) PCT No.: PCT/US2020/065892
§ 371 (c)(1),
(2) Date: Jun. 10, 2022

(87) PCT Pub. No.: WO2021/127360
PCT Pub. Date: Jun. 24, 2021

(65) Prior Publication Data
US 2023/0038728 A1     Feb. 9, 2023

Related U.S. Application Data

(60) Provisional application No. 63/075,972, filed on Sep. 9, 2020, provisional application No. 62/950,747, filed on Dec. 19, 2019.

(51) Int. Cl.
A23K 50/75     (2016.01)
A23K 10/18     (2016.01)
(Continued)

(52) U.S. Cl.
CPC .............. *A23K 50/75* (2016.05); *A23K 10/18* (2016.05); *A23K 10/30* (2016.05); *A23K 10/37* (2016.05);
(Continued)

(58) Field of Classification Search
CPC .... A23K 50/75; A23K 20/142; A23K 20/147; A23K 20/189; A23K 40/10; A23K 40/30;
(Continued)

(56) References Cited

U.S. PATENT DOCUMENTS

| | | | |
|---|---|---|---|
| 5,246,853 A | 9/1993 | Clarkson et al. | |
| 5,281,526 A | 1/1994 | Good et al. | |

(Continued)

FOREIGN PATENT DOCUMENTS

| | | | |
|---|---|---|---|
| CN | 108208346 A | 6/2018 | |
| EP | 0137280 B1 | 3/1992 | |

(Continued)

OTHER PUBLICATIONS

Marchal L. et al: A novel consensus bacterial 6-phytase variant completely replaced inorganic phosphate in broiler diets, maintaining growth performance and bone quality: data from two independent trials, Poultry Science, vol. 100, No. 3, Dec. 24, 2020.
(Continued)

*Primary Examiner* — Brent T O'Hern

(57) ABSTRACT

Provided herein are poultry diets containing phytase polypeptides or fragments thereof wherein the diet contains no or substantially no inorganic phosphate.

15 Claims, 1 Drawing Sheet

Figure 1A:
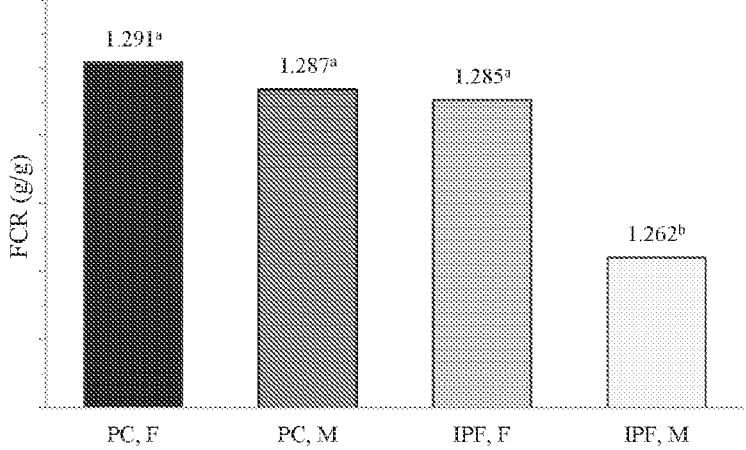

Specification includes a Sequence Listing.

(51) Int. Cl.

| | | |
|---|---|---|
| *A23K 10/30* | (2016.01) | |
| *A23K 10/37* | (2016.01) | |
| *A23K 20/111* | (2016.01) | |
| *A23K 20/142* | (2016.01) | |
| *A23K 20/147* | (2016.01) | |
| *A23K 20/189* | (2016.01) | |
| *A23K 40/10* | (2016.01) | |
| *A23K 40/30* | (2016.01) | |

(52) U.S. Cl.

CPC .......... *A23K 20/111* (2016.05); *A23K 20/142* (2016.05); *A23K 20/147* (2016.05); *A23K 20/189* (2016.05); *A23K 40/10* (2016.05); *A23K 40/30* (2016.05)

(58) Field of Classification Search

CPC ........ A23K 10/18; A23K 10/30; A23K 10/37; A23K 20/111

USPC ............................................................ 426/2

See application file for complete search history.

(56) References Cited

U.S. PATENT DOCUMENTS

| | | | |
|---|---|---|---|
| 5,475,101 A | 12/1995 | Ward et al. | |
| 6,022,725 A | 2/2000 | Fowler et al. | |
| 6,268,328 B1 | 7/2001 | Mitchinson et al. | |
| 6,287,841 B1 | 9/2001 | Mulleners et al. | |
| 7,754,469 B2 | 7/2010 | Baltzley et al. | |
| 8,507,240 B2 | 8/2013 | Lassen et al. | |
| 2009/0280090 A1 | 11/2009 | Rehberger et al. | |

FOREIGN PATENT DOCUMENTS

| | | | | | |
|---|---|---|---|---|---|
| EP | 0238023 | B1 | 12/1993 | | |
| WO | 198906279 | A1 | 7/1989 | | |
| WO | 1989006270 | A1 | 7/1989 | | |
| WO | 199206209 | A1 | 4/1992 | | |
| WO | 1992012645 | A1 | 8/1992 | | |
| WO | 1992019729 | A1 | 11/1992 | | |
| WO | 1994025583 | A1 | 11/1994 | | |
| WO | 1997016076 | A1 | 5/1997 | | |
| WO | 1998020115 | A1 | 5/1998 | | |
| WO | 2003057247 | A1 | 7/2003 | | |
| WO | WO-03057247 | A1 * | 7/2003 | ............. | A23K 10/14 |
| WO | 2006056469 | A1 | 6/2006 | | |
| WO | 2007044968 | A2 | 4/2007 | | |
| WO | 2008092901 | A2 | 8/2008 | | |
| WO | 2012004759 | A2 | 1/2012 | | |
| WO | 2012110778 | A2 | 8/2012 | | |
| WO | 2013029013 | A1 | 2/2013 | | |
| WO | 2013119470 | A1 | 8/2013 | | |
| WO | 2020106796 | A1 | 5/2020 | | |

OTHER PUBLICATIONS

Database UNIPROT; Nov. 2, 2016, Sub Name: Full=4-phytase / acid phosphatase {EC0:0000313:EMBL: SCM51102.1}; EC=3.1.3.2 {EC0:0000313:EMBL:SCM51102.1}; EC=3.1.3.26 {EC0:0000313:EMBL:SCM51102.1}; XP002802507, retrieved from EBI accession No. UNIPROT: AOA1C6YW96 Database accession, 1 page.

Zyla et al, In-Vitro and In-Vivo Dephosphorylation of Rapeseed Meal by Means of Phytate-Degrading Enzymes Derived From Aspergillus Niger, Journal of the Science of Food and Agriculture, Wiley & Sons, Chichester, GB, vol. 61, No. 1, Jan. 1, 1993 (Jan. 1, 1993), pp. 1-06.

\* cited by examiner

SEQUENCE LISTING

```
<160> NUMBER OF SEQ ID NOS: 37

<210> SEQ ID NO 1
<211> LENGTH: 413
<212> TYPE: PRT
<213> ORGANISM: artificial sequence
<220> FEATURE:
<223> OTHER INFORMATION: PHY-13594

<400> SEQUENCE: 1

Ser Glu Ala Ala Pro Ala Gly Tyr His Leu Asp Lys Ala Val Ile Leu
1               5                   10                  15

Ser Arg His Gly Val Arg Ala Pro Thr Lys Met Thr Gln Thr Met Arg
                20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
        50                  55                  60

Arg Gln Tyr Phe Gln Gln Gln Gly Leu Leu Ser Arg Asp Ser Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Glu Cys Asp Leu
            100                 105                 110

Thr Ile His His Gln Asn Asp Ile Lys Gln Val Asp Pro Leu Phe His
        115                 120                 125

Pro Val Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Gln Arg His Ser Gly Glu Gln Pro Cys Asp Phe Ala
            180                 185                 190

Asn Ala Phe Pro Ser Lys Leu Asn Ile Ser Asp Asp Gly Asn Glu Val
        195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255
```

```
Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Glu
            275                 280                 285

Ser Lys Leu Pro Asp Ile Ser Pro Asp Val Lys Ile Leu Phe Leu Ala
            290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
            340                 345                 350

Lys Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
            370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410

<210> SEQ ID NO 2
<211> LENGTH: 413
<212> TYPE: PRT
<213> ORGANISM: artificial sequence
<220> FEATURE:
<223> OTHER INFORMATION: PHY-10931

<400> SEQUENCE: 2

Ser Glu Thr Ala Pro Ala Gly Tyr His Leu Asp Lys Ala Val Ile Leu
1                   5                   10                  15

Ser Arg His Gly Val Arg Ala Pro Thr Lys Met Thr Gln Leu Met Arg
                20                  25                  30

Asp Val Thr Pro Asn Gln Trp Pro Glu Trp Pro Val Pro Leu Gly Tyr
            35                  40                  45

Ile Thr Pro Arg Gly Glu His Leu Val Ser Leu Met Gly Gly Phe Tyr
        50                  55                  60

Arg Gln Tyr Phe Gln Gln Gln Gly Leu Leu Ser Arg Asp Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gln Cys Pro Leu
            100                 105                 110

Thr Ile His His Gln Ser Asn Ile Lys Val Val Asp Pro Leu Phe His
            115                 120                 125

Pro Leu Lys Thr Gly Ile Cys Ser Met Asp Lys Thr Gln Val Gln Gln
            130                 135                 140

Ala Val Glu Lys Gln Ala Gly Met Pro Ile Asp Lys Leu Asn Gln Tyr
145                 150                 155                 160

Tyr Ala Pro Glu Leu Ser Leu Met Ser Asn Val Leu Asn Phe Pro Lys
                165                 170                 175

Ser Pro Tyr Cys Arg Gln His Ser Val Glu Lys Pro Cys Asp Phe Ala
            180                 185                 190

Gln Met Phe Pro Ser Lys Leu Asn Ile Ser Asp Asp Gly Asn Glu Val
            195                 200                 205
```

-continued

```
Gln Leu Glu Gly Ala Val Gly Leu Ser Ser Thr Leu Ala Glu Ile Phe
    210             215                 220

Leu Leu Glu His Ala Gln Gly Met Pro Val Val Ala Trp Gly Asn Ile
225             230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Asn Lys Ile Leu Phe Leu Ala
    290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Ala Gly Thr Gln Tyr Val Ser Val
            340                 345                 350

His Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410
```

```
<210> SEQ ID NO 3
<211> LENGTH: 413
<212> TYPE: PRT
<213> ORGANISM: artificial sequence
<220> FEATURE:
<223> OTHER INFORMATION: PHY-10957

<400> SEQUENCE: 3
```

```
Ser Glu Ala Ala Pro Ser Gly Tyr His Leu Gln Lys Ala Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
    50                  55                  60

Arg Gln Trp Phe Gln Gln Gly Ile Leu Ser Lys Glu Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Lys Cys Pro Leu
            100                 105                 110

Thr Ile His His Gln Ser Asn Ile Lys Val Val Asp Pro Leu Phe His
            115                 120                 125

Pro Leu Lys Thr Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160
```

-continued

```
Tyr Arg Pro Glu Leu Ala Leu Met Ser Asn Val Leu Asn Phe Pro Lys
                165                 170                 175

Ser Pro Tyr Cys Arg Gln His Ser Val Glu Lys Pro Cys Asp Phe Ala
            180                 185                 190

Asn Ala Phe Pro Ser Lys Leu Asn Ile Thr Asp Asp Gly Asn Glu Val
            195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala Tyr
                245                 250                 255

Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Val Lys Ile Leu Phe Leu Ala
    290                 295                 300

Gly His Asp Thr Asn Ile Ala Asn Ile Ala Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Glu Gly Thr Gln Tyr Val Ser Val
            340                 345                 350

Lys Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Val Thr Phe Thr Arg
385                 390                 395                 400

Leu Val Asn Gln Val Val Glu Pro Ala Cys Gln Ile Pro
                405                 410
```

<210> SEQ ID NO 4
<211> LENGTH: 413
<212> TYPE: PRT
<213> ORGANISM: artificial sequence
<220> FEATURE:
<223> OTHER INFORMATION: PHY-11569

<400> SEQUENCE: 4

```
Ser Glu Thr Ala Pro Ser Gly Tyr His Leu Asp Lys Ala Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
    50                  55                  60

Arg Gln Tyr Phe Gln Gln Gln Gly Leu Leu Ser Lys Asp Asn Cys Pro
65                  70                  75                  80

Thr Ala Asn Asp Val Tyr Val Trp Thr Asp Val Asp Gln Arg Thr Arg
                85                  90                  95

Lys Thr Gly Glu Ala Phe Leu Ala Gly Leu Ala Pro Glu Cys Asp Leu
            100                 105                 110
```

-continued

```
Thr Ile His His Gln Asn Asn Ile Lys Val Val Asp Pro Met Phe His
        115                 120                 125

Pro Leu Lys Thr Gly Ile Cys Ser Met Asp Lys Thr Gln Val Gln Gln
        130                 135                 140

Ala Val Glu Lys Gln Ala Gly Met Pro Ile Asp Lys Leu Asn Gln His
145                 150                 155                 160

Tyr Ala Pro Glu Leu Ala Leu Met Ser Ala Val Leu Asn Phe Pro Ala
                165                 170                 175

Ser Pro Tyr Cys Gln Gln His Ser Val Asp Lys Pro Cys Asp Phe Ala
                180                 185                 190

Asn Ala Phe Pro Ser Lys Leu Asn Ile Thr Asp Asp Gly Asn Glu Val
                195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala His
                245                 250                 255

Phe Asp Leu Met Ser Arg Thr Pro Tyr Ile Ala Lys His Asn Gly Thr
        260                 265                 270

Pro Leu Leu Gln Thr Ile Val Asn Ala Leu Asn Ser Asn Thr Thr Ala
        275                 280                 285

Arg Glu Leu Pro Asp Ile Ser Pro Asp Asn Lys Ile Leu Phe Leu Ala
        290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Ala Gly Thr Gln Tyr Val Ser Val
                340                 345                 350

His Met Val Tyr Gln Thr Leu Ala Gln Leu Arg Asn Gln Thr Pro Leu
                355                 360                 365

Thr Leu Lys Glu Pro Ala Gly Thr Val Pro Leu Lys Ile Pro Gly Cys
        370                 375                 380

Asp Asp Gln Thr Ala Glu Gly Tyr Cys Pro Leu Val Thr Phe Thr Arg
385                 390                 395                 400

Leu Val Asn Gln Ser Val Glu Pro Ala Cys Gln Leu Pro
                405                 410
```

<210> SEQ ID NO 5
<211> LENGTH: 413
<212> TYPE: PRT
<213> ORGANISM: artificial sequence
<220> FEATURE:
<223> OTHER INFORMATION: PHY-11658

<400> SEQUENCE: 5

```
Ser Glu Ala Ala Pro Ser Gly Tyr His Leu Asp Lys Ala Val Leu Leu
1                 5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
        50                  55                  60
```

-continued

Arg Gln Trp Phe Gln Gln Gln Gly Leu Leu Ser Lys Asp Arg Cys Pro
65                70                  75                  80

Thr Ala Asn Asp Val Tyr Val Trp Ala Asp Val Gly Gln Arg Thr Arg
                85                  90                  95

Lys Thr Gly Glu Ala Phe Leu Ala Gly Leu Ala Pro Glu Cys Asp Leu
            100                 105                 110

Thr Ile His His Gln Asn Asp Ile Lys Gln Val Asp Pro Met Phe His
        115                 120                 125

Pro Leu Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Arg Gln His Ser Val Glu Lys Pro Cys Asp Phe Ala
            180                 185                 190

Gln Met Phe Pro Ser Lys Leu Asn Ile Thr Asp Asp Gly Asn Glu Val
        195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Gln Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
        275                 280                 285

Arg Glu Leu Pro Asp Ile Ser Pro Asp Val Lys Ile Leu Phe Leu Ala
    290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Arg Trp Ser Asp Lys Asp Gly Thr Gln Tyr Val Ser Val
            340                 345                 350

His Met Val Tyr Gln Thr Leu Ala Gln Leu Arg Asn Gln Thr Pro Leu
        355                 360                 365

Thr Leu Lys Glu Pro Ala Gly Thr Val Pro Leu Lys Ile Pro Gly Cys
    370                 375                 380

Asp Asp Gln Thr Ala Glu Gly Tyr Cys Pro Leu Val Thr Phe Thr Arg
385                 390                 395                 400

Leu Val Asn Gln Ser Val Glu Pro Ala Cys Gln Leu Pro
                405                 410

<210> SEQ ID NO 6
<211> LENGTH: 413
<212> TYPE: PRT
<213> ORGANISM: artificial sequence
<220> FEATURE:
<223> OTHER INFORMATION: PHY-11673

<400> SEQUENCE: 6

Ser Glu Ala Ala Pro Ser Gly Tyr His Leu Asp Lys Ala Val Ile Leu
1               5                   10                  15

```
Ser Arg His Gly Val Arg Ala Pro Thr Lys Met Thr Glu Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
            50                  55                  60

Arg Gln Tyr Phe Gln Gln Gln Gly Leu Leu Ser Lys Asp Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Glu Cys Pro Leu
            100                 105                 110

Thr Ile His His Gln Ser Asn Ile Lys Val Val Asp Pro Leu Phe His
            115                 120                 125

Pro Val Lys Thr Gly Leu Cys Ser Met Asp Lys Thr Gln Val Gln Gln
            130                 135                 140

Ala Val Glu Lys Gln Ala Gly Met Pro Ile Asp Lys Leu Asn Asp Lys
145                 150                 155                 160

Tyr Ala Pro Glu Leu Ala Leu Met Ser Asn Val Leu Asn Phe Pro Lys
                165                 170                 175

Ser Pro Tyr Cys Arg Gln His Ser Val Glu Lys Pro Cys Asp Phe Ala
                180                 185                 190

Gln Met Phe Pro Ser Lys Leu Ser Ile Gly Asp Asp Gly Asn Glu Val
            195                 200                 205

Gln Leu Glu Gly Ala Val Gly Leu Ser Ser Thr Leu Ala Glu Ile Phe
            210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala His
                245                 250                 255

Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Glu
            275                 280                 285

Ser Lys Leu Pro Asp Ile Ser Pro Ser Val Lys Ile Leu Phe Leu Ala
290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Asp Gly Thr Gln Tyr Val Ser Val
                340                 345                 350

His Met Val Tyr Gln Thr Leu Ala Gln Leu Arg Asn Gln Thr Pro Leu
            355                 360                 365

Thr Leu Lys Glu Pro Ala Gly Thr Val Pro Leu Lys Ile Pro Gly Cys
            370                 375                 380

Asp Asp Gln Thr Ala Glu Gly Tyr Cys Pro Leu Val Thr Phe Thr Val
385                 390                 395                 400

Leu Val Asn Gln Ser Val Glu Pro Ala Cys Gln Leu Pro
                405                 410
```

<210> SEQ ID NO 7
<211> LENGTH: 413

-continued

<212> TYPE: PRT
<213> ORGANISM: artificial sequence
<220> FEATURE:
<223> OTHER INFORMATION: PHY-11680

<400> SEQUENCE: 7

```
Ser Glu Thr Ala Pro Ser Gly Tyr His Leu Asp Lys Ala Val Ile Leu
1               5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
                35                  40                  45

Ile Thr Pro Arg Gly Glu His Leu Val Ser Leu Met Gly Gly Phe Tyr
        50                  55                  60

Arg Gln Tyr Phe Gln Gln Gln Gly Leu Leu Ser Lys Asp Asn Cys Pro
65                  70                  75                  80

Thr Ala Asn Asp Val Tyr Val Trp Thr Asp Val Asp Gln Arg Thr Arg
                85                  90                  95

Lys Thr Gly Glu Ala Phe Leu Ala Gly Leu Ala Pro Glu Cys Asp Leu
                100                 105                 110

Thr Ile His His Gln Asn Asn Ile Lys Val Val Asp Pro Leu Phe His
            115                 120                 125

Pro Leu Lys Thr Gly Ile Cys Ser Met Asp Lys Thr Gln Val Gln Gln
        130                 135                 140

Ala Val Glu Lys Gln Ala Gly Met Pro Ile Asp Lys Leu Asn Asp His
145                 150                 155                 160

Tyr Arg Pro Glu Leu Ser Leu Met Ser Asn Val Leu Asn Phe Pro Lys
                165                 170                 175

Ser Pro Tyr Cys Gln Arg His Ser Gly Glu Lys Thr Cys Asp Phe Ala
                180                 185                 190

Asn Ala Phe Pro Ser Lys Leu Ile Ile Thr Asp Asp Gly Asn Lys Val
            195                 200                 205

Ala Leu Glu Gly Ala Val Gly Leu Ser Ser Thr Leu Ala Glu Ile Phe
        210                 215                 220

Leu Leu Glu Tyr Ala Gln Gly Met Pro Lys Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Asn Gly Thr
                260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Val Lys Ile Leu Phe Leu Ala
        290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Glu Gly Thr Gln Tyr Val Ser Val
                340                 345                 350

Lys Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
        370                 375                 380
```

Asp Asp Gln Thr Ala Glu Gly Tyr Cys Pro Leu Asp Thr Phe Thr Arg
385             390             395             400

Leu Val Asn Gln Val Val Glu Pro Ala Cys Gln Ile Pro
            405             410

<210> SEQ ID NO 8
<211> LENGTH: 413
<212> TYPE: PRT
<213> ORGANISM: artificial sequence
<220> FEATURE:
<223> OTHER INFORMATION: PHY-11895

<400> SEQUENCE: 8

Ser Glu Ala Ala Pro Ser Gly Tyr His Leu Asp Lys Ala Val Leu Leu
1               5               10              15

Ser Arg His Gly Val Arg Ala Pro Thr Lys Met Thr Gln Leu Met Arg
            20              25              30

Asp Val Thr Pro Tyr Thr Trp Pro Glu Trp Pro Val Pro Leu Gly Tyr
            35              40              45

Ile Thr Pro Arg Gly Glu His Leu Val Ser Leu Met Gly Gly Phe Tyr
        50              55              60

Arg Gln Trp Phe Gln Gln Gln Gly Leu Leu Ser Arg Asp Arg Cys Pro
65              70              75              80

Thr Ala Asn Asp Val Tyr Val Trp Thr Asp Val Asn Gln Arg Thr Arg
            85              90              95

Lys Thr Gly Glu Ala Phe Leu Ala Gly Leu Ala Pro Glu Cys Asp Leu
            100             105             110

Thr Ile His His Gln Lys Asn Ile Lys Val Val Asp Pro Leu Phe His
            115             120             125

Pro Leu Lys Ala Gly Ile Cys Ser Met Asp Lys Thr Gln Val Gln Gln
            130             135             140

Ala Val Glu Lys Gln Ala Gly Met Pro Ile Asp Lys Leu Asn Gln His
145             150             155             160

Tyr Ala Pro Glu Leu Ser Leu Met Ser Asn Val Leu Asn Phe Pro Lys
            165             170             175

Ser Pro Tyr Cys Gln Arg His Ser Gly Glu Lys Thr Cys Asp Phe Ala
            180             185             190

Asn Ala Phe Pro Ser Lys Leu Asn Ile Ser Asp Asp Gly Asn Glu Val
            195             200             205

Gln Leu Glu Gly Ala Val Gly Leu Ser Ser Thr Leu Ala Glu Ile Phe
    210             215             220

Leu Leu Glu Tyr Ala Gln Gly Met Pro Val Val Ala Trp Gly Asn Ile
225             230             235             240

His Ser Glu Gln Glu Trp Asn Ala Leu Leu Lys Leu His Asn Ala His
            245             250             255

Phe Asp Leu Met Glu Arg Thr Pro Tyr Ile Ala Lys His Asn Gly Thr
            260             265             270

Pro Leu Leu Gln Thr Ile Val Asn Ala Leu Asn Ser Asn Thr Thr Ala
    275             280             285

Arg Glu Leu Pro Asp Ile Ser Pro Ser Val Lys Ile Leu Phe Leu Ala
    290             295             300

Gly His Asp Thr Asn Ile Ala Asn Ile Gly Gly Met Leu Gly Met Thr
305             310             315             320

Trp Thr Leu Pro Gly Gln Pro Asp Asn Thr Pro Pro Gly Gly Ala Leu
            325             330             335

```
Leu Phe Glu Leu Trp Ser Asp Lys Ala Gly Thr Gln Tyr Val Ser Val
            340                 345                 350

His Met Val Tyr Gln Thr Leu Thr Gln Leu Arg Asn Gln Thr Pro Leu
            355                 360                 365

Thr Leu Lys Glu Pro Ala Gly Ser Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410

<210> SEQ ID NO 9
<211> LENGTH: 413
<212> TYPE: PRT
<213> ORGANISM: artificial sequence
<220> FEATURE:
<223> OTHER INFORMATION: PHY-11932

<400> SEQUENCE: 9

Ser Glu Thr Ala Pro Ala Gly Tyr His Leu Asp Lys Ala Val Ile Leu
1                   5                   10                  15

Ser Arg His Gly Val Arg Ala Pro Thr Lys Met Thr Gln Thr Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
        50                  55                  60

Arg Gln Tyr Phe Gln Gln Gly Leu Leu Ser Ala Glu Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gln Cys Pro Leu
            100                 105                 110

Thr Ile His His Gln Asn Asp Ile Lys Gln Val Asp Pro Met Phe His
        115                 120                 125

Pro Leu Lys Ala Gly Ile Cys Ser Met Asp Lys Thr Gln Val Gln Gln
        130                 135                 140

Ala Val Glu Lys Gln Ala Gly Met Pro Ile Asp Lys Leu Asn Asp His
145                 150                 155                 160

Tyr Arg Pro Glu Leu Ser Leu Met Ser Asn Val Leu Asn Phe Pro Lys
            165                 170                 175

Ser Pro Tyr Cys Ala Arg His Ser Gly Asp Lys Pro Cys Asp Phe Ala
            180                 185                 190

Gln Met Met Pro Ser Lys Leu Asn Ile Thr Asp Asp Gly Asn Glu Val
            195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala Gln
            245                 250                 255

Phe Asp Leu Met Glu Arg Thr Pro Tyr Ile Ala Lys His Asn Gly Thr
        260                 265                 270

Pro Leu Leu Gln Thr Ile Val Asn Ala Leu Asn Ser Asn Thr Thr Ala
        275                 280                 285
```

-continued

```
Arg Glu Leu Pro Asp Ile Ser Pro Asp Val Lys Ile Leu Phe Leu Ala
    290             295             300

Gly His Asp Thr Asn Ile Ala Asn Ile Ala Gly Met Leu Gly Met Thr
305             310             315             320

Trp Thr Leu Pro Gly Gln Pro Asp Asn Thr Pro Pro Gly Gly Ala Leu
            325             330             335

Leu Phe Glu Leu Trp Ser Asp Lys Ala Gly Thr Gln Tyr Val Ser Val
            340             345             350

His Met Val Tyr Gln Thr Leu Ala Gln Leu Arg Asn Gln Thr Pro Leu
            355             360             365

Thr Leu Lys Glu Pro Ala Gly Ser Val Pro Leu Lys Ile Pro Gly Cys
    370             375             380

Asp Asp Gln Thr Ala Glu Gly Tyr Cys Pro Leu Asp Thr Phe Thr Arg
385             390             395             400

Leu Val Asn Gln Val Val Glu Pro Ala Cys Gln Leu Pro
            405             410
```

```
<210> SEQ ID NO 10
<211> LENGTH: 413
<212> TYPE: PRT
<213> ORGANISM: artificial sequence
<220> FEATURE:
<223> OTHER INFORMATION: PHY-12058

<400> SEQUENCE: 10

Ser Glu Ala Ala Pro Ala Gly Tyr His Leu Asp Lys Val Val Ile Leu
1               5               10              15

Ser Arg His Gly Val Arg Ala Pro Thr Lys Met Thr Gln Thr Met Arg
            20              25              30

Asp Val Thr Pro Tyr Thr Trp Pro Glu Trp Pro Val Pro Leu Gly Tyr
            35              40              45

Ile Thr Pro Arg Gly Glu His Leu Val Ser Leu Met Gly Gly Phe Tyr
    50              55              60

Arg Gln Lys Phe Gln Gln Gln Gly Leu Leu Ser Lys Asp Arg Cys Pro
65              70              75              80

Thr Ala Asn Asp Val Tyr Val Trp Thr Asp Val Asp Gln Arg Thr Arg
            85              90              95

Lys Thr Gly Glu Ala Phe Leu Ala Gly Leu Ala Pro Lys Cys Pro Leu
            100             105             110

Thr Ile His His Gln Ser Asn Ile Lys Val Val Asp Pro Leu Phe His
    115             120             125

Pro Leu Lys Thr Gly Ile Cys Ser Met Asp Lys Thr Gln Val Gln Gln
    130             135             140

Ala Val Glu Lys Gln Ala Gly Met Pro Ile Asp Lys Leu Asn Gln His
145             150             155             160

Tyr Arg Pro Glu Leu Ser Leu Met Ser Asn Val Leu Asn Phe Pro Lys
            165             170             175

Ser Pro Tyr Cys Ala Gln His Ser Gly Glu Lys Pro Cys Asp Phe Ala
            180             185             190

Gln Met Phe Pro Ser Lys Leu Asn Ile Ser Asp Asp Gly Asn Glu Val
            195             200             205

Gln Leu Glu Gly Ala Val Gly Leu Ser Ser Thr Leu Ala Glu Ile Phe
    210             215             220

Leu Leu Glu Tyr Ala Gln Gly Met Pro Val Val Ala Trp Gly Asn Ile
225             230             235             240
```

```
His Ser Glu Gln Glu Trp Asn Asp Leu Leu Lys Leu His Asn Ala Tyr
                245                 250                 255

Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Ser Val Lys Ile Leu Phe Leu Ala
    290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Asp Gly Thr Gln Tyr Val Ser Val
            340                 345                 350

Lys Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Asp Thr Phe Thr Arg
385                 390                 395                 400

Leu Val Asn Gln Ser Val Glu Pro Ala Cys Gln Ile Pro
                405                 410
```

```
<210> SEQ ID NO 11
<211> LENGTH: 413
<212> TYPE: PRT
<213> ORGANISM: artificial sequence
<220> FEATURE:
<223> OTHER INFORMATION: PHY-12663

<400> SEQUENCE: 11

Ser Glu Ala Ala Pro Ser Gly Tyr His Leu Asp Lys Val Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
    50                  55                  60

Arg Gln Trp Phe Gln Gln Gln Gly Leu Leu Ser Lys Asp Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gln Cys Pro Leu
            100                 105                 110

Thr Ile His His Gln Lys Asn Ile Lys Val Val Asp Pro Leu Phe His
        115                 120                 125

Pro Leu Lys Thr Gly Ile Cys Ser Met Asp Lys Thr Gln Val Gln Gln
        130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Gln Arg His Ser Gly Asp Glu Pro Cys Asp Phe Ala
            180                 185                 190
```

-continued

```
Asn Ala Phe Pro Ser Lys Leu Asn Ile Thr Asp Asp Gly Asn Glu Val
        195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Asn Gly Thr
                260                 265                 270

Pro Leu Leu Gln Thr Ile Val Asn Ala Leu Asn Ser Asn Thr Thr Ala
        275                 280                 285

Arg Glu Leu Pro Asp Ile Ser Pro Asp Asn Lys Ile Leu Phe Leu Ala
    290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Arg Trp Arg Asp Lys Glu Gly Thr Gln Tyr Val Ser Val
                340                 345                 350

His Met Val Tyr Gln Thr Leu Ala Gln Leu Arg Asn Gln Thr Pro Leu
                355                 360                 365

Thr Leu Lys Glu Pro Ala Gly Ser Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Ile Pro
                405                 410
```

```
<210> SEQ ID NO 12
<211> LENGTH: 413
<212> TYPE: PRT
<213> ORGANISM: artificial sequence
<220> FEATURE:
<223> OTHER INFORMATION: PHY-12784

<400> SEQUENCE: 12
```

```
Ser Glu Ala Ala Pro Ser Gly Tyr His Leu Asp Lys Ala Val Leu Leu
1               5                   10                  15

Ser Arg His Gly Val Arg Ala Pro Thr Lys Met Thr Gln Leu Met Arg
            20                  25                  30

Asp Val Thr Pro Asn Gln Trp Pro Glu Trp Pro Val Pro Leu Gly Tyr
            35                  40                  45

Ile Thr Pro Arg Gly Glu His Leu Val Ser Leu Met Gly Gly Phe Tyr
    50                  55                  60

Arg Gln Tyr Phe Gln Gln Gln Gly Ile Leu Ser Lys Asp Ser Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gln Cys Pro Leu
            100                 105                 110

Thr Ile His His Gln Ser Asp Ile Lys Gln Val Asp Pro Met Phe His
        115                 120                 125

Pro Leu Lys Ala Gly Ile Cys Ser Met Asp Lys Thr Gln Val Gln Gln
    130                 135                 140
```

-continued

```
Ala Val Glu Lys Gln Ala Gly Met Pro Ile Asp Lys Leu Asn Gln Tyr
145             150                 155                 160

Tyr Ala Pro Glu Leu Ala Leu Met Ser Asn Val Leu Asn Phe Pro Lys
            165                 170                 175

Ser Pro Tyr Cys Gln Arg His Ser Gly Glu Gln Thr Cys Asp Phe Ala
            180                 185                 190

Gln Met Phe Pro Ser Lys Leu Asn Ile Ser Asp Asp Gly Asn Glu Val
            195                 200                 205

Gln Leu Glu Gly Ala Val Gly Leu Ser Ser Thr Leu Ala Glu Thr Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala Gln
            245                 250                 255

Phe Asp Leu Met Gln Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Ser Val Lys Ile Leu Phe Leu Ala
    290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
            325                 330                 335

Leu Phe Glu Leu Trp Arg Asp Lys Glu Gly Thr Gln Tyr Val Ser Val
            340                 345                 350

His Met Val Tyr Gln Thr Leu Thr Gln Leu Arg Asn Gln Thr Pro Leu
            355                 360                 365

Thr Leu Lys Glu Pro Ala Gly Thr Val Pro Leu Lys Ile Pro Gly Cys
    370                 375                 380

Asp Asp Gln Thr Ala Glu Gly Tyr Cys Pro Leu Val Thr Phe Thr Arg
385                 390                 395                 400

Leu Val Asn Gln Val Val Glu Pro Ala Cys Gln Ile Pro
            405                 410
```

<210> SEQ ID NO 13
<211> LENGTH: 413
<212> TYPE: PRT
<213> ORGANISM: artificial sequence
<220> FEATURE:
<223> OTHER INFORMATION: PHY-13177

<400> SEQUENCE: 13

```
Ser Glu Ala Ala Pro Ser Gly Tyr His Leu Asp Lys Val Val Ile Leu
1               5                   10                  15

Ser Arg His Gly Val Arg Ala Pro Thr Lys Met Thr Gln Leu Met Arg
            20                  25                  30

Asp Val Thr Pro Asn Gln Trp Pro Glu Trp Pro Val Pro Leu Gly Tyr
            35                  40                  45

Ile Thr Pro Arg Gly Glu His Leu Val Ser Leu Met Gly Gly Phe Tyr
    50                  55                  60

Arg Gln Tyr Phe Gln Gln Gln Gly Leu Leu Ser Lys Asp Arg Cys Pro
65                  70                  75                  80

Thr Ala Asn Asp Val Tyr Val Trp Ala Asp Val Asn Gln Arg Thr Arg
            85                  90                  95
```

```
Lys Thr Gly Glu Ala Phe Leu Ala Gly Leu Ala Pro Arg Cys Asp Leu
            100                 105                 110

Thr Ile His His Gln Lys Asp Ile Lys Gln Val Asp Pro Met Phe His
            115                 120                 125

Pro Leu Lys Ala Gly Ile Cys Ser Met Asp Lys Thr Gln Val Gln Gln
            130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Ala Gln His Ser Gly Glu Lys Pro Cys Asp Phe Ala
            180                 185                 190

Gln Met Phe Pro Ser Lys Leu Asn Ile Ser Asp Asp Gly Asn Glu Val
            195                 200                 205

Gln Leu Glu Gly Ala Val Gly Leu Ser Ser Thr Leu Ala Glu Ile Phe
            210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Gln Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Asn Lys Ile Leu Phe Leu Ala
            290                 295                 300

Gly His Asp Thr Asn Ile Ala Asn Ile Gly Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Arg Trp Arg Asp Lys Ala Gly Thr Gln Tyr Val Ser Val
            340                 345                 350

His Met Val Tyr Gln Thr Leu Ala Gln Leu Arg Asn Gln Thr Pro Leu
            355                 360                 365

Thr Leu Lys Glu Pro Ala Gly Thr Val Pro Leu Lys Ile Pro Gly Cys
            370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410
```

```
<210> SEQ ID NO 14
<211> LENGTH: 413
<212> TYPE: PRT
<213> ORGANISM: artificial sequence
<220> FEATURE:
<223> OTHER INFORMATION: PHY-13371

<400> SEQUENCE: 14
```

```
Ser Glu Ala Ala Pro Ala Gly Tyr His Leu Gln Lys Ala Val Ile Leu
1               5                   10                  15

Ser Arg His Gly Val Arg Ala Pro Thr Lys Met Thr Gln Thr Met Arg
                20                  25                  30

Asp Val Thr Pro Tyr Thr Trp Pro Glu Trp Pro Val Pro Leu Gly Tyr
            35                  40                  45
```

```
Ile Thr Pro Arg Gly Glu His Leu Val Lys Leu Met Gly Gly Phe Tyr
    50                  55              60

Arg Gln Tyr Phe Gln Gln Gln Gly Leu Leu Ser Arg Asp Arg Cys Pro
65              70              75              80

Thr Ala Asn Asp Val Tyr Val Trp Thr Asp Val Asn Gln Arg Thr Arg
                85              90              95

Lys Thr Gly Glu Ala Phe Leu Ala Gly Leu Ala Pro Glu Cys Asp Leu
            100             105             110

Thr Ile His His Gln Ser Asp Ile Lys Gln Val Asp Pro Leu Phe His
        115             120             125

Pro Val Lys Ala Gly Ile Cys Ser Met Asp Lys Thr Gln Val Gln Gln
    130             135             140

Ala Val Glu Lys Gln Ala Gly Met Pro Ile Asp Lys Leu Asn Gln His
145             150             155             160

Tyr Arg Pro Glu Leu Ala Leu Met Ser Asn Val Leu Asn Phe Pro Lys
                165             170             175

Ser Pro Tyr Cys Gln Gln His Ser Val Glu Gln Pro Cys Asp Phe Ala
            180             185             190

Asn Ala Phe Pro Ser Tyr Leu Asn Ile Ser Asp Asp Gly Asn Glu Val
            195             200             205

Gln Leu Glu Gly Ala Val Gly Leu Gly Ser Thr Leu Ala Glu Ile Phe
    210             215             220

Leu Leu Glu Tyr Ala Gln Gly Met Pro Val Val Ala Trp Gly Asn Ile
225             230             235             240

His Ser Glu Gln Glu Trp Asn Ala Leu Leu Lys Leu His Asn Ala His
            245             250             255

Phe Asn Leu Met Glu Arg Thr Pro Tyr Ile Ala Lys His Asn Gly Thr
            260             265             270

Pro Leu Leu Gln Thr Ile Val Asn Ala Leu Asn Ser Asn Thr Thr Ala
        275             280             285

Arg Glu Leu Pro Asp Ile Ser Pro Asp Val Lys Ile Leu Phe Leu Ala
    290             295             300

Gly His Asp Thr Asn Ile Ala Asn Ile Gly Gly Met Leu Gly Met Thr
305             310             315             320

Trp Thr Leu Pro Gly Gln Pro Asp Asn Thr Pro Pro Gly Gly Ala Leu
            325             330             335

Leu Phe Glu Leu Trp Ser Asp Lys Glu Gly Thr Gln Tyr Val Ala Val
            340             345             350

Lys Met Val Tyr Gln Thr Leu Ala Gln Leu Arg Asn Gln Thr Pro Leu
        355             360             365

Thr Leu Lys Glu Pro Ala Gly Thr Val Pro Leu Lys Ile Pro Gly Cys
    370             375             380

Asp Asp Gln Thr Ala Glu Gly Tyr Cys Pro Leu Asp Thr Phe Thr Arg
385             390             395             400

Leu Val Asn Gln Val Ile Glu Pro Ala Cys Gln Leu Pro
                405             410
```

<210> SEQ ID NO 15
<211> LENGTH: 413
<212> TYPE: PRT
<213> ORGANISM: artificial sequence
<220> FEATURE:
<223> OTHER INFORMATION: PHY-13460

<400> SEQUENCE: 15

-continued

```
Ser Glu Ala Ala Pro Ser Gly Tyr His Leu Gln Lys Ala Val Ile Leu
1               5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Lys Leu Met Gly Gly Phe Tyr
        50                  55                  60

Arg Gln Tyr Phe Gln Gln Gln Gly Leu Leu Ser Arg Asp Asn Cys Pro
65                  70                  75                  80

Thr Ala Asn Asp Val Tyr Val Trp Thr Asp Val Ala Gln Arg Thr Arg
                85                  90                  95

Lys Thr Gly Glu Ala Phe Leu Ala Gly Leu Ala Pro Glu Cys Asp Leu
                100                 105                 110

Thr Val His His Gln Asn Asp Ile Lys Gln Val Asp Pro Leu Phe His
            115                 120                 125

Pro Val Lys Ala Gly Ile Cys Ser Met Asn Lys Ser Gln Val Gln Gln
        130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Gln Arg His Ser Gly Glu Lys Pro Cys Asp Phe Ala
            180                 185                 190

Gln Met Met Pro Ser Lys Leu Asn Ile Ser Asp Asp Gly Asn Glu Val
            195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala Gln
                245                 250                 255

Phe Asp Leu Met Glu Arg Thr Pro Tyr Ile Ala Lys His Asn Gly Thr
            260                 265                 270

Pro Leu Met Gln Thr Ile Val Asn Ala Leu Asn Ser Asn Thr Thr Ala
            275                 280                 285

Arg Glu Leu Pro Asp Ile Ser Pro Asp Val Lys Ile Leu Phe Leu Ala
        290                 295                 300

Gly His Asp Thr Asn Ile Ala Asn Ile Ala Gly Met Leu Gly Met Thr
305                 310                 315                 320

Trp Thr Leu Pro Gly Gln Pro Asp Asn Thr Pro Pro Gly Gly Ala Leu
            325                 330                 335

Leu Phe Glu Leu Trp Ser Asp Lys Glu Gly Thr Gln Tyr Val Ser Val
            340                 345                 350

Lys Met Val Tyr Gln Thr Leu Ala Gln Leu Arg Asn Gln Thr Pro Leu
            355                 360                 365

Thr Leu Lys Glu Pro Ala Gly Thr Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
            405                 410
```

-continued

```
<210> SEQ ID NO 16
<211> LENGTH: 413
<212> TYPE: PRT
<213> ORGANISM: artificial sequence
<220> FEATURE:
<223> OTHER INFORMATION: PHY-13513

<400> SEQUENCE: 16

Ser Glu Ala Ala Pro Ser Gly Tyr His Leu Gln Lys Ala Val Ile Leu
1               5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Lys Leu Met Gly Gly Phe Tyr
        50                  55                  60

Arg Gln Tyr Phe Gln Gln Gln Gly Leu Leu Ser Arg Asp Ser Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gly Cys Asp Leu
                100                 105                 110

Thr Ile His His Gln Ser Asp Ile Lys Gln Ala Asp Pro Leu Phe His
            115                 120                 125

Pro Val Lys Ala Gly Ile Cys Ser Met Asp Lys Thr Gln Val Gln Gln
        130                 135                 140

Ala Val Glu Lys Gln Ala Gly Gly Pro Ile Glu Thr Leu Asn Gln Arg
145                 150                 155                 160

Tyr Gln Ala Glu Leu Ala Leu Met Ser Ser Val Leu Asp Phe Pro Lys
                165                 170                 175

Ser Pro Tyr Cys Gln Arg His Ser Val Asp Lys Pro Cys Asp Phe Ala
                180                 185                 190

Asn Ala Phe Pro Ser Tyr Leu Asn Ile Ser Asp Asp Gly Asn Glu Val
            195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala His
                245                 250                 255

Phe Asp Leu Met Glu Arg Thr Pro Tyr Ile Ala Lys His Asn Gly Thr
                260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Val Lys Ile Leu Phe Leu Ala
        290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Asp Gly Thr Gln Tyr Val Ser Val
                340                 345                 350

His Met Val Tyr Gln Thr Leu Ala Gln Leu Arg Asn Met Thr Pro Leu
            355                 360                 365

Thr Leu Lys Glu Pro Ala Gly Ser Val Pro Leu Lys Ile Pro Gly Cys
```

-continued

```
        370             375             380

Asp Asp Gln Thr Ala Glu Gly Tyr Cys Pro Leu Asp Thr Phe Thr Arg
385             390             395             400

Leu Val Asn Gln Val Val Glu Pro Ala Cys Gln Leu Pro
                405             410

<210> SEQ ID NO 17
<211> LENGTH: 413
<212> TYPE: PRT
<213> ORGANISM: artificial sequence
<220> FEATURE:
<223> OTHER INFORMATION: PHY-13637

<400> SEQUENCE: 17

Ser Glu Ala Ala Pro Ala Gly Tyr His Leu Gln Lys Ala Val Ile Leu
1               5               10              15

Ser Arg His Gly Val Arg Ala Pro Thr Lys Met Thr Gln Leu Met Arg
                20              25              30

Asp Val Thr Pro Tyr Thr Trp Pro Glu Trp Pro Val Pro Leu Gly Tyr
                35              40              45

Ile Thr Pro Arg Gly Glu His Leu Val Ser Leu Met Gly Gly Phe Tyr
        50              55              60

Arg Gln Tyr Phe Gln Gln Gln Gly Leu Leu Ser Lys Asp Asn Cys Pro
65              70              75              80

Thr Ala Asn Asp Val Tyr Val Trp Thr Asp Val Asn Gln Arg Thr Arg
                85              90              95

Lys Thr Gly Glu Ala Phe Leu Ala Gly Leu Ala Pro Glu Cys Asp Leu
                100             105             110

Thr Ile His His Gln Asn Asp Ile Lys Gln Val Asp Pro Leu Phe His
        115             120             125

Pro Leu Lys Ala Gly Ile Cys Ser Met Asp Lys Thr Gln Val Gln Gln
        130             135             140

Ala Val Glu Lys Gln Ala Gly Met Pro Ile Asp Lys Leu Asn Gln His
145             150             155             160

Tyr Arg Pro Glu Leu Ala Leu Met Ser Ser Val Leu Asp Phe Pro Lys
                165             170             175

Ser Pro Tyr Cys Gln His His Ser Gly Asp Gln Pro Cys Asp Phe Ala
                180             185             190

Gln Met Phe Pro Ser Tyr Leu Asn Ile Ser Asp Asp Gly Asn Glu Val
        195             200             205

Gln Leu Glu Gly Ala Val Gly Leu Ser Ser Thr Leu Ala Glu Ile Phe
        210             215             220

Leu Leu Glu Tyr Ala Gln Gly Met Pro Val Val Ala Trp Gly Asn Ile
225             230             235             240

His Ser Glu Gln Glu Trp Asn Asp Leu Leu Lys Leu His Asn Ala Tyr
                245             250             255

Phe Asp Leu Met Glu Arg Thr Pro Tyr Ile Ala Lys His Asn Gly Thr
        260             265             270

Pro Leu Leu Gln Thr Ile Val Asn Ala Leu Asn Ser Asn Thr Thr Ala
        275             280             285

Arg Glu Leu Pro Asp Val Ser Pro Asp Val Lys Ile Leu Phe Leu Ala
        290             295             300

Gly His Asp Thr Asn Ile Ala Asn Ile Gly Gly Met Leu Gly Met Asp
305             310             315             320

Trp Thr Leu Pro Gly Gln Pro Asp Asn Thr Pro Pro Gly Gly Ala Leu
```

-continued

```
                  325                 330                 335

Leu Phe Glu Leu Trp Ser Asp Lys Glu Gly Thr Gln Tyr Val Ser Val
            340                 345                 350

Lys Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410

<210> SEQ ID NO 18
<211> LENGTH: 413
<212> TYPE: PRT
<213> ORGANISM: artificial sequence
<220> FEATURE:
<223> OTHER INFORMATION: PHY-13705

<400> SEQUENCE: 18

Ser Glu Ala Ala Pro Ala Gly Tyr His Leu Asp Lys Ala Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Lys Leu Met Gly Gly Phe Tyr
    50                  55                  60

Arg Gln Tyr Phe Gln Gln Gln Gly Leu Leu Ser Arg Asp Ser Cys Pro
65                  70                  75                  80

Thr Ala Asn Asp Val Tyr Val Trp Thr Asp Val Asn Gln Arg Thr Arg
            85                  90                  95

Lys Thr Gly Glu Ala Phe Leu Ala Gly Leu Ala Pro Glu Cys Asp Leu
            100                 105                 110

Thr Ile His His Gln Ser Asp Ile Lys Gln Ala Asp Pro Leu Phe His
            115                 120                 125

Pro Leu Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Ala Glu Leu Ala Leu Met Ser Asn Val Leu Asn Phe Pro Lys
            165                 170                 175

Ser Pro Tyr Cys Arg Gln His Ser Val Glu Gln Pro Cys Asp Phe Ala
            180                 185                 190

Asn Ala Phe Pro Ser Arg Leu Asn Ile Ser Asp Asp Gly Asn Glu Val
            195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Tyr
            245                 250                 255

Phe Asp Leu Met Glu Arg Thr Pro Tyr Ile Ala Lys His Gln Gly Thr
            260                 265                 270

Pro Leu Leu Gln Thr Ile Val Asn Ala Leu Asn Ser Asn Thr Thr Ala
```

-continued

```
                    275                 280                 285

Arg Glu Leu Pro Asp Ile Ser Pro Asp Val Lys Ile Leu Phe Leu Ala
    290                 295                 300

Gly His Asp Thr Asn Ile Ala Asn Ile Ala Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
                340                 345                 350

Lys Met Val Tyr Gln Thr Leu Ala Gln Leu Arg Asn Gln Thr Pro Leu
                355                 360                 365

Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Asp Thr Phe Thr Arg
385                 390                 395                 400

Leu Val Asn Arg Val Val Glu Pro Ala Cys Gln Leu Pro
                405                 410
```

```
<210> SEQ ID NO 19
<211> LENGTH: 413
<212> TYPE: PRT
<213> ORGANISM: artificial sequence
<220> FEATURE:
<223> OTHER INFORMATION: PHY-13713

<400> SEQUENCE: 19

Ser Glu Ala Ala Pro Ala Gly Tyr His Leu Gln Lys Ala Val Ile Leu
1               5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
                35                  40                  45

Ile Thr Pro Arg Gly Glu His Leu Val Ser Leu Met Gly Gly Phe Tyr
    50                  55                  60

Arg Gln Tyr Phe Gln Gln Gln Gly Leu Leu Ser Arg Asp Arg Cys Pro
65                  70                  75                  80

Thr Pro Asp Ala Val Tyr Val Trp Thr Asp Val Asn Gln Arg Thr Arg
                85                  90                  95

Lys Thr Gly Glu Ala Phe Leu Ala Gly Leu Ala Pro Glu Cys Asp Leu
                100                 105                 110

Thr Ile His His Gln Asn Asp Ile His Gln Val Asp Pro Leu Phe His
                115                 120                 125

Pro Val Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Gln Arg His Ser Val Asp Lys Pro Cys Asp Phe Ala
                180                 185                 190

Gln Met Met Pro Ser Tyr Leu Asn Ile Ser Asp Asp Gly Asn Glu Val
                195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
```

-continued

```
225                 230                 235                 240

His Ser Glu Gln Glu Trp Asn Asp Leu Leu Lys Leu His Asn Ala His
                245                 250                 255

Phe Asp Leu Met Glu Arg Thr Pro Tyr Ile Ala Lys His Gln Gly Thr
                260                 265                 270

Pro Leu Leu Gln Thr Ile Val Asn Ala Leu Asn Ser Asn Thr Thr Glu
                275                 280                 285

Ser Lys Leu Pro Asp Ile Ser Pro Asp Val Lys Ile Leu Phe Leu Ala
                290                 295                 300

Gly His Asp Thr Asn Ile Ala Asn Ile Ala Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Ala Gly Thr Gln Tyr Val Ser Val
                340                 345                 350

Lys Met Val Tyr Gln Thr Leu Ala Gln Leu Arg Asn Gln Thr Pro Leu
                355                 360                 365

Thr Leu Lys Glu Pro Ala Gly Ser Val Pro Leu Lys Ile Pro Gly Cys
                370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410

<210> SEQ ID NO 20
<211> LENGTH: 412
<212> TYPE: PRT
<213> ORGANISM: artificial sequence
<220> FEATURE:
<223> OTHER INFORMATION: PHY-13747

<400> SEQUENCE: 20

Ser Glu Ala Ala Pro Ser Gly Tyr His Leu Gln Lys Ala Val Ile Leu
1               5               10               15

Ser Arg His Gly Val Arg Ala Pro Thr Lys Met Thr Gln Leu Met Arg
                20               25               30

Asp Val Thr Pro Tyr Thr Trp Pro Glu Trp Pro Val Pro Leu Gly Tyr
                35               40               45

Ile Thr Pro Arg Gly Glu His Leu Val Ser Leu Met Gly Gly Phe Tyr
                50               55               60

Arg Gln Tyr Phe Gln Gln Gln Gly Leu Leu Ser Lys Asp Asn Cys Pro
65               70               75               80

Thr Ala Asn Asp Val Tyr Val Trp Thr Asp Val Asn Gln Arg Thr Arg
                85               90               95

Lys Thr Gly Glu Ala Phe Leu Ala Gly Leu Ala Pro Gln Cys Asp Leu
                100               105               110

Ala Ile His His Gln Asn Asp Ile Lys Gln Val Asp Pro Leu Phe His
                115               120               125

Pro Leu Lys Ala Gly Ile Cys Ser Met Asp Lys Thr Gln Val Gln Gln
                130               135               140

Ala Val Glu Lys Gln Ala Gly Met Pro Ile Asp Lys Leu Asn Gln His
145               150               155               160

Tyr Arg Pro Glu Leu Ala Leu Met Ser Asn Val Leu Asn Phe Pro Lys
                165               170               175

Ser Pro Tyr Cys Arg Arg His Ser Gly Glu Lys Pro Cys Asp Phe Ala
```

-continued

```
                180                 185                 190

Gln Met Met Pro Ser Lys Leu Asn Ile Ser Asp Asp Gly Asn Glu Val
            195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Glu Glu Trp Asn Asp Leu Leu Lys Leu His Asn Ala Tyr
                245                 250                 255

Phe Asp Leu Met Gln Arg Thr Pro Tyr Ile Ala Lys His Asn Gly Thr
                260                 265                 270

Pro Leu Met Gln Thr Ile Ser Asn Ala Leu Asn Pro Asn Ala Thr Glu
            275                 280                 285

Ser Lys Leu Pro Asp Ile Ser Pro Asp Asn Lys Ile Leu Phe Ile Ala
        290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
                340                 345                 350

Lys Met Val Tyr Gln Thr Leu Ala Gln Leu Arg Asn Gln Thr Pro Leu
            355                 360                 365

Thr Leu Lys Glu Pro Ala Gly Thr Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Ile
                405                 410
```

```
<210> SEQ ID NO 21
<211> LENGTH: 412
<212> TYPE: PRT
<213> ORGANISM: artificial sequence
<220> FEATURE:
<223> OTHER INFORMATION: PHY-13779

<400> SEQUENCE: 21
```

```
Ser Glu Ala Ala Pro Ala Gly Tyr His Leu Gln Lys Ala Val Ile Leu
1               5                   10                  15

Ser Arg His Gly Val Arg Ala Pro Thr Lys Met Thr Gln Thr Met Arg
            20                  25                  30

Asp Val Thr Pro His Gln Trp Pro Glu Trp Pro Val Pro Leu Gly Tyr
            35                  40                  45

Ile Thr Pro Arg Gly Glu His Leu Val Lys Leu Met Gly Gly Phe Tyr
        50                  55                  60

Arg Gln Tyr Phe Gln Gln Gln Gly Leu Leu Ser Lys Asp Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Glu Cys Asp Leu
            100                 105                 110

Thr Ile His His Gln Ser Asp Ile Lys Gln Val Asp Pro Leu Phe His
        115                 120                 125

Pro Leu Lys Ala Gly Ile Cys Ser Met Asp Lys Thr Gln Val Gln Gln
```

-continued

```
        130                135                140
Ala Val Glu Lys Gln Ala Gly Met Pro Ile Asp Glu Leu Asn Gln His
145                150                155                160

Tyr Arg Pro Glu Leu Ala Leu Met Ser Asn Val Leu Asn Phe Pro Lys
            165                170                175

Ser Pro Tyr Cys Gln Arg His Ser Gly Glu Gln Pro Cys Asp Phe Ala
            180                185                190

Asn Ala Phe Pro Ser Tyr Leu Asn Ile Ser Asp Asp Gly Asn Glu Val
            195                200                205

Gln Leu Glu Gly Ala Val Gly Leu Ser Ser Thr Leu Ala Glu Ile Phe
    210                215                220

Leu Leu Glu Tyr Ala Gln Gly Met Pro Val Val Ala Trp Gly Asn Ile
225                230                235                240

His Ser Glu Gln Glu Trp Asn Asp Leu Leu Lys Leu His Asn Ala Tyr
            245                250                255

Phe Asp Leu Met Gln Arg Thr Pro Tyr Ile Ala Lys His Asn Gly Thr
            260                265                270

Pro Leu Leu Gln Thr Ile Val Asn Ala Leu Asn Ser Asn Thr Thr Ala
            275                280                285

Arg Glu Leu Pro Asp Ile Ser Pro Asp Val Lys Ile Leu Phe Leu Ala
    290                295                300

Gly His Asp Thr Asn Ile Ala Asn Ile Gly Gly Met Leu Gly Met Thr
305                310                315                320

Trp Thr Leu Pro Gly Gln Pro Asp Asn Thr Pro Pro Gly Gly Ala Leu
            325                330                335

Leu Phe Glu Leu Trp Ser Asp Lys Ala Gly Thr Gln Tyr Val Ser Val
            340                345                350

His Met Val Tyr Gln Thr Leu Ala Gln Leu Arg Asn Met Thr Pro Leu
            355                360                365

Thr Leu Lys Glu Pro Ala Gly Thr Val Pro Leu Lys Ile Pro Gly Cys
    370                375                380

Asp Asp Gln Thr Ala Glu Gly Tyr Cys Pro Leu Asp Thr Phe Thr Arg
385                390                395                400

Leu Val Asn Gln Val Val Glu Pro Ala Cys Gln Ile
            405                410
```

```
<210> SEQ ID NO 22
<211> LENGTH: 413
<212> TYPE: PRT
<213> ORGANISM: artificial sequence
<220> FEATURE:
<223> OTHER INFORMATION: PHY-13789

<400> SEQUENCE: 22

Ser Glu Ala Ala Pro Ala Gly Tyr His Leu Gln Lys Ala Val Ile Leu
1                5                10                15

Ser Arg His Gly Val Arg Ala Pro Thr Lys Met Thr Gln Leu Met Arg
            20                25                30

Asp Val Thr Pro Tyr Thr Trp Pro Glu Trp Pro Val Pro Leu Gly Tyr
            35                40                45

Ile Thr Pro Arg Gly Glu His Leu Val Lys Leu Met Gly Gly Phe Tyr
    50                55                60

Arg Gln Tyr Phe Gln Gln Gln Gly Leu Leu Ser Arg Asp Asn Cys Pro
65                70                75                80

Thr Pro Asp Asp Val Tyr Val Trp Thr Asp Val Asn Gln Arg Thr Arg
```

-continued

```
                  85                    90                    95

Lys Thr Gly Glu Ala Phe Leu Ala Gly Leu Ala Pro Glu Cys Asp Leu
            100                   105                   110

Thr Ile His His Gln Ser Asp Ile Lys Gln Val Asp Pro Leu Phe His
            115                   120                   125

Pro Leu Lys Ala Gly Ile Cys Ser Met Asp Lys Thr Gln Val Gln Gln
        130                   135                   140

Ala Val Glu Lys Gln Ala Gly Met Pro Ile Asp Lys Leu Asn Gln His
145                   150                   155                   160

Tyr Arg Ala Glu Leu Ala Leu Met Ser Asn Val Leu Asn Phe Pro Lys
                165                   170                   175

Ser Pro Tyr Cys Gln Arg His Ser Gly Glu Gln Pro Cys Asp Phe Ala
            180                   185                   190

Gln Met Phe Pro Ser Tyr Leu Asn Ile Ser Asp Asp Gly Asn Glu Val
            195                   200                   205

Gln Leu Glu Gly Ala Val Gly Leu Ser Ser Thr Leu Ala Glu Ile Phe
        210                   215                   220

Leu Leu Glu Tyr Ala Gln Gly Met Pro Val Val Ala Trp Gly Asn Ile
225                   230                   235                   240

His Ser Glu Gln Glu Trp Asn Asp Leu Leu Lys Leu His Asn Ala Tyr
                245                   250                   255

Phe Asp Leu Met Glu Arg Thr Pro Tyr Ile Ala Lys His Asn Gly Thr
            260                   265                   270

Pro Leu Leu Gln Thr Ile Val Asn Ala Leu Asn Pro Asn Ala Thr Glu
            275                   280                   285

Ser Lys Leu Pro Asp Ile Ser Pro Asp Val Lys Ile Leu Phe Leu Ala
        290                   295                   300

Gly His Asp Thr Asn Ile Ala Asn Ile Gly Gly Met Leu Gly Met Asp
305                   310                   315                   320

Trp Thr Leu Pro Gly Gln Pro Asp Asn Thr Pro Pro Gly Gly Ala Leu
            325                   330                   335

Leu Phe Glu Leu Trp Ser Asp Lys Glu Gly Thr Gln Tyr Val Ser Val
            340                   345                   350

Lys Met Val Tyr Gln Thr Leu Ala Gln Leu Arg Asn Met Thr Pro Leu
            355                   360                   365

Thr Leu Lys Glu Pro Ala Gly Ser Val Pro Leu Lys Ile Pro Gly Cys
        370                   375                   380

Asp Asp Gln Thr Ala Glu Gly Tyr Cys Pro Leu Asp Thr Phe Thr Arg
385                   390                   395                   400

Leu Val Asn Gln Val Val Glu Pro Ala Cys Gln Leu Pro
                405                   410
```

```
<210> SEQ ID NO 23
<211> LENGTH: 413
<212> TYPE: PRT
<213> ORGANISM: artificial sequence
<220> FEATURE:
<223> OTHER INFORMATION: PHY-13798

<400> SEQUENCE: 23
```

```
Ser Glu Ala Ala Pro Ala Gly Tyr His Leu Gln Lys Ala Val Ile Leu
1                 5                     10                    15

Ser Arg His Gly Val Arg Ala Pro Thr Lys Met Thr Gln Thr Met Arg
            20                    25                    30

Asp Val Thr Pro Tyr Thr Trp Pro Glu Trp Pro Val Pro Leu Gly Tyr
```

-continued

```
                35                    40                    45

Ile Thr Pro Arg Gly Glu His Leu Val Lys Leu Met Gly Gly Phe Tyr
    50                    55                    60

Arg Gln Tyr Phe Gln Gln Gln Gly Leu Leu Ser Lys Asp Asn Cys Pro
65                    70                    75                    80

Thr Ala Asn Asp Val Tyr Val Trp Thr Asp Val Ala Gln Arg Thr Arg
                85                    90                    95

Lys Thr Gly Glu Ala Phe Leu Ala Gly Leu Ala Pro Glu Cys Asp Leu
                100                   105                   110

Thr Ile His His Gln Asn Asn Ile Ser Gln Val Asp Pro Leu Phe His
                115                   120                   125

Pro Val Lys Ala Gly Ile Cys Ser Met Asp Lys Thr Gln Val Gln Gln
    130                   135                   140

Ala Val Glu Lys Gln Ala Gly Met Pro Ile Asp Lys Leu Asn Gln His
145                   150                   155                   160

Tyr Arg Pro Glu Leu Ala Leu Met Ser Asn Val Leu Asn Phe Pro Lys
                165                   170                   175

Ser Pro Tyr Cys Gln Arg His Ser Gly Glu Lys Pro Cys Asp Phe Ala
                180                   185                   190

Gln Met Met Pro Ser Lys Leu Asn Ile Ser Asp Asp Gly Asn Glu Val
                195                   200                   205

Gln Leu Glu Gly Ala Val Gly Leu Ser Ser Thr Leu Ala Glu Ile Phe
    210                   215                   220

Leu Leu Glu Tyr Ala Gln Gly Met Pro Val Val Ala Trp Gly Asn Ile
225                   230                   235                   240

His Ser Glu Gln Glu Trp Asn Asp Leu Leu Lys Leu His Asn Ala His
                245                   250                   255

Phe Asp Leu Met Glu Arg Thr Pro Tyr Ile Ala Lys His Asn Gly Thr
                260                   265                   270

Pro Leu Leu Gln Ala Ile Ser Asn Ala Leu Asn Pro Asn Thr Thr Glu
                275                   280                   285

Ser Lys Leu Pro Asp Ile Ser Pro Asp Val Lys Ile Leu Phe Leu Ala
    290                   295                   300

Gly His Asp Thr Asn Ile Ala Asn Ile Gly Gly Met Leu Gly Met Thr
305                   310                   315                   320

Trp Thr Leu Pro Gly Gln Pro Asp Asn Thr Pro Pro Gly Gly Ala Leu
                325                   330                   335

Leu Phe Glu Leu Trp Arg Asp Lys Ala Gly Thr Gln Tyr Val Ser Val
                340                   345                   350

His Met Val Tyr Gln Thr Leu Ala Gln Leu Arg Asn Met Thr Pro Leu
                355                   360                   365

Thr Leu Lys Glu Pro Ala Gly Ser Val Pro Leu Lys Ile Pro Gly Cys
    370                   375                   380

Asp Asp Gln Thr Ala Glu Gly Tyr Cys Pro Leu Asp Thr Phe Thr Arg
385                   390                   395                   400

Leu Val Asn Gln Val Val Glu Pro Ala Cys Gln Leu Pro
                405                   410
```

<210> SEQ ID NO 24
<211> LENGTH: 413
<212> TYPE: PRT
<213> ORGANISM: artificial sequence
<220> FEATURE:
<223> OTHER INFORMATION: PHY-13868

```
<400> SEQUENCE: 24

Ser Asp Thr Ala Pro Ala Gly Phe Gln Leu Glu Lys Val Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Ile Ser Leu Met Gly Gly Phe Tyr
        50                  55                  60

Arg Gln Tyr Phe Gln Gln Gln Gly Leu Leu Ser Lys Asp Asn Cys Pro
65                  70                  75                  80

Thr Ala Asn Asp Val Tyr Val Trp Thr Asp Val Asp Gln Arg Thr Arg
                85                  90                  95

Lys Thr Gly Glu Ala Phe Leu Ala Gly Leu Ala Pro Glu Cys Asp Leu
            100                 105                 110

Thr Ile His His Gln Ser Asp Ile Lys Gln Ala Asp Pro Leu Phe His
            115                 120                 125

Pro Val Lys Ala Gly Ile Cys Ser Met Asp Lys Ser Gln Thr Tyr Glu
        130                 135                 140

Ala Val Glu Lys Gln Ala Gly Gly Pro Ile Glu Thr Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Arg Arg His Ser Gly Asp Lys Thr Cys Asp Phe Ala
            180                 185                 190

Asn Ala Phe Pro Ser Tyr Leu Asn Ile Ser Asp Asp Gly Asn Glu Val
            195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala His
                245                 250                 255

Phe Asp Leu Met Gln Arg Thr Pro Tyr Ile Ala Lys His Gln Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Val Lys Ile Leu Phe Leu Ala
        290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
            340                 345                 350

Glu Met Val Tyr Gln Thr Leu Ala Gln Leu Arg Asn Met Thr Pro Leu
            355                 360                 365

Thr Leu Lys Glu Pro Ala Gly Thr Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410
```

-continued

```
<210> SEQ ID NO 25
<211> LENGTH: 413
<212> TYPE: PRT
<213> ORGANISM: artificial sequence
<220> FEATURE:
<223> OTHER INFORMATION: PHY-13883

<400> SEQUENCE: 25

Ser Glu Ala Ala Pro Ser Gly Tyr Gln Leu Glu Lys Val Val Ile Leu
1               5                   10                  15

Ser Arg His Gly Val Arg Ala Pro Thr Lys Met Thr Gln Thr Met Arg
            20                  25                  30

Asp Val Thr Pro Tyr Thr Trp Pro Glu Trp Pro Val Pro Leu Gly Tyr
        35                  40                  45

Ile Thr Pro Arg Gly Glu His Leu Val Lys Leu Met Gly Gly Phe Tyr
    50                  55                  60

Arg Gln Tyr Phe Gln Gln Gln Gly Leu Leu Ser Arg Asp Asn Cys Pro
65                  70                  75                  80

Thr Ala Asn Asp Val Tyr Val Trp Thr Asp Val Asp Gln Arg Thr Arg
                85                  90                  95

Lys Thr Gly Glu Ala Phe Leu Ala Gly Leu Ala Pro Gly Cys Asp Leu
            100                 105                 110

Thr Ile His His Gln Asn Asn Ile Ser Gln Ala Asp Pro Leu Phe His
        115                 120                 125

Pro Val Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Ala Glu Leu Ala Leu Met Ser Asn Val Leu Asn Phe Pro Lys
                165                 170                 175

Ser Pro Tyr Cys Arg Gln His Ser Val Glu Gln Pro Cys Asp Phe Ala
            180                 185                 190

Asn Ala Phe Pro Ser Tyr Leu Asn Ile Ser Asp Asp Gly Asn Glu Val
            195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Ala Leu Leu Lys Leu His Asn Ala His
                245                 250                 255

Phe Asp Leu Met Gln Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
            275                 280                 285

Arg Glu Leu Pro Asp Ile Ser Pro Asp Val Lys Ile Leu Phe Leu Ala
    290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
            325                 330                 335

Leu Phe Glu Leu Trp Arg Asp Lys Asp Gly Thr Gln Tyr Val Ser Val
            340                 345                 350

His Met Val Tyr Gln Thr Leu Ala Gln Leu Arg Asn Met Thr Pro Leu
            355                 360                 365
```

-continued

```
Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410

<210> SEQ ID NO 26
<211> LENGTH: 413
<212> TYPE: PRT
<213> ORGANISM: artificial sequence
<220> FEATURE:
<223> OTHER INFORMATION: PHY-13885

<400> SEQUENCE: 26

Ser Glu Ala Ala Pro Ser Gly Tyr His Leu Asp Lys Ala Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
        35                  40                  45

Ile Thr Pro Arg Gly Glu His Leu Val Ser Leu Met Gly Gly Phe Tyr
    50                  55                  60

Arg Gln Tyr Phe Gln Gln Gln Gly Leu Leu Ser Arg Asp Arg Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Glu Cys Asp Leu
            100                 105                 110

Thr Ile His His Gln Asn Asp Ile Lys Gln Val Asp Pro Leu Phe His
            115                 120                 125

Pro Leu Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Arg Gln His Ser Val Glu Gln Pro Cys Asp Phe Ala
            180                 185                 190

Asn Ala Phe Pro Ser Tyr Leu Asn Ile Ser Asp Asp Gly Asn Glu Val
            195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Gln Gly Thr
            260                 265                 270

Pro Leu Leu Gln Thr Ile Val Asn Ala Leu Asn Ser Asn Thr Thr Glu
    275                 280                 285

Ser Lys Leu Pro Asp Ile Ser Pro Ser Val Lys Ile Leu Phe Leu Ala
    290                 295                 300

Gly His Asp Thr Asn Ile Ala Asn Ile Gly Gly Met Leu Gly Met Thr
305                 310                 315                 320
```

-continued

```
Trp Thr Leu Pro Gly Gln Pro Asp Asn Thr Pro Pro Gly Gly Ala Leu
            325                 330             335

Leu Phe Glu Leu Trp Ser Asp Lys Asp Gly Thr Gln Tyr Val Ser Val
            340                 345             350

Lys Met Val Tyr Gln Thr Leu Ala Gln Leu Arg Asn Met Thr Pro Leu
            355                 360             365

Thr Leu Lys Glu Pro Ala Gly Ser Val Pro Leu Lys Ile Pro Gly Cys
        370             375             380

Asp Asp Gln Thr Ala Glu Gly Tyr Cys Pro Leu Asp Thr Phe Thr Arg
385             390             395                 400

Leu Val Asn Gln Val Val Glu Pro Ala Cys Gln Leu Pro
            405                 410
```

```
<210> SEQ ID NO 27
<211> LENGTH: 413
<212> TYPE: PRT
<213> ORGANISM: artificial sequence
<220> FEATURE:
<223> OTHER INFORMATION: PHY-13936

<400> SEQUENCE: 27
```

```
Ser Glu Ala Ala Pro Ala Gly Tyr His Leu Asp Lys Ala Val Ile Leu
1               5               10              15

Ser Arg His Gly Val Arg Ala Pro Thr Lys Met Thr Gln Thr Met Arg
            20              25              30

Asp Val Thr Pro Tyr Thr Trp Pro Glu Trp Pro Val Pro Leu Gly Tyr
            35              40              45

Ile Thr Pro Arg Gly Glu His Leu Val Lys Leu Met Gly Gly Phe Tyr
        50              55              60

Arg Gln Tyr Phe Gln Gln Gln Gly Leu Leu Pro Arg Asp Ser Cys Pro
65              70              75              80

Thr Ala Asn Asp Val Tyr Val Trp Thr Asp Val Asn Gln Arg Thr Arg
            85              90              95

Lys Thr Gly Glu Ala Phe Leu Ala Gly Leu Ala Pro Glu Cys Ala Ile
            100             105             110

Thr Ile His His Gln Ser Asp Ile Lys Gln Val Asp Pro Leu Phe His
            115             120             125

Pro Val Lys Ala Gly Ile Cys Ser Met Asp Lys Thr Gln Val Gln Gln
        130             135             140

Ala Val Glu Lys Gln Ala Gly Met Pro Ile Asp Lys Leu Asn Gln His
145             150             155             160

Tyr Arg Pro Glu Leu Ala Leu Met Ser Asn Val Leu Asn Phe Pro Lys
            165             170             175

Ser Pro Tyr Cys Gln Arg His Ser Gly Glu Gln Pro Cys Asp Phe Ala
            180             185             190

Asn Ala Phe Pro Ser Tyr Leu Asn Ile Ser Asp Asp Gly Asn Glu Val
            195             200             205

Gln Leu Glu Gly Ala Val Gly Leu Ser Ser Thr Leu Ala Glu Ile Phe
        210             215             220

Leu Leu Glu Tyr Ala Gln Gly Met Pro Val Val Ala Trp Gly Asn Ile
225             230             235             240

His Ser Glu Gln Glu Trp Asn Ala Leu Leu Lys Leu His Asn Ala His
            245             250             255

Phe Asp Leu Met Glu Arg Thr Pro Tyr Ile Ala Lys His Asn Gly Thr
            260             265             270
```

-continued

```
Pro Leu Leu Gln Thr Ile Val Asn Ala Leu Asn Ser Asn Thr Thr Glu
        275                 280                 285

Ser Lys Leu Pro Asp Ile Ser Pro Ser Val Lys Ile Leu Phe Leu Ala
        290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
                340                 345                 350

Glu Met Val Tyr Gln Thr Leu Ala Gln Leu Arg Asn Gln Thr Pro Leu
        355                 360                 365

Thr Leu Lys Glu Pro Ala Gly Ser Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410
```

```
<210> SEQ ID NO 28
<211> LENGTH: 412
<212> TYPE: PRT
<213> ORGANISM: artificial sequence
<220> FEATURE:
<223> OTHER INFORMATION: PHY-14004

<400> SEQUENCE: 28

Ala Glu Glu Ala Asn Gly Met Lys Leu Gln Lys Ala Val Ile Leu Ser
1               5                   10                  15

Arg His Gly Val Arg Ala Pro Thr Lys Met Thr Gln Leu Met Arg Asp
                20                  25                  30

Val Thr Pro Tyr Thr Trp Pro Glu Trp Pro Val Pro Leu Gly Tyr Ile
            35                  40                  45

Thr Pro Arg Gly Glu His Leu Val Ser Leu Met Gly Gly Phe Tyr Arg
        50                  55                  60

Gln Tyr Phe Gln Gln Gln Gly Leu Leu Ser Arg Asp Ser Cys Pro Thr
65                  70                  75                  80

Ala Asn Asp Val Tyr Val Trp Thr Asp Val Asn Gln Arg Thr Arg Lys
                85                  90                  95

Thr Gly Glu Ala Phe Leu Ala Gly Leu Ala Pro Gly Cys Asp Leu Thr
                100                 105                 110

Ile His His Gln Asn Asp Ile Lys Gln Val Asp Pro Leu Phe His Pro
        115                 120                 125

Leu Lys Ala Gly Ile Cys Ser Met Asp Lys Thr Gln Val Gln Gln Ala
        130                 135                 140

Val Glu Lys Gln Ala Gly Met Pro Ile Asp Lys Leu Asn Gln His Tyr
145                 150                 155                 160

Arg Pro Glu Leu Ala Leu Met Ser Asn Val Leu Asn Phe Pro Lys Ser
                165                 170                 175

Pro Tyr Cys Gln Arg His Ser Gly Glu Gln Pro Cys Asp Phe Ala Asn
                180                 185                 190

Met Phe Pro Ser Tyr Leu Asn Ile Ser Asp Asp Gly Asn Glu Val Gln
        195                 200                 205

Leu Glu Gly Ala Val Gly Leu Ser Ser Thr Leu Ala Glu Ile Phe Leu
        210                 215                 220
```

```
Leu Glu Tyr Ala Gln Gly Met Pro Val Val Ala Trp Gly Asn Ile His
225                 230                 235                 240

Ser Glu Gln Glu Trp Asn Asp Leu Leu Lys Leu His Asn Ala Gln Phe
                245                 250                 255

Asp Leu Met Glu Arg Thr Pro Tyr Ile Ala Lys His Asn Gly Thr Pro
                260                 265                 270

Leu Leu Gln Thr Ile Val Asn Ala Leu Asn Ser Asn Thr Thr Ala Arg
                275                 280                 285

Glu Leu Pro Asp Ile Ser Pro Asp Val Lys Ile Leu Phe Leu Ala Gly
        290                 295                 300

His Asp Thr Asn Ile Ala Asn Ile Ala Gly Met Leu Gly Met Thr Trp
305                 310                 315                 320

Thr Leu Pro Gly Gln Pro Asp Asn Thr Pro Pro Gly Gly Ala Leu Leu
                325                 330                 335

Phe Glu Leu Trp Ser Asp Lys Asp Gly Thr Gln Tyr Val Ser Val His
                340                 345                 350

Met Val Tyr Gln Thr Leu Ala Gln Leu Arg Asn Gln Thr Pro Leu Thr
                355                 360                 365

Leu Lys Glu Pro Ala Gly Ser Val Pro Leu Lys Ile Pro Gly Cys Asp
        370                 375                 380

Asp Gln Thr Ala Glu Gly Tyr Cys Pro Leu Asp Thr Phe Thr Arg Leu
385                 390                 395                 400

Val Asn Gln Val Val Glu Pro Ala Cys Gln Leu Pro
                405                 410
```

```
<210> SEQ ID NO 29
<211> LENGTH: 413
<212> TYPE: PRT
<213> ORGANISM: artificial sequence
<220> FEATURE:
<223> OTHER INFORMATION: PHY-14215

<400> SEQUENCE: 29
```

```
Ser Glu Ala Ala Pro Ala Gly Tyr His Leu Gln Lys Ala Val Ile Leu
1               5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
                35                  40                  45

Ile Thr Pro Arg Gly Glu His Leu Val Ser Leu Met Gly Gly Phe Tyr
        50                  55                  60

Arg Gln Tyr Phe Gln Gln Gln Gly Leu Leu Ser Arg Asp Ser Cys Pro
65                  70                  75                  80

Thr Ala Asn Asp Val Tyr Val Trp Thr Asp Val Asp Gln Arg Thr Arg
                85                  90                  95

Lys Thr Gly Glu Ala Phe Leu Ala Gly Leu Ala Pro Gly Cys Asp Leu
                100                 105                 110

Ala Ile His His Gln Gln Asn Ile Thr Gln Val Asp Pro Leu Phe His
        115                 120                 125

Pro Leu Lys Ala Gly Ile Cys Ser Met Asp Lys Thr Gln Val Gln Gln
        130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175
```

-continued

```
Ser Pro Tyr Cys Arg Arg His Ser Gly Asp Lys Thr Cys Asp Phe Ala
            180                 185                 190

Asn Ala Phe Pro Ser Tyr Leu Asn Ile Ser Asp Asp Gly Asn Lys Val
            195                 200                 205

Ala Leu Asp Gly Ala Val Gly Leu Ser Ser Thr Leu Ala Glu Ile Phe
            210                 215                 220

Leu Leu Glu Tyr Ala Gln Gly Met Pro Val Val Ala Trp Gly Asn Ile
225                 230                 235                 240

His Ser Glu Ser Gln Trp Lys Ser Leu Leu Asn Leu His Asn Ala His
                245                 250                 255

Phe Asn Leu Met Gln Arg Thr Pro Tyr Ile Ala Lys His Asn Gly Thr
            260                 265                 270

Pro Leu Leu Gln Thr Ile Val Asn Ala Leu Asn Pro Asn Ala Thr Glu
            275                 280                 285

Ser Lys Leu Pro Asp Ile Ser Pro Asp Asn Lys Ile Leu Phe Leu Ala
            290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Arg Asp Lys Glu Gly Thr Gln Tyr Val Ser Val
            340                 345                 350

Glu Met Val Tyr Gln Thr Leu Ala Gln Leu Arg Asn Gln Thr Pro Leu
            355                 360                 365

Thr Leu Lys Glu Pro Ala Gly Ser Val Pro Leu Lys Ile Pro Gly Cys
            370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410
```

```
<210> SEQ ID NO 30
<211> LENGTH: 413
<212> TYPE: PRT
<213> ORGANISM: artificial sequence
<220> FEATURE:
<223> OTHER INFORMATION: PHY-14256

<400> SEQUENCE: 30
```

```
Ser Asp Thr Ala Pro Ala Gly Tyr Gln Leu Asp Lys Ala Val Ile Leu
1               5                   10                  15

Ser Arg His Gly Val Arg Ala Pro Thr Lys Met Thr Gln Leu Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Lys Leu Met Gly Gly Phe Tyr
            50                  55                  60

Arg Gln Tyr Phe Gln Gln Gln Gly Leu Leu Ser Lys Asp Asn Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gly Cys Asp Leu
            100                 105                 110

Thr Ile His His Gln Asn Asp Ile Lys Gln Ala Asp Pro Leu Phe His
            115                 120                 125
```

-continued

```
Pro Leu Lys Ala Gly Ile Cys Ser Met Asp Lys Thr Gln Val Gln Gln
    130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Gln Arg His Ser Val Asp Lys Pro Cys Asp Phe Ala
                180                 185                 190

Asn Ala Phe Pro Ser Tyr Leu Asn Ile Ser Asp Asp Gly Asn Glu Val
                195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Tyr
                245                 250                 255

Phe Asp Leu Met Gln Arg Thr Pro Tyr Ile Ala Lys His Gln Gly Thr
                260                 265                 270

Pro Leu Leu Gln Thr Ile Val Asn Ala Leu Asn Ser Asn Thr Thr Glu
    275                 280                 285

Ser Lys Leu Pro Asp Ile Ser Pro Asp Val Lys Ile Leu Phe Leu Ala
    290                 295                 300

Gly His Asp Thr Asn Ile Ala Asn Ile Ala Gly Met Leu Gly Met Asp
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
                340                 345                 350

Lys Met Val Tyr Gln Thr Leu Ala Gln Leu Arg Asn Gln Thr Pro Leu
                355                 360                 365

Thr Leu Lys Glu Pro Ala Gly Ser Val Pro Leu Lys Ile Pro Gly Cys
    370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Leu Pro
                405                 410
```

```
<210> SEQ ID NO 31
<211> LENGTH: 412
<212> TYPE: PRT
<213> ORGANISM: artificial sequence
<220> FEATURE:
<223> OTHER INFORMATION: PHY-14277

<400> SEQUENCE: 31
```

```
Ser Glu Ala Ala Pro Ala Gly Tyr His Leu Asp Lys Ala Val Ile Leu
1                   5                   10                  15

Ser Arg His Gly Val Arg Ala Pro Thr Lys Met Thr Gln Leu Met Arg
                20                  25                  30

Asp Val Thr Pro Tyr Thr Trp Pro Glu Trp Pro Val Pro Leu Gly Tyr
                35                  40                  45

Ile Thr Pro Arg Gly Glu His Leu Val Ser Leu Met Gly Gly Phe Tyr
    50                  55                  60

Arg Gln Tyr Phe Gln Gln Gln Gly Leu Leu Pro Lys Asp Asn Cys Pro
65                  70                  75                  80
```

-continued

```
Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Glu Cys Asp Leu
                100                 105                 110

Thr Ile His His Gln Asn Asp Ile Lys Gln Val Asp Pro Leu Phe His
                115                 120                 125

Pro Val Lys Ala Gly Ile Cys Ser Met Asp Lys Thr Gln Val Gln Gln
        130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Arg Arg His Ser Gly Asp Lys Thr Cys Asp Phe Ala
                180                 185                 190

Asn Ala Phe Pro Ser Tyr Leu Asn Ile Ser Asp Asp Gly Asn Glu Val
                195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Gln Gly Thr
                260                 265                 270

Pro Leu Leu Gln Thr Ile Val Asn Ala Leu Asn Ser Asn Thr Thr Glu
        275                 280                 285

Ser Lys Leu Pro Asp Ile Ser Pro Asp Val Lys Ile Leu Phe Leu Ala
        290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
                340                 345                 350

Lys Met Val Tyr Gln Thr Leu Ala Gln Leu Arg Asn Met Thr Pro Leu
                355                 360                 365

Thr Leu Lys Glu Pro Ala Gly Thr Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400

Leu Val Asn Gln Val Val Glu Pro Ala Cys Gln Ile
                405                 410
```

```
<210> SEQ ID NO 32
<211> LENGTH: 412
<212> TYPE: PRT
<213> ORGANISM: artificial sequence
<220> FEATURE:
<223> OTHER INFORMATION: PHY-14473

<400> SEQUENCE: 32

Ala Glu Glu Gln Asn Gly Met Lys Leu Gln Lys Ala Val Ile Leu Ser
1               5                   10                  15

Arg His Gly Val Arg Ala Pro Thr Lys Met Thr Gln Leu Met Arg Asp
                20                  25                  30
```

-continued

```
Val Thr Pro Tyr Thr Trp Pro Glu Trp Pro Val Pro Leu Gly Tyr Ile
        35              40              45

Thr Pro Arg Gly Glu His Leu Val Ser Leu Met Gly Gly Phe Tyr Arg
    50              55              60

Gln Tyr Phe Gln Gln Gln Gly Leu Leu Ser Arg Asp Arg Cys Pro Thr
65              70              75              80

Ala Asn Asp Val Tyr Val Trp Thr Asp Val Asn Gln Arg Thr Arg Lys
                85              90              95

Thr Gly Glu Ala Phe Leu Ala Gly Leu Ala Pro Glu Cys Ala Ile Thr
            100             105             110

Ile His His Gln Ser Asp Ile Lys Gln Val Asp Pro Leu Phe His Pro
            115             120             125

Val Lys Ala Gly Ile Cys Ser Met Asp Lys Thr Gln Val Gln Gln Ala
    130             135             140

Val Glu Lys Gln Ala Gly Met Pro Ile Asp Lys Leu Asn Gln His Tyr
145             150             155             160

Arg Pro Glu Leu Ala Leu Met Ser Asn Val Leu Asn Phe Pro Lys Ser
            165             170             175

Pro Tyr Cys Arg His Gln Ser Gly Asp Lys Thr Cys Asp Phe Ala Asn
            180             185             190

Ala Phe Pro Ser Tyr Leu Asn Ile Ser Asp Asp Gly Asn Glu Val Gln
            195             200             205

Leu Glu Gly Ala Val Gly Leu Ser Ser Thr Leu Ala Glu Ile Phe Leu
    210             215             220

Leu Glu Tyr Ala Gln Gly Met Pro Val Val Ala Trp Gly Asn Ile His
225             230             235             240

Ser Glu Gln Glu Trp Asn Asp Leu Leu Lys Leu His Asn Ala Gln Phe
            245             250             255

Asp Leu Met Glu Arg Thr Pro Tyr Ile Ala Lys His Asn Gly Thr Pro
            260             265             270

Leu Leu Gln Thr Ile Val Asn Ala Leu Asn Ser Asn Thr Thr Glu Ser
    275             280             285

Lys Leu Pro Asp Ile Ser Pro Asp Val Lys Ile Leu Phe Leu Ala Gly
    290             295             300

His Asp Thr Asn Ile Ala Asn Ile Gly Gly Met Leu Gly Met Thr Trp
305             310             315             320

Thr Leu Pro Gly Gln Pro Asp Asn Thr Pro Pro Gly Gly Ala Leu Leu
            325             330             335

Phe Glu Leu Trp Ser Asp Lys Glu Gly Thr Gln Tyr Val Ser Val Lys
            340             345             350

Met Val Tyr Gln Thr Leu Ala Gln Leu Arg Asn Gln Thr Pro Leu Thr
            355             360             365

Leu Lys Glu Pro Ala Gly Ser Val Pro Leu Lys Ile Pro Gly Cys Asp
    370             375             380

Asp Gln Thr Ala Glu Gly Tyr Cys Pro Leu Asp Thr Phe Thr Arg Leu
385             390             395             400

Val Asn Gln Val Val Glu Pro Ala Cys Gln Leu Pro
            405             410
```

```
<210> SEQ ID NO 33
<211> LENGTH: 413
<212> TYPE: PRT
<213> ORGANISM: artificial sequence
<220> FEATURE:
```

<223> OTHER INFORMATION: PHY-14614

<400> SEQUENCE: 33

```
Ser Glu Ala Ala Pro Ser Gly Tyr His Leu Asp Lys Ala Val Ile Leu
1               5                   10                  15

Ser Arg His Gly Val Arg Ala Pro Thr Lys Met Thr Gln Thr Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
        50                  55                  60

Arg Gln Tyr Phe Gln Gln Gln Gly Leu Leu Ser Arg Asp Ser Cys Pro
65                  70                  75                  80

Thr Ala Asn Asp Val Tyr Val Trp Thr Asp Val Asn Gln Arg Thr Arg
                85                  90                  95

Lys Thr Gly Glu Ala Phe Leu Ala Gly Leu Ala Pro Gly Cys Asp Leu
            100                 105                 110

Thr Ile His His Gln Gln Asn Ile Thr Gln Val Asp Pro Leu Phe His
        115                 120                 125

Pro Val Lys Ala Gly Ile Cys Ser Met Asp Lys Thr Gln Val Gln Gln
        130                 135                 140

Ala Val Glu Lys Gln Ala Gly Met Pro Ile Asp Lys Leu Asn Gln His
145                 150                 155                 160

Tyr Arg Pro Glu Leu Ala Leu Met Ser Asn Val Leu Asn Phe Pro Lys
                165                 170                 175

Ser Pro Tyr Cys Gln Gln His Ser Val Asp Lys Pro Cys Asp Phe Ala
            180                 185                 190

Asn Met Phe Pro Ser Tyr Leu Asn Ile Ser Asp Asp Gly Asn Glu Val
            195                 200                 205

Gln Leu Glu Gly Ala Val Gly Leu Ser Ser Thr Leu Ala Glu Ile Phe
        210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Glu
            275                 280                 285

Ser Lys Leu Pro Asp Ile Ser Pro Asp Val Lys Ile Leu Phe Leu Ala
        290                 295                 300

Gly His Asp Thr Asn Ile Ala Asn Ile Ala Gly Met Leu Gly Met Asp
305                 310                 315                 320

Trp Thr Leu Pro Gly Gln Pro Asp Asn Thr Pro Pro Gly Gly Ala Leu
            325                 330                 335

Leu Phe Glu Leu Trp Ser Asp Lys Glu Gly Thr Gln Tyr Val Ser Val
            340                 345                 350

Lys Met Val Tyr Gln Thr Leu Ala Gln Leu Arg Asn Met Thr Pro Leu
            355                 360                 365

Thr Leu Lys Glu Pro Ala Gly Thr Val Pro Leu Lys Ile Pro Gly Cys
        370                 375                 380

Asp Asp Gln Thr Ala Glu Gly Tyr Cys Pro Leu Asp Thr Phe Thr Arg
385                 390                 395                 400
```

-continued

```
Leu Val Asn Gln Val Val Glu Pro Ala Cys Gln Leu Pro
            405             410

<210> SEQ ID NO 34
<211> LENGTH: 413
<212> TYPE: PRT
<213> ORGANISM: artificial sequence
<220> FEATURE:
<223> OTHER INFORMATION: PHY-14804

<400> SEQUENCE: 34

Ser Asp Thr Ala Pro Ala Gly Phe Gln Leu Asp Lys Ala Val Ile Leu
1               5                   10                  15

Ser Arg His Gly Val Arg Ala Pro Thr Lys Met Thr Gln Thr Met Arg
            20                  25                  30

Asp Val Thr Pro Tyr Thr Trp Pro Glu Trp Pro Val Pro Leu Gly Tyr
            35                  40                  45

Ile Thr Pro Arg Gly Glu His Leu Val Ser Leu Met Gly Gly Phe Tyr
        50                  55                  60

Arg Gln Tyr Phe Gln Gln Gln Gly Leu Leu Pro Arg Asp Asn Cys Pro
65                  70                  75                  80

Thr Ala Asn Asp Val Tyr Val Trp Thr Asp Val Asp Gln Arg Thr Arg
                85                  90                  95

Lys Thr Gly Glu Ala Phe Leu Ala Gly Leu Ala Pro Glu Cys Asp Leu
            100                 105                 110

Thr Ile His His Gln Ser Asp Ile Lys Gln Val Asp Pro Leu Phe His
        115                 120                 125

Pro Leu Lys Ala Gly Ile Cys Ser Met Asp Lys Thr Gln Val Gln Gln
        130                 135                 140

Ala Val Glu Lys Gln Ala Gly Met Pro Ile Asp Glu Leu Asn Gln His
145                 150                 155                 160

Tyr Arg Ala Glu Leu Ala Leu Met Ser Asn Val Leu Asn Phe Pro Lys
                165                 170                 175

Ser Pro Tyr Cys Gln Arg His Ser Gly Glu Gln Pro Cys Asp Phe Ala
            180                 185                 190

Asn Ala Phe Pro Ser Tyr Leu Asn Ile Ser Asp Asp Gly Asn Glu Val
        195                 200                 205

Gln Leu Glu Gly Ala Val Gly Leu Ser Ser Thr Leu Ala Glu Ile Phe
    210                 215                 220

Leu Leu Glu Tyr Ala Gln Gly Met Pro Val Val Ala Trp Gly Asn Ile
225                 230                 235                 240

His Ser Glu Gln Glu Trp Asn Asp Leu Leu Lys Leu His Asn Ala Gln
                245                 250                 255

Phe Asp Leu Met Glu Arg Thr Pro Tyr Ile Ala Lys His Asn Gly Thr
            260                 265                 270

Pro Leu Leu Gln Thr Ile Val Asn Ala Leu Asn Ser Asn Thr Thr Ala
        275                 280                 285

Arg Glu Leu Pro Asp Ile Ser Pro Asp Val Lys Ile Leu Phe Leu Ala
        290                 295                 300

Gly His Asp Thr Asn Ile Ala Asn Ile Gly Gly Met Leu Gly Met Thr
305                 310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Asp Gly Thr Gln Tyr Val Ser Val
            340                 345                 350
```

```
Lys Met Val Tyr Gln Thr Leu Ala Gln Leu Arg Asn Gln Thr Pro Leu
        355             360             365

Thr Leu Lys Glu Pro Ala Gly Ser Val Pro Leu Lys Ile Pro Gly Cys
    370             375             380

Asp Asp Gln Thr Ala Glu Gly Tyr Cys Pro Leu Asp Thr Phe Thr Arg
385             390             395             400

Leu Val Asn Gln Val Val Glu Pro Ala Cys Gln Leu Pro
            405             410

<210> SEQ ID NO 35
<211> LENGTH: 413
<212> TYPE: PRT
<213> ORGANISM: artificial sequence
<220> FEATURE:
<223> OTHER INFORMATION: PHY-14945

<400> SEQUENCE: 35

Ser Glu Ala Ala Pro Ala Gly Tyr His Leu Asp Lys Ala Val Ile Leu
1               5               10              15

Ser Arg His Gly Val Arg Ala Pro Thr Lys Met Thr Gln Thr Met Arg
            20              25              30

Asp Val Thr Pro Tyr Thr Trp Pro Glu Trp Pro Val Pro Leu Gly Tyr
        35              40              45

Ile Thr Pro Arg Gly Glu His Leu Val Lys Leu Met Gly Gly Phe Tyr
    50              55              60

Arg Glu Arg Phe Gln Gln Gln Gly Leu Leu Ser Arg Asp Ser Cys Pro
65              70              75              80

Thr Ala Asn Asp Val Tyr Val Trp Thr Asp Val Asn Gln Arg Thr Arg
                85              90              95

Lys Thr Gly Glu Ala Phe Leu Ala Gly Leu Ala Pro Glu Cys Ala Ile
            100             105             110

Thr Ile His His Gln Ser Asp Ile Lys Gln Val Asp Pro Leu Phe His
        115             120             125

Pro Val Lys Ala Gly Ile Cys Ser Met Asp Lys Thr Gln Val Gln Gln
    130             135             140

Ala Val Glu Lys Gln Ala Gly Met Pro Ile Asp Lys Leu Asn Gln His
145             150             155             160

Tyr Arg Pro Glu Leu Ala Leu Met Ser Asn Val Leu Asn Phe Pro Lys
            165             170             175

Ser Pro Tyr Cys Gln Arg His Ser Gly Glu Gln Pro Cys Asp Phe Ala
            180             185             190

Asn Ala Phe Pro Ser Lys Leu Asn Ile Ser Asp Asp Gly Asn Glu Val
        195             200             205

Gln Leu Glu Gly Ala Val Gly Leu Ser Ser Thr Leu Ala Glu Ile Phe
    210             215             220

Leu Leu Glu Tyr Ala Gln Gly Met Pro Val Val Ala Trp Gly Asn Ile
225             230             235             240

His Ser Glu Gln Glu Trp Asn Asp Leu Leu Lys Leu His Asn Ala His
            245             250             255

Phe Asp Leu Met Glu Arg Thr Pro Tyr Ile Ala Lys His Asn Gly Thr
            260             265             270

Pro Leu Leu Gln Thr Ile Val Asn Ala Leu Asn Ser Asn Thr Thr Ala
        275             280             285

Arg Glu Leu Pro Asp Ile Ser Pro Asp Val Lys Ile Leu Phe Leu Ala
    290             295             300
```

-continued

```
Gly His Asp Thr Asn Ile Ala Asn Ile Gly Gly Met Leu Gly Met Thr
305                     310                 315                 320

Trp Thr Leu Pro Gly Gln Pro Asp Asn Thr Pro Pro Gly Gly Ala Leu
                325                 330                 335

Leu Phe Glu Leu Trp Ser Asp Lys Glu Gly Thr Gln Tyr Val Ser Val
                340                 345                 350

Lys Met Val Tyr Gln Thr Leu Ala Gln Leu Arg Asn Gln Thr Pro Leu
                355                 360                 365

Thr Leu Lys Glu Pro Ala Gly Ser Val Pro Leu Lys Ile Pro Gly Cys
        370                 375                 380

Asp Asp Gln Thr Ala Glu Gly Tyr Cys Pro Leu Asp Thr Phe Thr Arg
385                     390                 395                 400

Leu Val Asn Gln Val Val Glu Pro Ala Cys Gln Leu Pro
                405                 410
```

```
<210> SEQ ID NO 36
<211> LENGTH: 412
<212> TYPE: PRT
<213> ORGANISM: artificial sequence
<220> FEATURE:
<223> OTHER INFORMATION: PHY-15459

<400> SEQUENCE: 36
```

```
Ala Glu Pro Gln Asn Gly Met Lys Leu Asp Lys Ala Val Ile Leu Ser
1                   5                   10                  15

Arg His Gly Val Arg Ala Pro Thr Lys Met Thr Gln Thr Met Arg Asp
                20                  25                  30

Val Thr Pro Tyr Thr Trp Pro Glu Trp Pro Val Pro Leu Gly Tyr Ile
                35                  40                  45

Thr Pro Arg Gly Glu His Leu Val Ser Leu Met Gly Gly Phe Tyr Arg
        50                  55                  60

Gln Tyr Phe Gln Gln Gln Gly Ile Leu Ser Lys Asp Arg Cys Pro Arg
65                  70                  75                  80

Ala Asn Asp Val Tyr Val Trp Thr Asp Val Asp Gln Arg Thr Arg Lys
                85                  90                  95

Thr Gly Glu Ala Phe Leu Ala Gly Leu Ala Pro Gln Cys Pro Leu Thr
                100                 105                 110

Ile His His Gln Asn Asp Ile Lys Gln Val Asp Pro Met Phe His Pro
        115                 120                 125

Val Lys Gly Gly Ile Cys Ser Met Asp Lys Thr Gln Val Gln Gln Ala
        130                 135                 140

Val Glu Lys Gln Ala Gly Met Pro Ile Asp Lys Leu Asn Asp His Tyr
145                 150                 155                 160

Arg Pro Glu Leu Ala Leu Met Ser Ala Val Leu Asn Phe Pro Ala Ser
                165                 170                 175

Pro Tyr Cys Gln Arg His Ser Gly Glu Gln Pro Cys Asp Phe Ala Gln
                180                 185                 190

Met Met Pro Ser Lys Leu Tyr Ile Thr Asp Asp Gly Asn Glu Val Gln
                195                 200                 205

Leu Glu Gly Ala Val Gly Leu Ser Ser Thr Leu Ala Glu Ile Phe Leu
        210                 215                 220

Leu Glu Tyr Ala Gln Gly Met Pro Val Val Ala Trp Gly Asn Ile His
225                 230                 235                 240

Ser Glu Gln Glu Trp Asn Ala Leu Leu Lys Leu His Asn Ala Tyr Phe
                245                 250                 255
```

-continued

```
Asp Leu Met Tyr Arg Thr Pro Tyr Ile Ala Lys His Asn Gly Thr Pro
            260             265             270

Leu Leu Gln Thr Ile Val Asn Ala Leu Asn Ser Asn Thr Thr Ala Arg
            275             280             285

Glu Leu Pro Asp Ile Ser Pro Asp Asn Arg Ile Leu Phe Leu Ala Gly
            290             295             300

His Asp Thr Asn Ile Ala Asn Ile Gly Gly Met Leu Gly Met Asp Trp
305             310             315             320

Thr Leu Pro Gly Gln Pro Asp Asn Thr Pro Pro Gly Gly Ala Leu Leu
            325             330             335

Phe Glu Leu Trp Ser Asp Lys Glu Gly Thr Gln Tyr Val Ser Val His
            340             345             350

Met Val Tyr Gln Thr Leu Ala Gln Leu Arg Asn Gln Thr Pro Leu Thr
            355             360             365

Leu Gln Glu Pro Ala Gly Thr Val Pro Leu Lys Ile Pro Ser Cys Asp
            370             375             380

Asp Gln Thr Ala Glu Gly Tyr Cys Pro Leu Asp Thr Phe Thr Lys Leu
385             390             395             400

Val Asn Gln Val Val Glu Pro Ala Cys Gln Ile Pro
            405             410
```

```
<210> SEQ ID NO 37
<211> LENGTH: 413
<212> TYPE: PRT
<213> ORGANISM: artificial sequence
<220> FEATURE:
<223> OTHER INFORMATION: PHY-16513

<400> SEQUENCE: 37

Ser Glu Ala Ala Pro Ser Gly Tyr His Leu Asp Lys Ala Val Ile Leu
1               5               10              15

Ser Arg His Gly Val Arg Ala Pro Thr Lys Met Thr Gln Thr Met Arg
            20              25              30

Asp Val Thr Pro Tyr Thr Trp Pro Glu Trp Pro Val Pro Leu Gly Tyr
            35              40              45

Ile Thr Pro Arg Gly Glu His Leu Val Ser Leu Met Gly Gly Phe Tyr
            50              55              60

Arg Gln Tyr Phe Gln Met Gln Gly Leu Leu Ser Arg Asp Arg Cys Pro
65              70              75              80

Asn Ala Asn Asp Val Tyr Val Trp Thr Asp Val Asp Gln Arg Thr Arg
            85              90              95

Lys Thr Gly Glu Ala Phe Leu Arg Gly Leu Ala Pro Glu Cys Asp Leu
            100             105             110

Thr Ile His His Gln Asn Asp Ile Lys Gln Val Asp Pro Met Phe His
            115             120             125

Pro Val Lys Gly Gly Ile Cys Ser Met Asp Lys Thr Gln Val Gln Gln
            130             135             140

Ala Val Glu Lys Gln Ala Gly Met Pro Ile Asp Lys Leu Asn Asp His
145             150             155             160

Tyr Arg Pro Glu Leu Ala Leu Met Ser Ala Val Leu Asn Phe Pro Ala
            165             170             175

Ser Pro Tyr Cys Gln Gln His Ser Val Asp Lys Pro Cys Asp Phe Ala
            180             185             190

Asn Ala Phe Pro Ser Lys Leu Asn Ile Thr Asp Asp Gly Asn Glu Val
            195             200             205
```

```
Ala Leu Asp Gly Ala Val Gly Leu Ser Ser Thr Leu Ala Glu Ile Phe
    210             215             220

Leu Leu Glu Tyr Ala Gln Gly Met Pro Val Val Ala Trp Gly Asn Ile
225             230             235             240

His Asn Glu Ser Gln Trp Lys Ser Leu Leu Asn Leu His Asn Ala His
            245             250             255

Phe Asn Leu Met His Arg Thr Pro Tyr Ile Ala Lys His Asn Gly Thr
            260             265             270

Pro Leu Leu Gln Thr Ile Val Asn Ala Leu Asn Ser Asn Thr Thr Ala
        275             280             285

Arg Glu Leu Pro Asp Ile Ser Pro Ser Val Lys Ile Leu Phe Leu Ala
    290             295             300

Gly His Asp Thr Asn Ile Ala Asn Ile Gly Gly Met Leu Gly Met Asp
305             310             315             320

Trp Thr Leu Pro Gly Gln Pro Asp Asn Thr Pro Pro Gly Gly Ala Leu
            325             330             335

Leu Phe Glu Leu Trp Ser Asp Lys Asp Gly Thr Gln Tyr Val Ser Val
            340             345             350

Lys Met Val Tyr Gln Thr Leu Ala Gln Leu Arg Asn Gln Thr Pro Leu
            355             360             365

Thr Leu Asn Glu Pro Ala Gly Thr Val Pro Leu Lys Ile Pro Ser Cys
    370             375             380

Asp Asp Gln Thr Ala Glu Gly Tyr Cys Pro Leu Asp Thr Phe Thr Val
385             390             395             400

Leu Val Asn Gln Val Val Glu Pro Ala Cys Gln Ile Pro
            405             410
```

DIET FORMULATIONS

CROSS-REFERENCE TO RELATED APPLICATIONS

This application is a U.S. National Stage Application under 35 U.S.C. § 371 of International Patent Application No. PCT/US2020/065892, filed Dec. 18, 2020, which claims priority to U.S. Provisional Patent Application No. 62/950, 747, filed Dec. 19, 2019 and U.S. Provisional Patent Application No. 63/075,972 filed Sep. 9, 2020, the disclosure of each are incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

The sequence listing provided in the file named 20191217_NB41781-US-PSP_Sequence Listing_ST25 with a size of 130 KB which was created on Dec. 17, 2019 and which is filed herewith, is incorporated by reference herein in its entirety.

STATEMENT REGARDING PRIOR DISCLOSURES BY THE INVENTOR OR A JOINT INVENTOR

Not applicable.

BACKGROUND OF THE INVENTION

Phytase is the most commonly used exogenous enzyme in feed for monogastric animals. Phytase can reduce the antinutritional effect of phytate and improve the digestibility of phosphorous, calcium, amino acids and energy, as well as reduce the negative impact of inorganic phosphorous excretion to the environment.

Phytate is the major storage form of phosphorus in cereals and legumes. However, monogastric animals such as pig, poultry and fish are not able to efficiently metabolize or absorb phytate (or phytic acid) in their diet and therefore it is excreted, leading to phosphorous pollution in areas of intense livestock production. Moreover, phytic acid also acts as an anti-nutritional agent in monogastric animals by chelating metal agents such as calcium, copper and zinc and forming insoluble complexes with proteins and amino acids in various segments of the digestive tract.

Through the action of exogenous phytase, phytate is generally hydrolysed to give lower inositol-phosphates and inorganic phosphate. Phytases are useful as additives to animal feeds where they improve the availability of organic phosphorus to the animal and decrease phosphate pollution of the environment (Wodzinski R J, Ullah A H. Adv Appl Microbiol. 42, 263-302 (1996)). Nevertheless, despite the action of supplied phytases in animal feed, in order to provide sufficient phosphates for growth and health of these animals, inorganic phosphorus must still be added to their diets, especially in young broilers from 0-10 days of age. Such addition can be costly and further increases pollution problems.

Accordingly, a need exists for the development of animal diets, particularly for poultry, that are substantially or completely inorganic phosphate free, while still ensuring normal growth characteristics in all growth phases compared to phytase-containing diets that are supplemented with sources of inorganic phosphate such as monocalcium phosphate and/or meat and bone meal.

FIELD

The field pertains to poultry diets containing no or substantially no or decreased inorganic phosphate and/or no meat bone meal as well as engineered phytase polypeptides and uses of the same for enhancing animal performance.

BRIEF SUMMARY OF THE INVENTION

Provided herein, inter alia, are animal diets containing phytases which are free or substantially free of exogenously added inorganic phosphate or contain substantially reduced exogenously added inorganic phosphate. When fed to poultry, these diets ensure normal growth during all phases of development compared to diets which contain inorganic phosphate supplementation.

Accordingly, in one aspect, provided herein is a poultry diet comprising (i) an engineered phytase polypeptide or a fragment thereof comprising phytase activity; and (ii) no or substantially no inorganic phosphorus. In some embodiments, said phytase polypeptide or a fragment thereof comprising phytase activity comprises at least 82% sequence identity with the amino acid sequence set forth in SEQ ID NO:1. In some embodiments, said phytase polypeptide comprises an amino acid sequence selected from the group consisting of SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID: NO:33, SEQ ID NO:34, SEQ ID NO:35, SEQ ID NO:36, and SEQ ID NO:37. In some embodiments of any of the embodiments disclosed herein, the diet further comprises one or more of (a) a direct fed microbial comprising at least one bacterial strain, (b) at least one other enzyme, and/or (c) an essential oil. In some embodiments of any of the embodiments disclosed herein, the engineered phytase polypeptide or fragment thereof is present in an amount of at least about 0.1 g/ton feed. In some embodiments of any of the embodiments disclosed herein, the diet further comprises calcium from about 0.62 to 0.72% in a starter diet, about 0.54 to 0.64% in a grower diet, and/or about 0.42 to 0.55% in a finisher diet. In some embodiments, the finisher diet comprises from about 0.46 to 0.55% calcium. In other embodiments, the finisher diet comprises from about 0.42 to 0.50% calcium. In some embodiments of any of the embodiments disclosed herein, the diet comprises amino acids (e.g., digestible lysine) from about 1.18 to 1.22% in a starter diet, about 1.06 to 1.10% in a grower diet, and/or about 0.88 to 1.0% in a finisher diet. In some embodiments, the finisher diet comprises from about 0.96 to 1.0% amino acids (e.g., digestible lysine). In other embodiments, the finisher diet comprises from about 0.88 to 0.92% amino acids (e.g., digestible lysine). In some embodiments of any of the embodiments disclosed herein, the diet comprises metabolizable energy from about 2824 to 2950 kcal/kg in a starter diet, about 2924 to 3050 kcal/kg in a grower diet, and/or about 2970 to 3120 kcal/kg in a finisher diet. In some embodiments, the finisher diet comprises from about 2970 to 3100 kcal/kg metabolizable energy. In other embodiments, the finisher diet comprises from about 2994 to 3120 kcal/kg metabolizable energy. In some embodiments of any of the embodiments disclosed herein, the diet comprises sodium from about 0.13 to 0.17% for all phases (starter, grower, and finisher diets). In some embodiments of any of the embodiments disclosed herein, the diet contains a phytate source comprising one or more of corn, wheat, soybean meal, rapeseed, rice and/or wheat bran. In some embodiments of any of the embodiments disclosed herein, the diet further comprises oat hulls. In some embodiments of any of the embodiments disclosed herein, the diet lacks meat and/or bone meal. In some embodiments of any of the embodiments disclosed herein, the diet further comprises one or more additional feed enzymes selected from the group consisting of a xylanase, a protease, an amylase, and a glucoamylase. In some embodiments of any of the embodiments disclosed herein, the diet is a starter diet. In some embodiments of any of the embodiments disclosed herein, the diet is a grower diet. In some embodiments of any of the embodiments disclosed herein, the diet is a finisher diet. In some embodiments of any of the embodiments disclosed herein, the poultry is a broiler or a layer.

In additional aspects, provided herein is a method for improving animal performance on one or more metrics comprising administering an effective amount of any of the diets disclosed herein to the animal. In some embodiments, the one or more metrics is selected from the group consisting of increased feed efficiency, increased weight gain, reduced feed conversion ratio, improved digestibility of nutrients or energy in a feed, improved nitrogen retention, improved ability to avoid the negative effects of necrotic enteritis, and improved immune response. In some embodiments of any of the embodiments disclosed herein, the animal is poultry. In some embodiments of any of the embodiments disclosed herein, the poultry is selected from the group consisting of turkeys, ducks, chickens, geese, pheasants, quail, and emus. In some embodiments, the chicken is selected from the group consisting of layers and broilers. In some embodiments, egg production in layers improves by up to 12.5% compared to egg production in layers that are fed an inorganic-phosphate free diet that is not supplemented by any of the phytases disclosed herein. In other embodiments, egg mass improves by up to 15.6% compared to egg mass from layers that are fed an inorganic-phosphate free diet that is not supplemented by any of the phytases disclosed herein.

BRIEF DESCRIPTION OF THE SEVERAL VIEWS OF THE DRAWING(S)

Figure 1B:
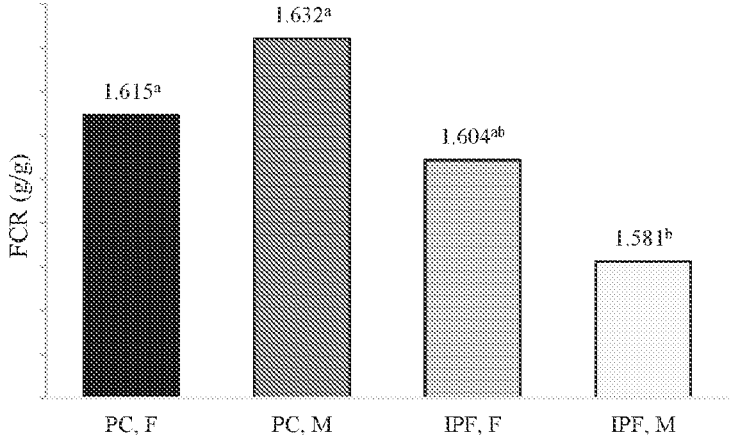

FIG. 1A and FIG. 1B are bar graphs depicting the interaction between diet (PC/IPF) and gender (F/M) in their effects on FCR (g/g) during (a) d 0 to 22 and (b) d 0 to 42. Mean values bearing different superscript letters are significantly different at $P < 0.05$; comparison of treatment means was performed by Tukey's Test. IPF=inorganic phosphate-free; F=female; M=male.

BRIEF DESCRIPTION OF THE SEQUENCES

The following sequences comply with 37 C.F.R. §§ 1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (2009) and the sequence listing requirements of the European Patent Convention (EPC) and the Patent Cooperation Treaty (PCT) Rules 5.2 and 49.5 (a-bis), and Section 208 and Annex C of the Administrative Instructions. The symbols and format used for nucleotide and amino acid sequence data comply with the rules set forth in 37 C.F.R. § 1.822.

SEQ ID NO:1 corresponds to the predicted mature sequence of engineered phytase PHY-13594.

SEQ ID NO:2 corresponds to the predicted mature sequence of engineered phytase PHY-10931.

SEQ ID NO:3 corresponds to the predicted mature sequence of engineered phytase PHY-10957.

SEQ ID NO:4 corresponds to the predicted mature sequence of engineered phytase PHY-11569.

SEQ ID NO:5 corresponds to the predicted mature sequence of engineered phytase PHY-11658.

SEQ ID NO:6 corresponds to the predicted mature sequence of engineered phytase PHY-11673.

SEQ ID NO:7 corresponds to the predicted mature sequence of engineered phytase PHY-11680.

SEQ ID NO:8 corresponds to the predicted mature sequence of engineered phytase PHY-11895.

SEQ ID NO:9 corresponds to the predicted mature sequence of engineered phytase PHY-11932.

SEQ ID NO:10 corresponds to the predicted mature sequence of engineered phytase PHY-12058.

SEQ ID NO:11 corresponds to the predicted mature sequence of engineered phytase PHY-12663.

SEQ ID NO:12 corresponds to the predicted mature sequence of engineered phytase PHY-12784.

SEQ ID NO:13 corresponds to the predicted mature sequence of engineered phytase PHY-13177.

SEQ ID NO:14 corresponds to the predicted mature sequence of engineered phytase PHY-13371

SEQ ID NO:15 corresponds to the predicted mature sequence of engineered phytase PHY-13460.

SEQ ID NO:16 corresponds to the predicted mature sequence of engineered phytase PHY-13513.

SEQ ID NO:17 corresponds to the predicted mature sequence of engineered phytase PHY-13637.

SEQ ID NO:18 corresponds to the predicted mature sequence of engineered phytase PHY-13705.

SEQ ID NO:19 corresponds to the predicted mature sequence of engineered phytase PHY-13713.

SEQ ID NO:20 corresponds to the predicted mature sequence of engineered phytase PHY-13747.

SEQ ID NO:21 corresponds to the predicted mature sequence of engineered phytase PHY-13779.

SEQ ID NO:22 corresponds to the predicted mature sequence of engineered phytase PHY-13789.

SEQ ID NO:23 corresponds to the predicted mature sequence of engineered phytase PHY-13798.

SEQ ID NO:24 corresponds to the predicted mature sequence of engineered phytase PHY-13868.

SEQ ID NO:25 corresponds to the predicted mature sequence of engineered phytase PHY-13883.

SEQ ID NO:26 corresponds to the predicted mature sequence of engineered phytase PHY-13885.

SEQ ID NO:27 corresponds to the predicted mature sequence of engineered phytase PHY-13936.

SEQ ID NO:28 corresponds to the predicted mature sequence of engineered phytase PHY-14004.

SEQ ID NO:29 corresponds to the predicted mature sequence of engineered phytase PHY-14215.

SEQ ID NO:30 corresponds to the predicted mature sequence of engineered phytase PHY-14256.

SEQ ID NO:31 corresponds to the predicted mature sequence of engineered phytase PHY-14277.

SEQ ID NO:32 corresponds to the predicted mature sequence of engineered phytase PHY-14473.

SEQ ID NO:33 corresponds to the predicted mature sequence of engineered phytase PHY-14614.

SEQ ID NO:34 corresponds to the predicted mature sequence of engineered phytase PHY-14804.

SEQ ID NO:35 corresponds to the predicted mature sequence of engineered phytase PHY-14945.

SEQ ID NO:36 corresponds to the predicted mature sequence of engineered phytase PHY-15459.

SEQ ID NO:37 corresponds to the predicted mature sequence of engineered phytase PHY-16513.

DETAILED DESCRIPTON OF THE INVENTION

There is a growing global sustainability awareness regarding the proper use of finite resources like inorganic phosphorus (P) and reduction of P pollution. While poultry has among the lowest environmental impact of all animal proteins, in commercial practice, it still uses significant amounts of inorganic phosphate. The inventors of the present application have surprisingly discovered that use of next generation biosynthetic bacterial 6-phytases in broiler diets can completely eliminate the need to supplement the diet with one or more sources of inorganic phosphate and/or can substantially reduce the need to supplement the diet with one or more sources of inorganic phosphate. All animals fed phytase-supplemented inorganic phosphate-free diets had comparable or better growth and feed conversion versus animals fed a diet containing exogenously added inorganic phosphate. Moreover, testing showed that these animals did not exhibit symptoms of bone loss or demineralization characteristic of animals experiencing phosphate deficiency. Rather, bone breaking strength of animals fed phytase supplemented inorganic phosphate-free diets did not deteriorate compared to the controls. This represents the first report to show a 100% vegetable total inorganic-free and commercially relevant broiler diet with normal growth characteristics in all growth phases. Consequently, use of the phytase supplemented inorganic phosphate-free diets disclosed herein provides both an economic advantage in the form of decreased costs of feed (particularly for large-scale industrial-sized flocks) as well as a significant environmental benefit due to decreased phosphate pollution as a byproduct of large-scale poultry production.

All patents, patent applications, and publications cited are incorporated herein by reference in their entirety.

In this disclosure, many terms and abbreviations are used. The following definitions apply unless specifically stated otherwise.

As used herein, the singular forms "a," "an," and "the" include plural references unless the context clearly dictates otherwise. For example, the term "a compound" or "at least one compound" may include a plurality of compounds, including mixtures thereof. The terms "a," "an," "the," "one or more," and "at least one," for example, can be used interchangeably herein.

The term "and/or" and "or" are used interchangeably herein and refer to a specific disclosure of each of the two specified features or components with or without the other. Thus, the term "and/or" as used in a phrase such "A and/or B" herein is intended to include "A and B," "A or B," "A" (alone), and "B" alone. Likewise, the term "and/or" as used a phrase such as "A, B and/or C" is intended to encompass each of the following aspects: A, B and C; A, B or C; A or C; A or B; B or C; A and C; A and B; B and C; A (alone); B (alone); and C (alone).

Words using the singular include the plural, and vice versa.

The terms "comprises," "comprising," "includes," "including," "having" and their conjugates are used interchangeably and mean "including but not limited to." It is understood that wherever aspects are described herein with the language "comprising," otherwise analogous aspects described in terms of "consisting of" and/or "consisting essentially of "are also provided.

The term "consisting of" means "including and limited to."

The term "consisting essentially of" means the specified material of a composition, or the specified steps of a methods, and those additional materials or steps that do not materially affect the basic characteristics of the material or method.

Throughout this application, various embodiments can be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range, such as from 1 to 6 should be considered to have specifically disclosed subranges such as from 1 to 2, from 1 to 3, from 1 to 4 and from 1 to 5, from 2 to 3, from 2 to 4, from 2 to 5, from 2 to 6, from 3 to 4, from 3 to 5, from 3 to 6, etc. as well as individual numbers within that range, for example, 1, 2, 3, 4, 5 and 6. This applies regardless of the breadth of the range.

The term "about" as used herein can allow for a degree of variability in a value or range, for example, within 10%, within 5%, or within 1% of a stated value or of a stated limit of a range.

The term "phytase" (myo-inositol hexakisphosphate phosphohydrolase) refers to a class of phosphatase enzymes that catalyzes the hydrolysis of phytic acid (myo-inositol hexakisphosphate or IP6)—an indigestible, organic form of phosphorus that is found in grains and oil seeds—and releases a usable form of inorganic phosphorus.

"Poultry" as used herein refers to birds such as turkeys, ducks, chicken, broiler chicks, and layers.

The reference book "Commercial Poultry Nutrition" (3rd edition, 2005, ISBN 0-9695600 May 2; incorporated by reference herein) is a standard textbook relating to the area of nutritional aspects of chicken production. Below is a summary considered relevant as a background for the present invention.

The major ingredients delivering energy in poultry diets are corn, soybean, soy oil and amino acids. Corn is a major contributor of metabolizable energy. The starch of the endosperm, which is mainly composed of amylopectin, and the germ which is mostly oil constitute the energy value of corn. Typical energy values of corn alone expressed in kcal/kg at 85% dry matter are ranging from 3014 to 3313. Energy levels of starter and grower diets are typically in the range of 3000 to 3100 Kcal/kg. In many countries, wheat is also commonly used in poultry diets. Such diets have similar energy levels as mentioned above. As a protein source soybean has become the worldwide standard against which other protein sources are compared. Its amino acid profile is excellent for most types of poultry, and when combined with corn or sorghum, methionine is usually the only factor in inadequate amounts. Additionally, fats and oils provide a concentrated source of energy in the diets and even relatively small changes in levels can have significant effects on diet ME. Finally, the diet is supplemented with synthetic amino acids such as methionine and lysine. Other important sources used are barley, sorghum and other cereals, and byproducts contributing to energy.

Chickens used in optimized commercial broiler production are typically fed different diets depending upon their age. For example, chickens for broiler production may be raised using three or four diets. These diets are typically called a "starter", "grower" and "finisher". "Pre-starter" diets are also possible. According, the engineered phytases disclosed herein may be included in a starter diet only, a grower diet only, a finisher diet only, a combination of any two or a combination of all phases at different dose levels— as long as they contain no or substantially no inorganic phosphate.

"Inorganic phosphorous" and "inorganic phosphate" are used interchangeably herein to denote dietary supplements commonly added to poultry feed to ensure the animal receives sufficient phosphate to satisfy the nutritional requirements of an animal. The poultry diets disclosed herein, however, contain no or substantially no inorganic phosphate when said diets also include the engineered phytase polypeptides disclosed herein at proper dose with diets containing sufficient phytate as substrate. The expression "substantially none" or "substantially no" as used herein to describe the amount of inorganic phosphate in the diet formulations disclosed herein, means that any amounts that are present are either trace amounts, amounts included unintentionally, and/or amounts that that are less than about 0.1% in the diets.

The "starter", "grower" and "finisher" diets are typically distinguished by crude protein content, which is often provided by ingredients such as soybean meal (SBM). For example, a starter diet for a broiler chicken may optionally contain crude protein contents of around 22-25% by weight, such as 22%, 23%, 24% or 25%, with 23 or 25% being preferred. In a further example, a grower diet for a broiler chicken may optionally contain crude protein contents of around 21-23% by weight, such as 21%, 22% or 23%, with 22% being preferred. In a further example, a finisher diet for a broiler chicken may optionally contain crude protein contents of around 19-23% by weight, such as 19%, 20%, 21%, 22% or 23%, with 19%, 20%, or 21% being preferred.

Additionally or alternatively, the "starter", "grower" and "finisher" may be distinguished by metabolizable energy (ME) content, which is typically lowest for the starter diet and highest for the finisher diet, with the grower diet having a level between the two. For example, a starter diet for a broiler chicken may have an ME of about 3000 or 3025 kcal/kg (+50, 40, 30, 20, 10, 5 or less kcal/kg). In a further example, a grower diet for a broiler chicken may have an ME of about 3100 or 3150 kcal/kg (+50, 40, 30, 20, 10, 5 or less kcal/kg). In a further example, a grower diet for a broiler chicken may have an ME of about 3200 kcal/kg (+50, 40, 30, 20, 10, 5 or less kcal/kg).

The poultry diets described herein may either be a vegetarian or non-vegetarian product. A vegetarian product contains no meat or fish products. A non-vegetarian diet may contain either, or both, fish product (such as fish meal) or meat product (such as meat derivatives or other non-inorganic phosphate-containing meat products).

The terms "mixer liquid application" and "MLA" are used interchangeably herein and refer to animal feed production wherein heat sensitive compounds, specifically, enzymes can be applied in a liquid form to animal feed prior to conditioning and pelleting and remain functional in the feed after conditioning and pelleting.

The terms "feed," an "animal feed," or "diet" are used interchangeably herein to mean any natural or artificial diet, meal or the like or components of such meals intended or suitable for being eaten, taken in, digested, by a non-human animal, respectively. Preferably term "feed" is used with reference to products that are fed to animals in the rearing of livestock.

A "feed additive" as used herein refers to one or more ingredients, products of substances (e.g., cells), used alone or together, in nutrition (e.g., to improve the quality of a food (e.g., an animal feed), to improve an animal's performance and/or health, and/or to enhance digestibility of a food or materials within a food.

As used herein, the term "food" is used in a broad sense—and covers food and food products in any form for humans as well as food for animals (i.e. a feed).

The food or feed may be in the form of a solution or as a solid-depending on the use and/or the mode of application and/or the mode of administration. In some embodiments, the enzymes mentioned herein may be used as—or in the preparation or production of—a food or feed substance.

As used herein the term "food or feed ingredient" includes a formulation, which is or can be added to foods or foodstuffs and includes formulations which can be used at low levels in a wide variety of products. The food ingredient may be in the form of a solution or as a solid-depending on the use and/or the mode of application and/or the mode of administration. The enzymes described herein may be used as a food or feed ingredient or in the preparation or production. The enzymes may be—or may not be added to—food supplements. Feed compositions for monogastric animals typically include compositions comprising plant products which contain phytate. Such compositions include, but are not limited to, cornmeal, soybean meal, rapeseed meal, cottonseed meal, maize, wheat, barley and sorghum-based feeds.

As used herein, the term "pelleting" refers to the production of pellets which can be solid, rounded, spherical and cylindrical tablets, particularly feed pellets and solid, extruded animal feed. One example of a known feed pelleting manufacturing process generally includes admixing together food or feed ingredients at least 1 minutes at room temperature, transferring the admixture to a surge bin, conveying the admixture to a steam conditioner (i.e., conditioning), optionally transferring the steam conditioned admixture to an expander, transferring the admixture to the pellet mill or extruder, and finally transferring the pellets into a pellet cooler. (Fairfield, D. 1994. Chapter 10, Pelleting Cost Center. In Feed Manufacturing Technology IV. (McEllhiney, editor), American Feed Industry Association, Arlington, Va., pp. 110-139).

The term "pellet" refers to a composition of animal feed (usually derived from grain) that has been subjected to a heat treatment, such as a steam treatment (i.e., conditioning), and pressed or extruded through a machine. The pellet may incorporate enzyme in the form of a liquid preparation or a dry preparation. The dry preparation may be coated or not coated and may be in the form of a granule. The term "granule" is used for particles composed of enzymes (such as a phytase, for example, any of the engineered phytase polypeptides disclosed herein) and other chemicals such as salts and sugars and may be formed using any of a variety of techniques, including fluid bed granulation approaches to form layered granules.

The term phytase activity in relation to determination in solid or liquid preparations means 1 FTU (phytase unit) which is defined as the amount of enzyme required to release 1 micromole of inorganic orthophosphate from a 5.0 mM Sodium phytate substrate (from rice) in one minute under the reaction conditions, pH 5.5 at 37° C., which are also defined in the ISO 2009 phytase assay-A standard assay for determining phytase activity found at International Standard ISO/DIS 30024:1-17, 2009.

Alternatively, as used herein one unit of phytase (U) can be defined as the quantity of enzyme that releases 1 micromole of inorganic orthophosphate from a 0.2 mM sodium phytate substrate (from rice) in one minute under the reaction conditions 25° C., at pH 5.5 or 3.5 respectively in a Malachite Green assay.

The term "specific activity" as used herein is the number of enzyme units per ml divided by the concentration of (total) protein in mg/ml. Specific activity values are therefore usually quoted as units/mg. Alternatively, specific activity is the number of enzyme units per ml divided by the concentration of phytase in mg/ml.

The term "differential scanning calorimetry" or "DSC" as used herein is a thermoanalytical technique in which the difference in the amount of heat required to increase the temperature of a sample and reference is measured as a function of temperature. Both the sample and reference are maintained at nearly the same temperature throughout the experiment. Generally, the temperature program for a DSC analysis is designed such that the sample holder temperature increases linearly as a function of time. The reference sample should have a well-defined heat capacity over the range of temperatures to be scanned.

The term "prebiotic" means a non-digestible food ingredient that beneficially affects the host by selectively stimulating the growth and/or the activity of one or a limited number of beneficial bacteria.

The term "direct-fed microbial" ("DFM") as used herein is source of live (viable) microorganisms that when applied in sufficient numbers can confer a benefit to the recipient thereof, i.e., a probiotic. A DFM can comprise one or more of such microorganisms such as bacterial strains. Categories of DFMs include *Bacillus*, Lactic Acid Bacteria and Yeasts. Thus, the term DFM encompasses one or more of the following: direct fed bacteria, direct fed yeast, direct fed yeast and combinations thereof.

*Bacilli* are unique, gram-positive rods that form spores. These spores are very stable and can withstand environmental conditions such as heat, moisture and a range of pH. These spores germinate into active vegetative cells when ingested by an animal and can be used in meal and pelleted diets. Lactic Acid Bacteria are gram-positive cocci that produce lactic acid which are antagonistic to pathogens. Since Lactic Acid Bacteria appear to be somewhat heat-sensitive, they are not used in pelleted diets. Types of Lactic Acid Bacteria include *Bifidobacterium, Lactobacillus* and *Streptococcus*.

The terms "probiotic," "probiotic culture," and "DFM" are used interchangeably herein and define live microorganisms (including bacteria or yeasts for example) which, when for example ingested or locally applied in sufficient numbers, beneficially affects the host organism, i.e. by conferring one or more demonstrable health benefits on the host organism such as a health, digestive, and/or performance benefit. Probiotics may improve the microbial balance in one or more mucosal surfaces. For example, the mucosal surface may be the intestine, the urinary tract, the respiratory tract or the skin. The term "probiotic" as used herein also encompasses live microorganisms that can stimulate the beneficial branches of the immune system and at the same time decrease the inflammatory reactions in a mucosal surface, for example the gut. Whilst there are no lower or upper limits for probiotic intake, it has been suggested that at least $10^6$-$10^{12}$, preferably at least $10^6$-$10^{10}$, preferably $10^8$-$10^9$, cfu as a daily dose will be effective to achieve the beneficial health effects in a subject.

The term "CFU" as used herein means "colony forming units" and is a measure of viable cells in which a colony represents an aggregate of cells derived from a single progenitor cell.

The term "isolated" means a substance in a form or environment that does not occur in nature and does not reflect the extent to which an isolate has been purified but indicates isolation or separation from a native form or native environment. Non-limiting examples of isolated substances include (1) any non-naturally occurring substance, (2) any substance including, but not limited to, any host cell, enzyme, engineered enzyme, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated. The terms "isolated nucleic acid molecule", "isolated polynucleotide", and "isolated nucleic acid fragment" will be used interchangeably and refer to a polymer of RNA or DNA that is single- or double-stranded, optionally containing synthetic, non-natural or altered nucleotide bases. An isolated nucleic acid molecule in the form of a polymer of DNA may be comprised of one or more segments of cDNA, genomic DNA or synthetic DNA.

The terms "purify," "purified," and purification mean to make substantially pure or clear from unwanted components, material defilement, admixture or imperfection. For example, as applied to nucleic acids or polypeptides, purification generally denotes a nucleic acid or polypeptide that is essentially free from other components as determined by analytical techniques well known in the art (e.g., a purified polypeptide or polynucleotide forms a discrete band in an electrophoretic gel, chromatographic eluate, and/or a media subjected to density gradient centrifugation). For example, a nucleic acid or polypeptide that gives rise to essentially one band in an electrophoretic gel is "purified." A purified nucleic acid or polypeptide is at least about 50% pure, usually at least about 60%, about 65%, about 70%, about 75%, about 80%, about 85%, about 90%, about 91%, about 92%, about 93%, about 94%, about 95%, about 96%, about 97%, about 98%, about 99%, about 99.5%, about 99.6%, about 99.7%, about 99.8% or more pure (e.g., percent by weight on a molar basis). In a related sense, a composition is enriched for a molecule when there is a substantial increase in the concentration of the molecule after application of a purification or enrichment technique. The term "enriched" refers to a compound, polypeptide, cell, nucleic acid, amino acid, or other specified material or component that is present in a composition at a relative or absolute concentration that is higher than a starting composition.

The terms "peptides", "proteins" and "polypeptides are used interchangeably herein and refer to a polymer of amino acids joined together by peptide bonds. A "protein" or "polypeptide" comprises a polymeric sequence of amino acid residues. The single and 3-letter code for amino acids as defined in conformity with the IUPAC-IUB Joint Commission on Biochemical Nomenclature (JCBN) is used throughout this disclosure. The single letter X refers to any of the twenty amino acids. It is also understood that a polypeptide may be coded for by more than one nucleotide sequence due to the degeneracy of the genetic code. Mutations can be named by the one letter code for the parent amino acid, followed by a position number and then the one letter code for the variant amino acid. For example, mutating glycine (G) at position 87 to serine(S) is represented as "G087S" or "G87S". When describing modifications, a position followed by amino acids listed in parentheses indicates a list of substitutions at that position by any of the listed amino acids. For example, 6(L, I) means position 6 can be substituted with a leucine or isoleucine. At times, in a sequence, a slash (/) is used to define substitutions, e.g. F/V, indicates that the position may have a phenylalanine or valine at that position.

As used herein with regard to amino acid residue positions, "corresponding to" or "corresponds to" or "correspond to" or "corresponds" refers to an amino acid residue at the enumerated position in a protein or peptide, or an amino acid residue that is analogous, homologous, or equivalent to an enumerated residue in a protein or peptide. As used herein, "corresponding region" generally refers to an analogous position in a related protein or a reference protein.

The terms "derived from" and "obtained from" refer to not only a protein produced or producible by a strain of the organism in question, but also a protein encoded by a DNA sequence isolated from such strain and produced in a host organism containing such DNA sequence. Additionally, the term refers to a protein which is encoded by a DNA sequence of synthetic and/or cDNA origin and which has the identifying characteristics of the protein in question.

The term "amino acid" refers to the basic chemical structural unit of a protein or polypeptide. The following abbreviations used herein to identify specific amino acids can be found in Table A.

TABLE A

One and Three Letter Amino Acid Abbreviations

| Amino Acid | Three-Letter Abbreviation | One-Letter Abbreviation |
|---|---|---|
| Alanine | Ala | A |
| Arginine | Arg | R |
| Asparagine | Asn | N |
| Thermostable serine acid | Asp | D |
| Cysteine | Cys | C |
| Glutamine | Gln | Q |
| Glutamic acid | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |
| Any amino acid or as defined herein | Xaa | X |

12

It would be recognized by one of ordinary skill in the art that modifications of amino acid sequences disclosed herein can be made while retaining the function associated with the disclosed amino acid sequences. For example, it is well known in the art that alterations in a gene which result in the production of a chemically equivalent amino acid at a given site, but do not affect the functional properties of the encoded protein are common.

The term "codon optimized", as it refers to genes or coding regions of nucleic acid molecules for transformation of various hosts, refers to the alteration of codons in the gene or coding regions of the nucleic acid molecules to reflect the typical codon usage of the host organism without altering the polypeptide for which the DNA codes.

The term "transformation" as used herein refers to the transfer or introduction of a nucleic acid molecule into a host organism. The nucleic acid molecule may be introduced as a linear or circular form of DNA. The nucleic acid molecule may be a plasmid that replicates autonomously, or it may integrate into the genome of a production host. Production hosts containing the transformed nucleic acid are referred to as "transformed" or "recombinant" or "transgenic" organisms or "transformants".

The terms "recombinant" and "engineered" refer to an artificial combination of two otherwise separated segments of nucleic acid sequences, e.g., by chemical synthesis or by the manipulation of isolated segments of nucleic acids by genetic engineering techniques. For example, DNA in which one or more segments or genes have been inserted, either naturally or by laboratory manipulation, from a different molecule, from another part of the same molecule, or an artificial sequence, resulting in the introduction of a new sequence in a gene and subsequently in an organism. The terms "recombinant", "transgenic", "transformed", "engineered", "genetically engineered" and "modified for exogenous gene expression" are used interchangeably herein.

The terms "recombinant construct", "expression construct", "recombinant expression construct" and "expression cassette" are used interchangeably herein. A recombinant construct comprises an artificial combination of nucleic acid fragments, e.g., regulatory and coding sequences that are not all found together in nature. For example, a construct may comprise regulatory sequences and coding sequences that are derived from different sources, or regulatory sequences and coding sequences derived from the same source but arranged in a manner different than that found in nature. Such a construct may be used by itself or may be used in conjunction with a vector. If a vector is used, then the choice of vector is dependent upon the method that will be used to transform host cells as is well known to those skilled in the art. For example, a plasmid vector can be used. The skilled artisan is well aware of the genetic elements that must be present on the vector in order to successfully transform, select and propagate host cells. The skilled artisan will also recognize that different independent transformation events may result in different levels and patterns of expression (Jones et al., (1985) *EMBO J* 4:2411-2418; De Almeida et al., (1989) *Mol Gen Genetics* 218:78-86), and thus that multiple events are typically screened to obtain lines displaying the desired expression level and pattern. Such screening may be accomplished using standard molecular biological, biochemical, and other assays including Southern analysis of DNA, Northern analysis of mRNA expression, PCR, real time quantitative PCR (qPCR), reverse transcription PCR (RT-PCR), immunoblotting analysis of protein expression, enzyme or activity assays, and/or phenotypic analysis.

The terms "production host", "host" and "host cell" are used interchangeably herein and refer to any plant, organism, or cell of any plant or organism, whether human or non-human into which a recombinant construct can be stably or transiently introduced to express a gene. This term encompasses any progeny of a parent cell, which is not identical to the parent cell due to mutations that occur during propagation.

The term "percent identity" is a relationship between two or more polypeptide sequences or two or more polynucleotide sequences, as determined by comparing the sequences. In the art, "identity" also means the degree of sequence relatedness between polypeptide or polynucleotide sequences, as the case may be, as determined by the number of matching nucleotides or amino acids between strings of such sequences. "Identity" and "similarity" can be readily calculated by known methods, including but not limited to those described in: *Computational Molecular Biology* (Lesk, A. M., ed.) Oxford University Press, NY (1988); *Biocomputing: Informatics and Genome Projects* (Smith, D. W., ed.) Academic Press, NY (1993); *Computer Analysis of Sequence Data, Part I* (Griffin, A. M., and Griffin, H. G., eds.) Humana Press, NJ (1994); *Sequence Analysis in Molecular Biology* (von Heinje, G., ed.) Academic Press (1987); and *Sequence Analysis Primer* (Gribskov, M. and Devereux, J., eds.) Stockton Press, NY (1991). Methods to determine identity and similarity are codified in publicly available computer programs.

As used herein, "% identity" or percent identity" or "PID" refers to protein sequence identity. Percent identity may be determined using standard techniques known in the art. Useful algorithms include the BLAST algorithms (See, Altschul et al., *J Mol Biol,* 215:403-410, 1990; and Karlin and Altschul, Proc Natl Acad Sci USA, 90:5873-5787, 1993). The BLAST program uses several search parameters, most of which are set to the default values. The NCBI BLAST algorithm finds the most relevant sequences in terms of biological similarity but is not recommended for query sequences of less than 20 residues (Altschul et al., *Nucleic Acids Res,* 25:3389-3402, 1997; and Schaffer et al., *Nucleic Acids Res,* 29:2994-3005, 2001). Exemplary default BLAST parameters for a nucleic acid sequence searches include: Neighboring words threshold=11; E-value cutoff=10; Scoring Matrix=NUC.3.1 (match=1, mismatch=−3); Gap Opening=5; and Gap Extension=2. Exemplary default BLAST parameters for amino acid sequence searches include: Word size=3; E-value cutoff=10; Scoring Matrix=BLOSUM62; Gap Opening=11; and Gap extension=1. A percent (%) amino acid sequence identity value is determined by the number of matching identical residues divided by the total number of residues of the "reference" sequence. BLAST algorithms refer to the "reference" sequence as the "query" sequence.

As used herein, "homologous proteins" or "homologous phytases" refers to proteins that have distinct similarity in primary, secondary, and/or tertiary structure. Protein homology can refer to the similarity in linear amino acid sequence when proteins are aligned. Homologous search of protein sequences can be done using BLASTP and PSI-BLAST from NCBI BLAST with threshold (E-value cut-off) at 0.001. (Altschul S F, Madde T L, Shaffer A A, Zhang J, Zhang Z, Miller W, Lipman D J. Gapped BLAST and PSI BLAST a new generation of protein database search programs. *Nucleic Acids Res* 1997 Set 1; 25 (17): 3389-402). Using this information, proteins sequences can be grouped.

Sequence alignments and percent identity calculations may be performed using the Megalign program of the LASERGENE bioinformatics computing suite (DNASTAR Inc., Madison, WI), the AlignX program of Vector NTI v. 7.0 (Informax, Inc., Bethesda, MD), or the EMBOSS Open Software Suite (EMBL-EBI; Rice et al., *Trends in Genetics* 16, (6): 276-277 (2000)). Multiple alignment of the sequences can be performed using the CLUSTAL method (such as CLUSTALW; for example, version 1.83) of alignment (Higgins and Sharp, *CABIOS,* 5:151-153 (1989); Higgins et al., *Nucleic Acids Res.* 22:4673-4680 (1994); and Chenna et al., *Nucleic Acids Res* 31 (13): 3497-500 (2003)), available from the European Molecular Biology Laboratory via the European Bioinformatics Institute) with the default parameters. Suitable parameters for CLUSTALW protein alignments include GAP Existence penalty=15, GAP extension=0.2, matrix=Gonnet (e.g., Gonnet250), protein END-GAP=−1, protein GAPDIST=4, and KTUPLE=1. In one embodiment, a fast or slow alignment is used with the default settings where a slow alignment. Alternatively, the parameters using the CLUSTALW method (e.g., version 1.83) may be modified to also use KTUPLE=1, GAP PENALTY=10, GAP extension=1, matrix=BLOSUM (e.g., BLOSUM64), WINDOW=5, and TOP DIAGONALS SAVED=5. Alternatively, multiple sequence alignment may be derived using MAFFT alignment from Geneious® version 10.2.4 with default settings, scoring matrix BLOSUM62, gap open penalty 1.53 and offset value 0.123.

The MUSCLE program (Robert C. Edgar. MUSCLE: multiple sequence alignment with high accuracy and high throughput *Nucl. Acids Res.* (2004) 32 (5): 1792-1797) is yet another example of a multiple sequence alignment algorithm.

A phylogenetic or evolutionary tree is depicted in FIG. 2 shows the relatedness among various phytases including the engineered phytase polypeptides and fragments thereof based upon similarities and differences in the amino acid sequence.

The term "engineered phytase polypeptide" means that the polypeptide is not naturally occurring and has phytase activity.

It is noted that a fragment of the engineered phytase polypeptide is a portion or subsequence of the engineered phytase polypeptide that is capable of functioning like the engineered phytase polypeptide, i.e., it retains phytase activity.

The term "vector" refers to a polynucleotide sequence designed to introduce nucleic acids into one or more cell types. Vectors include, but are not limited to, cloning vectors, expression vectors, shuttle vectors, plasmids, phage particles, cassettes and the like.

An "expression vector" as used herein means a DNA construct comprising a DNA sequence which is operably linked to a suitable control sequence capable of effecting expression of the DNA in a suitable host. Such control sequences may include a promoter to effect transcription, an optional operator sequence to control transcription, a sequence encoding suitable ribosome binding sites on the mRNA, enhancers and sequences which control termination of transcription and translation.

The term "expression", as used herein, refers to the production of a functional end-product (e.g., an mRNA or a protein) in either precursor or mature form. Expression may also refer to translation of mRNA into a polypeptide.

Expression of a gene involves transcription of the gene and translation of the mRNA into a precursor or mature protein. "Mature" protein refers to a post-translationally processed polypeptide; i.e., one from which any signal sequence, pre- or propeptides present in the primary translation product have been removed. "Precursor" protein refers to the primary product of translation of mRNA; i.e., with pre- and propeptides still present. Pre- and propeptides may be but are not limited to intracellular localization signals. "Stable transformation" refers to the transfer of a nucleic acid fragment into a genome of a host organism, including both nuclear and organellar genomes, resulting in genetically stable inheritance. In contrast, "transient transformation" refers to the transfer of a nucleic acid fragment into the nucleus, or DNA-containing organelle, of a host organism resulting in gene expression without integration or stable inheritance.

Thus, in one embodiment, there is described a recombinant construct comprising a regulatory sequence functional in a production host operably linked to a nucleotide sequence encoding an engineered phytase polypeptide and fragments thereof as described herein.

This recombinant construct may comprise a regulatory sequence functional in a production host operably linked to a nucleotide sequence encoding any of the engineered phytase polypeptide and fragments thereof described herein. Furthermore, the production host is selected from the group consisting of bacteria, fungi, yeast, plants or algae. The preferred production host is the filamentous fungus, *Trichoderma reesei*.

Alternatively, it may be possible to use cell-free protein synthesis as described in Chong, *Curr Protoc Mol Biol.* 2014; 108: 16.30.1-16.30.11.

Also described herein is a method for producing an engineered phytase polypeptide or fragment thereof comprising:

(a) transforming a production host with the recombinant construct described herein; and (b) culturing the production host of step (a) under conditions whereby the engineered phytase polypeptide or fragment thereof is produced.

Optionally, the engineered phytase polypeptide or fragment thereof may be recovered from the production host.

In another aspect, a phytase-containing culture supernatant can be obtained by any of the methods disclosed herein.

In another embodiment, there is described a polynucleotide sequence encoding any of the engineered phytase polypeptides or fragments thereof as described herein.

Possible initiation control regions or promoters that can be included in the expression vector are numerous and familiar to those skilled in the art. A "constitutive promoter" is a promoter that is active under most environmental and developmental conditions. An "inducible" or "repressible" promoter is a promoter that is active under environmental or developmental regulation. In some embodiments, promoters are inducible or repressible due to changes in environmental factors including but not limited to, carbon, nitrogen or other nutrient availability, temperature, pH, osmolarity, the presence of heavy metal(s), the concentration of inhibitor(s), stress, or a combination of the foregoing, as is known in the art. In some embodiments, the inducible or repressible promoters are inducible or repressible by metabolic factors, such as the level of certain carbon sources, the level of certain energy sources, the level of certain catabolites, or a combination of the foregoing as is known in the art.

In one embodiment, the promoter is one that is native to the host cell. For example, in some instances when *Trichoderma reesei* is the host, the promoter can be a native *T. reesei* promoter such as the cbh1 promoter which is deposited in GenBank under Accession Number D86235. Other suitable non-limiting examples of promoters useful for fungal expression include, cbh2, egl1, egl2, egl3, egl4, egl5, xyn1, and xyn2, repressible acid phosphatase gene (phoA) promoter of *P. chrysogenus* (see e.g., Graessle et al., (1997) *Appl. Environ. Microbiol.*, 63:753-756), glucose repressible PCK1 promoter (see e.g., Leuker et al., (1997), *Gene*, 192:235-240), maltose inducible, glucose-repressible MET3 promoter (see Liu et al., (2006), *Eukary. Cell*, 5:638-649), pKi promoter and cpc1 promoter. Other examples of useful promoters include promoters from *A. awamori* and *A. niger* glucoamylase genes (see e.g., Nunberg et al., (1984) *Mol. Cell Biol.* 15 4:2306-2315 and Boel et al., (1984) *EMBO J.* 3:1581-1585). Also, the promoters of the *T. reesei* xln1 gene may be useful (see e.g., EPA 137280A1).

DNA fragments which control transcriptional termination may also be derived from various genes native to a preferred production host cell. In certain embodiments, the inclusion of a termination control region is optional. In certain embodiments, the expression vector includes a termination control region derived from the preferred host cell.

The terms "production host", "production host cell", "host cell" and "host strains" are used interchangeable herein and mean a suitable host for an expression vector or DNA construct comprising a polynucleotide encoding phytase polypeptide or fragment thereof. The choice of a production host can be selected from the group consisting of bacteria, fungi, yeast, plants and algae. Typically, the choice will depend upon the gene encoding the engineered phytase polypeptide or fragment thereof and its source.

Specifically, host strains are preferably filamentous fungal cells. In a preferred embodiment of the invention, "host cell" means both the cells and protoplasts created from the cells of a filamentous fungal strain and particularly a *Trichoderma* sp. or an *Aspergillus* sp.

The term "filamentous fungi" refers to all filamentous forms of the subdivision Eumycotina (See, Alexopoulos, C. J. (1962), INTRODUCTORY MYCOLOGY, Wiley, New York). These fungi are characterized by a vegetative mycelium with a cell wall composed of chitin, cellulose, and other complex polysaccharides. The filamentous fungi of the present invention are morphologically, physiologically, and genetically distinct from yeasts. Vegetative growth by filamentous fungi is by hyphal elongation and carbon catabolism is obligatory aerobic. In the present invention, the filamentous fungal parent cell may be a cell of a species of, but not limited to, *Trichoderma*, (e.g., *Trichoderma reesei* (previously classified as *T. longibrachiatum* and currently also known as *Hypocrea jecorina*), *Trichoderma viride*, *Trichoderma koningii*, *Trichoderma harzianum*); *Penicillium* sp., *Humicola* sp. (e.g., *Humicola insolens* and *Humicola grisea*); *Chrysosporium* sp. (e.g., *C. lucknowense*), *Gliocladium* sp., *Aspergillus* sp. (e.g., *A. oryzae, A. niger*, and *A. awamori*), *Fusarium* sp., *Neurospora* sp., *Hypocrea* sp., and *Emericella* sp. (See also, Innis et al., (1985) Sci. 228:21-26).

As used herein, the term "*Trichoderma*" or "*Trichoderma* sp." refer to any fungal genus previously or currently classified as *Trichoderma*.

An expression cassette can be included in the production host, particularly in the cells of microbial production hosts. The production host cells can be microbial hosts found within the fungal families and which grow over a wide range of temperature, pH values, and solvent tolerances. For example, it is contemplated that any of bacteria, yeast, plants, algae, or fungi such as filamentous fungi, may suitably host the expression vector.

Inclusion of the expression cassette in the production host cell may be used to express the protein of interest so that it may reside intracellularly, extracellularly, or a combination of both inside and outside the cell. Extracellular expression renders recovery of the desired protein from a fermentation product more facile than methods for recovery of protein produced by intracellular expression.

Methods for transforming nucleic acids into filamentous fungi such as *Aspergillus* spp., e.g., *A. oryzae* or *A. niger, H. grisea, H. insolens*, and *T. reesei*. are well known in the art. A suitable procedure for transformation of *Aspergillus* host cells is described, for example, in EP238023.

A suitable procedure for transformation of *Trichoderma* host cells is described, for example, in Steiger et al 2011, Appl. Environ. Microbiol. 77:114-121. Uptake of DNA into the host *Trichoderma* sp. strain is dependent upon the calcium ion concentration. Generally, between about 10 mM $CaCl_2$ and 50 mM $CaCl_2$ is used in an uptake solution. Besides the need for the calcium ion in the uptake solution, other compounds generally included are a buffering system such as TE buffer (10 Mm Tris, pH 7.4; 1 mM EDTA) or 10 mM MOPS, pH 6.0 buffer (morpholinepropanesulfonic acid) and polyethylene glycol (PEG). It is believed that the polyethylene glycol acts to fuse the cell membranes, thus permitting the contents of the medium to be delivered into the cytoplasm of the *Trichoderma* sp. strain and the plasmid DNA is transferred to the nucleus. This fusion frequently leaves multiple copies of the plasmid DNA integrated into the host chromosome.

Usually a suspension containing the *Trichoderma* sp. protoplasts or cells that have been subjected to a permeability treatment at a density of $10^5$ to $10^7$/mL, preferably $2\times10^6$/mL are used in transformation. A volume of 100 μL of these protoplasts or cells in an appropriate solution (e.g., 1.2 M sorbitol; 50 mM $CaCl_2$) are mixed with the desired DNA. Generally, a high concentration of PEG is added to the uptake solution. From 0.1 to 1 volume of 25% PEG 4000 can be added to the protoplast suspension. However, it is preferable to add about 0.25 volumes to the protoplast suspension. Additives such as dimethyl sulfoxide, heparin, spermidine, potassium chloride and the like may also be added to the uptake solution and aid in transformation. Similar procedures are available for other fungal host cells. (see, e.g., U.S. Pat. Nos. 6,022,725 and 6,268,328, both of which are incorporated by reference).

Preferably, genetically stable transformants are constructed with vector systems whereby the nucleic acid encoding the phytase polypeptide or fragment thereof is stably integrated into a host strain chromosome. Transformants are then purified by known techniques.

After the expression vector is introduced into the cells, the transfected or transformed cells are cultured under conditions favoring expression of genes under control of the promoter sequences.

Generally, cells are cultured in a standard medium containing physiological salts and nutrients (see, e.g., Pourquie, J. et al., BIOCHEMISTRY AND GENETICS OF CELLULOSE DEGRADATION, eds. Aubert, J. P. et al., Academic Press, pp. 71-86, 1988 and IImen, M. et al., (1997) *Appl. Environ. Microbiol.* 63:1298-1306). Common commercially prepared media (e.g., Yeast Malt Extract (YM) broth, Luria Bertani (LB) broth and Sabouraud Dextrose (SD) broth also find use in the present invention.

Culture-conditions are also standard, (e.g., cultures are incubated at approximately 28° C. in appropriate medium in shake cultures or fermenters until desired levels of phytase expression are achieved). Preferred culture conditions for a given filamentous fungus are known in the art and may be found in the scientific literature and/or from the source of the fungi such as the American Type Culture Collection and Fungal Genetics Stock Center.

After fungal growth has been established, the cells are exposed to conditions effective to cause or permit the expression of a phytase and particularly a phytase as defined herein. In cases where a phytase coding sequence is under the control of an inducible promoter, the inducing agent (e.g., a sugar, metal salt or antimicrobial), is added to the medium at a concentration effective to induce phytase expression. An engineered phytase polypeptide or fragment thereof secreted from the host cells can be used, with minimal post-production processing, as a whole broth preparation.

The preparation of a spent whole fermentation broth of a recombinant microorganism can be achieved using any cultivation method known in the art resulting in the expression of an engineered phytase polypeptide or fragment thereof.

The term "spent whole fermentation broth" is defined herein as unfractionated contents of fermentation material that includes culture medium, extracellular proteins (e.g., enzymes), and cellular biomass. It is understood that the term "spent whole fermentation broth" also encompasses cellular biomass that has been lysed or permeabilized using methods well known in the art.

After fermentation, a fermentation broth is obtained, the microbial cells and various suspended solids, including residual raw fermentation materials, are removed by conventional separation techniques in order to obtain a phytase solution. Filtration, centrifugation, microfiltration, rotary vacuum drum filtration, ultrafiltration, centrifugation followed by ultrafiltration, extraction, or chromatography, or the like, are generally used.

It is possible to optionally recover the desired protein from the production host. In another aspect, an engineered phytase polypeptide or fragment thereof containing culture supernatant is obtained by using any of the methods known to those skilled in the art.

Examples of these techniques include, but are not limited to, affinity chromatography (Tilbeurgh et a., (1984) *FEBS Lett.* 16:215), ion-exchange chromatographic methods (Goyal et al., (1991) *Biores. Technol.* 36:37; Fliess et al., (1983) *Eur. J. Appl. Microbiol. Biotechnol.* 17:314; Bhikhabhai et al, (1984) *J. Appl. Biochem.* 6:336; and Ellouz et al., (1987) *Chromatography* 396:307), including ion-exchange using materials with high resolution power (Medve et al., (1998) *J. Chromatography A* 808:153), hydrophobic interaction chromatography (See, Tomaz and Queiroz, (1999) *J. Chromatography A* 865:123; two-phase partitioning (See, Brumbauer, et al., (1999) *Bioseparation* 7:287); ethanol precipitation; reverse phase HPLC, chromatography on silica or on a cation-exchange resin such as DEAE, chromatofocusing, SDS-PAGE, ammonium sulfate precipitation, and gel filtration (e.g., Sephadex G-75). The degree of purification desired will vary depending on the use of the engineered phytase polypeptide or fragment thereof. In some embodiments, purification will not be necessary.

On the other hand, it may be desirable to concentrate a solution containing an engineered phytase polypeptide or fragment thereof in order to optimize recovery. Use of unconcentrated solutions requires increased incubation time in order to collect the enriched or purified enzyme precipitate. The enzyme containing solution is concentrated using conventional concentration techniques until the desired enzyme level is obtained. Concentration of the enzyme containing solution may be achieved by any of the techniques discussed herein. Exemplary methods of enrichment and purification include but are not limited to rotary vacuum filtration and/or ultrafiltration.

In addition, concentration of the desired protein product may be performed using, e.g., a precipitation agent, such as a metal halide precipitation agent. The metal halide precipitation agent, sodium chloride, can also be used as a preservative. The metal halide precipitation agent is used in an amount effective to precipitate the engineered phytase polypeptide or fragment thereof. The selection of at least an effective amount and an optimum amount of metal halide effective to cause precipitation of the enzyme, as well as the conditions of the precipitation for maximum recovery including incubation time, pH, temperature and concentration of enzyme, will be readily apparent to one of ordinary skill in the art, after routine testing. Generally, at least about 5% w/v (weight/volume) to about 25% w/v of metal halide is added to the concentrated enzyme solution, and usually at least 8% w/v.

Another alternative way to precipitate the enzyme is to use organic compounds. Exemplary organic compound precipitating agents include: 4-hydroxybenzoic acid, alkali metal salts of 4-hydroxybenzoic acid, alkyl esters of 4-hydroxybenzoic acid, and blends of two or more of these organic compounds. The addition of the organic compound precipitation agents can take place prior to, simultaneously with or subsequent to the addition of the metal halide precipitation agent, and the addition of both precipitation agents, organic compound and metal halide, may be carried out sequentially or simultaneously. Generally, the organic precipitation agents are selected from the group consisting of alkali metal salts of 4-hydroxybenzoic acid, such as sodium or potassium salts, and linear or branched alkyl esters of 4-hydroxybenzoic acid, wherein the alkyl group contains from 1 to 12 carbon atoms, and blends of two or more of these organic compounds. Additional organic compounds also include but are not limited to 4-hydroxybenzoic acid methyl ester (named methyl PARABEN), 4-hydroxybenzoic acid propyl ester (named propyl PARABEN). For further descriptions, see, e.g., U.S. Pat. No. 5,281,526. Addition of the organic compound precipitation agent provides the advantage of high flexibility of the precipitation conditions with respect to pH, temperature, concentration, precipitation agent, protein concentration, and time of incubation. Generally, at least about 0.01% w/v and no more than about 0.3% w/v of organic compound precipitation agent is added to the concentrated enzyme solution.

After the incubation period, the enriched or purified enzyme is then separated from the dissociated pigment and other impurities and collected by conventional separation techniques, such as filtration, centrifugation, microfiltration, rotary vacuum filtration, ultrafiltration, press filtration, cross membrane microfiltration, cross flow membrane microfiltration, or the like. Further enrichment or purification of the enzyme precipitate can be obtained by washing the precipitate with water. For example, the enriched or purified enzyme precipitate is washed with water containing the metal halide precipitation agent, or with water containing the metal halide and the organic compound precipitation agents.

Sometimes it is advantageous to delete genes from expression hosts, where the gene deficiency can be cured by an expression vector. Where it is desired to obtain a fungal host cell having one or more inactivated genes known methods may be used (e.g. methods disclosed in U.S. Pat. Nos. 5,246,853, 5,475,101 and WO92/06209). Gene inactivation may be accomplished by complete or partial deletion, by insertional inactivation or by any other means which renders a gene nonfunctional for its intended purpose (such that the gene is prevented from expression of a functional protein).

Any gene from a *Trichoderma* sp or other filamentous fungal host, which has been cloned can be deleted, for example cbh1, cbh2, egl1 and egl2 genes. In some embodiments, gene deletion may be accomplished by inserting a form of the desired gene to be inactivated into a plasmid by methods known in the art. The deletion plasmid is then cut at an appropriate restriction enzyme site(s), internal to the desired gene coding region, and the gene coding sequence or part thereof is replaced with a selectable marker. Flanking DNA sequences from the locus of the gene to be deleted (preferably between about 0.5 to 2.0 kb) remain on either side of the marker gene. An appropriate deletion plasmid will generally have unique restriction enzyme sites present therein to enable the fragment containing the deleted gene, including the flanking DNA sequences and the selectable markers gene to be removed as a single linear piece.

Depending upon the host cell used post-transcriptional and/or post-translational modifications may be made. One non-limiting example of a post-transcriptional and/or post-translational modification is "clipping" or "truncation" of a polypeptide. In another instance, this clipping may result in taking a mature phytase polypeptide and further removing N or C-terminal amino acids to generate truncated forms of the phytase that retain enzymatic activity.

Other examples of post-transcriptional or post-translational modifications include, but are not limited to, myristoylation, glycosylation, truncation, lipidation and tyrosine, serine or threonine phosphorylation. The skilled person will appreciate that the type of post-transcriptional or post-translational modifications that a protein may undergo may depend on the host organism in which the protein is expressed.

Further sequence modifications of polypeptides post expression may occur. This includes, but is not limited to, oxidation, deglycosylation, glycation, etc. It is known that glycation can affect the activity of phytase when subjected to incubation with glucose or other reducing sugars especially at temperatures above 30° C. and neutral or alkaline pH. Protein engineering to eliminate Lysine residues can be used to prevent such modification. An example of this can be found in U.S. Pat. No. 8,507,240. For example, yeast expression can result in highly glycosylated polypeptides resulting in an apparent increased molecular weight. Also, WO2013/119470 (incorporated by reference herein) having international publication date Aug. 15, 2013 relates to phytases having increased stability believed to be due to increased glycosylation.

The term "glycosylation" as used herein refers to the attachment of glycans to molecules, for example to proteins. Glycosylation may be an enzymatic reaction. The attachment formed may be through covalent bonds. The phrase "highly glycosylated" refers to a molecule such as an enzyme which is glycosylated in many sites and at all or nearly all the available glycosylation sites, for instance N-linked glycosylation sites. Alternatively, or in addition to, the phrase "highly glycosylated" can refer to extensive glycolytic branching (such as, the size and number of glycolytic moieties associated with a particular N-linked glycosylation site) at all or substantially all N-linked glycosylation sites. In some embodiments, the engineered phytase polypeptide is glycosylated at all or substantially all consensus N-linked glycosylation sites (i.e. an NXS/T consensus N-linked glycosylation site).

The term "glycan" as used herein refers to a polysaccharide or oligosaccharide, or the carbohydrate section of a glycoconjugate such as a glycoprotein. Glycans may be homo- or heteropolymers of monosaccharide residues. They may be linear or branched molecules.

A phytase may have varying degrees of glycosylation. It is known that such glycosylations may improve stability during storage and in applications. Extensive The activity of any of the engineered phytase polypeptides or fragments thereof disclosed herein can be determined as discussed above.

It is believed that applying a robust engineered phytase polypeptide or fragment thereof to feed in a liquid form is beneficial as compared to applying such a phytase as a coated granule. This coated granule is the current commercial approach to make phytase products suitable for high temperature conditioning and pelleting. Benefits of liquid application of robust enzyme include; 1) the enzyme will start to work immediately after ingestion by an animal since it does not have to be released from the coated granule before it can interact with the feed, 2) there is improved distribution of the enzyme throughout the feed, thus, ensuring a more consistent delivery of the enzyme to the animal which is particularly important for young animals that eat small amounts of feed, 3) even distribution in the feed makes it easier to measure the enzyme in the feed, and 4) in the case of a robust phytase, such as the engineered phytase polypeptide and fragment disclosed herein, it may start to degrade phytate already present in the feed.

In other words, the novel engineered phytase polypeptides and fragments thereof are so robust that no special coating or formulation is believed to be needed to apply them to feed prior to conditioning and pelleting since they have been engineered to withstand the stress of conditioning and pelleting used in industrial feed production. Accordingly, the robustness of the novel engineered phytase polypeptides and fragments thereof described herein is such that they can be applied as an uncoated granule or particle or uncoated and unprotected when put into a liquid.

It should be noted that the engineered phytase polypeptides and fragments thereof can be formulated inexpensively on a solid carrier without specific need for protective coatings and still maintain activity throughout the conditioning and pelleting process. A protective coating to provide additional thermostability when applied in a solid form can be beneficial for obtaining pelleting stability when required in certain regions where harsher conditions are used or if conditions warrant it, e.g., as in the case of super conditioning feed above 90° C.

The disclosed engineered phytase polypeptides or fragments thereof were derived using a combination of methods and techniques know in the field of protein engineering which include, phylogenetic analysis, site evaluation libraries, combinatorial libraries, high throughput screening and statistical analysis.

In one aspect, the disclosure relates to an engineered phytase polypeptide or fragment thereof also that has at least 82% sequence identity with the amino acid sequence of SEQ ID NO:1.

Those skilled in the art will appreciate that such at least 82% sequence identity also includes 82%, 83%, 84%, 85%, 86%, 87%, 88%, 89%, 90%, 91%, 92%, 93%, 94%, 95%, 96%, 97%, 98%, 99% or 100%.

Those skilled in the art will appreciate that at least 79% sequence identity also includes 79%, 80%, 81%, 82%, 83%, 84%, 85%, 86%, 87%, 88%, 89%, 90%, 91%, 92%, 93%, 94%, 95%, 96%, 97%, 98%, 99% or 100%.

There can also be mentioned the following in that in some embodiments, there is provided:

a) an engineered phytase polypeptide or fragment thereof also that has at least 81% (such as 81%, 82%, 83%, 84%, 85%, 86%, 87%, 88%, 89%, 90%, 91%, 92%, 93%, 94%, 95%, 96%, 97%, 98%, 99% or 100%) sequence identity with the amino acid sequence of SEQ ID NOs: 2, 3, 8, 10, 12, 18, 19, 24, 26, 27, 28, 30, 31, 32, 33, and/or 36.

b) an engineered phytase polypeptide or fragment thereof also that has at least 82% (such as 82%, 83%, 84%, 85%, 86%, 87%, 88%, 89%, 90%, 91%, 92%, 93%, 94%, 95%, 96%, 97%, 98%, 99% or 100%) sequence identity with the amino acid sequence of SEQ ID NOs: 1, 4, 5, 7, 9, 11, 14, 15, 17, 21, 25, 34, and/or 35;

c) an engineered phytase polypeptide or fragment thereof also that has at least 83% (such as, 83%, 84%, 85%, 86%, 87%, 88%, 89%, 90%, 91%, 92%, 93%, 94%, 95%, 96%, 97%, 98%, 99% or 100%) sequence identity with the amino acid sequence of SEQ ID NO:13;

d) an engineered phytase polypeptide or fragment thereof also that has at least 79% (such as, 79%, 80%, 81%, 82%, 83%, 84%, 85%, 86%, 87%, 88%, 89%, 90%, 91%, 92%, 93%, 94%, 95%, 96%, 97%, 98%, 99% or 100%) sequence identity with the amino acid sequence of SEQ ID NOs: 6, and/or 22; and/or e) an engineered phytase polypeptide or fragment thereof also that has at least 80% (such as, 80%, 81%, 82%, 83%, 84%, 85%, 86%, 87%, 88%, 89%, 90%, 91%, 92%, 93%, 94%, 95%, 96%, 97%, 98%, 99% or 100%) sequence identity with the amino acid sequence of SEQ ID NOs: 16, 20, 23, 29, and/or 37.

In further aspects, the polypeptide comprises a core domain of an engineered phytase polypeptide or is a core domain fragment of an engineered phytase polypeptide. A "core domain fragment" is herein defined as a polypeptide having one or more amino acids deleted from the amino and/or carboxyl terminus of the polypeptide. As used herein, the phrase "core domain" refers to a polypeptide region encompassing amino acids necessary to maintain the structure and function (such as, phytic acid hydrolysis) of the polypeptide. Amino acids in the core domain can be further modified to improve thermostability or catalytic activity under various conditions such as, without limitation, pH. In some non-limiting embodiments, the core domain of the engineered phytase polypeptides or fragment thereof disclosed herein corresponds to amino acid positions 14-325 of SEQ ID NO:1. In other non-limiting embodiments, the core domain corresponds to amino acid positions 13-326, 12-327, 11-328, 10-329, 9-330, 8-331, 7-332, 6-333, 5-334, 4-335, 3-336, 2-337, or 1-338 of SEQ ID NO:1. In other embodiments, the N-terminus of the core domain corresponds to amino acid position 1, 2, 3, 4, 5, 6, 7, 8, 9, 10, 11, 12, 13, 14, 15, 16, 17, 18, 19, 20, 21, 22, 23, 24, or 25 of SEQ ID NO:1 and the C-terminus of the core domain corresponds to amino acid position 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, or 413 of SEQ ID NO:1.

Accordingly, also provided herein are:

f) an engineered phytase polypeptide or core domain fragment thereof that has at least 78% (such as, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100%) sequence identity to amino acids 14-325 of SEQ ID NO:6, wherein said amino acid positions correspond to those of SEQ ID NO:1;

g) an engineered phytase polypeptide or core domain fragment thereof that has at least 79% (such as, 79%, 80%, 81%, 82%, 83%, 84%, 85%, 86%, 87%, 88%, 89%, 90%, 91%, 92%, 93%, 94%, 95%, 96%, 97%, 98%, 99% or 100%) sequence identity to amino acids 14-325 of SEQ ID NOs: 2, 8, 27, and/or 37, wherein said amino acid positions correspond to those of SEQ ID NO:1;

h) an engineered phytase polypeptide or core domain fragment thereof that has at least 81% (such as, 81%, 82%, 83%, 84%, 85%, 86%, 87%, 88%, 89%, 90%, 91%, 92%, 93%, 94%, 95%, 96%, 97%, 98%, 99% or 100%) sequence identity to amino acids 14-325 of SEQ ID NOs: 3, 10, 12, 18, 25, 26, 28, 30, 32, and/or 35, wherein said amino acid positions correspond to those of SEQ ID NO:1;

i) an engineered phytase polypeptide or core domain fragment thereof that has at least 82% (such as, 82%, 83%, 84%, 85%, 86%, 87%, 88%, 89%, 90%, 91%, 92%, 93%, 94%, 95%, 96%, 97%, 98%, 99% or 100%) sequence identity to amino acids 14-325 of SEQ ID NOs: 1, 4, 5, 7, 9, 11, 13-17, 21, 22, 31, 33, 34, and/or 36, wherein said amino acid positions correspond to those of SEQ ID NO:1;

j) an engineered phytase polypeptide or core domain fragment thereof that has at least 83% (such as, 83%, 84%, 85%, 86%, 87%, 88%, 89%, 90%, 91%, 92%, 93%, 94%, 95%, 96%, 97%, 98%, 99% or 100%) sequence identity to amino acids 14-325 of SEQ ID NOs: 19, 20, 23, and/or 24, wherein said amino acid positions correspond to those of SEQ ID NO:1; and/or k) an engineered phytase polypeptide or core domain fragment thereof that has at least 84% (such as, 84%, 85%, 86%, 87%, 88%, 89%, 90%, 91%, 92%, 93%, 94%, 95%, 96%, 97%, 98%, 99% or 100%) sequence identity to amino acids 14-325 of SEQ ID NO:29, wherein said amino acid positions correspond to those of SEQ ID NO:1.

In another aspect, any of the engineered polypeptides or fragments thereof disclosed herein comprise a specific activity of at least about 100 U/mg at pH 3.5. The specific activity range (U/mg at pH 3.5) includes, but is not limited to, about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 2000, etc.

In another aspect, some of the engineered polypeptides or fragments thereof disclosed herein comprise a specific activity of at least about 100 U/mg at pH 5.5. The specific activity range (U/mg at pH 5.5) includes, but is not limited to, about 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 2000, etc.

In still another aspect, any of the engineered phytase polypeptides or fragments thereof disclosed herein may be stable in a liquid form at a pH about 3.0 or lower. This is very relevant when engineered phytase polypeptides or fragments thereof described herein are passing through the digestive tract of an animal as is discussed below.

In another embodiment, there is described non-inorganic phosphate-containing diet comprising any of the engineered phytase polypeptides or fragments thereof described herein.

Importantly, feed additive enzymes e.g. a phytase is subjected to very harsh conditions as it passes through the digestive track of an animal, i.e. low pH and presence of digestive enzymes. Pepsin is one of the most important proteolytic digestive enzymes present in the gastrointestinal tract of monogastric animals. Pepsin has low specificity and high pH tolerance in the acidic area (pH 1.5-6.0 stabile up to pH 8.0). The engineered phytase polypeptides or fragments thereof described herein are largely resistant against pepsin, which is necessary for good in-vivo performance.

The non-inorganic phosphate-containing diets comprising any of the engineered phytase polypeptides or fragments thereof described herein may be used (i) alone or (ii) in combination with a direct fed microbial comprising at least one bacterial strain or (iii) with at least one other enzyme or (iv) in combination with a direct fed microbial comprising at least one bacterial strain and at least one other enzyme, or (v) any of (i), (ii), (iii) or (iv) further comprising at least one other feed additive component and, optionally, the engineered phytase polypeptide or fragment thereof is present in an amount of at least 0.1 g/ton feed (such as at least about 0.1 g/ton, 0.2 g/ton, 0.3 g/ton, 0.4 g/ton, 0.5 g/ton, 0.6 g/ton, 0.7 g/ton, 0.8 g/ton, 0.9 g/ton, 1 g/ton, 1.1 g/ton, 1.2 g/ton, 1.3 g/ton, 1.4 g/ton, 1.5 g/ton, 1.6 g/ton, 1.7 g/ton, 1.8 g/ton, 1.9 g/ton, 2 g/ton, 2.1 g/ton, 2.2 g/ton, 2.3 g/ton, 2.4 g/ton, 2.5 g/ton, 2.6 g/ton, 2.7 g/ton, 2.8 g/ton, 2.9 g/ton, 3 g/ton, or more).

In some non-limiting embodiments, the phytase is present in the diet in range of about 200 FTU/kg to about 1000 FTU/kg feed, more preferably about 300 FTU/kg feed to about 750 FTU/kg feed, more preferably about 400 FTU/kg feed to about 500 FTU/kg feed. In one embodiment, the phytase is present in the feedstuff at more than about 200 FTU/kg feed, suitably more than about 300 FTU/kg feed, suitably more than about 400 FTU/kg feed. In one embodiment, the phytase is present in the feedstuff at less than about 1000 FTU/kg feed, suitably less than about 750 FTU/kg feed. I some embodiments, the phytase is present in the feed additive composition in range of about 40 FTU/g to about 40,000 FTU/g composition, more preferably about 80 FTU/g composition to about 20,000 FTU/g composition, and even more preferably about 100 FTU/g composition to about 10,000 FTU/g composition, and even more preferably about 200 FTU/g composition to about 10,000 FTU/g composition. In one embodiment, the phytase is present in the feed additive composition at more than about 40 FTU/g composition, suitably more than about 60 FTU/g composition, suitably more than about 100 FTU/g composition, suitably more than about 150 FTU/g composition, suitably more than about 200 FTU/g composition. In one embodiment, the phytase is present in the feed additive composition at less than about 40,000 FTU/g composition, suitably less than about 20,000 FTU/g composition, suitably less than about 15,000 FTU/g composition, suitably less than about 10,000 FTU/g composition.

In some non-limiting embodiments, "1 FTU" (phytase unit) is defined as the amount of enzyme required to release 1 μmol of inorganic orthophosphate from a substrate in one minute under the reaction conditions defined in the ISO 2009 phytase assay—A standard assay for determining phytase activity and 1 FTU can be found at International Standard ISO/DIS 30024:1-17, 2009. In one embodiment, the enzyme is classified using the E.C. classification above, and the E.C. classification designates an enzyme having that activity when tested in the assay taught herein for determining 1 FTU.

The terms "feed additive", "feed additive components", and/or "feed additive ingredients" are used interchangeably herein.

Feed additives can be described as products used in animal nutrition for purposes of improving the quality of feed and the quality of food from animal origin, or to improve the animals' performance and health, e.g. providing enhanced digestibility of the feed materials.

Feed additives fall into a number of categories such as sensory additives which stimulate an animal's appetite so that they naturally want to eat more. Nutritional additives provide a particular nutrient that may be deficient in an animal's diet. Zootechnical additives improve the overall nutritional value of an animal's diet through additives in the feed.

As used herein, a "non-inorganic phosphate-containing diet" refers to a diet that contains no to substantially no inorganic phosphate added, for example, as a feed additive.

Examples of such feed additives include, but are not limited to, prebiotics, essential oils (such as, without limitation, thymol and/or cinnamaldehyde), fatty acids, short chain fatty acids such as propionic acid and butyric acid, etc., vitamins, minerals, amino acids, etc.

Feed additive compositions or formulations may also comprise at least one component selected from the group consisting of a protein, a peptide, sucrose, lactose, sorbitol, glycerol, propylene glycol, sodium chloride, sodium sulfate, sodium acetate, sodium citrate, sodium formate, sodium sorbate, potassium chloride, potassium sulfate, potassium acetate, potassium citrate, potassium formate, potassium acetate, potassium sorbate, magnesium chloride, magnesium sulfate, magnesium acetate, magnesium citrate, magnesium formate, magnesium sorbate, sodium metabisulfite, methyl paraben and propyl paraben.

At least one other enzyme (i.e. in addition to any of the engineered phytase polypeptides or fragments thereof disclosed herein) can be included in the feed additive compositions or formulations disclosed herein which can include, but are not limited to, a xylanase, amylase, another phytase, beta-glucanase, and/or a protease.

Xylanase is the name given to a class of enzymes that degrade the linear polysaccharide β-1,4-xylan into xylose, thus breaking down hemicellulose, one of the major components of plant cell walls. Xylanases, e.g., endo-β-xylanases (EC 3.2.1.8) hydrolyze the xylan backbone chain.

In one embodiment, the xylanase may be any commercially available xylanase. Suitably the xylanase may be an endo-1,4-β-d-xylanase (classified as E.G. 3.2.1.8) or a 1,4β-xylosidase (classified as E.G. 3.2.1.37). In one embodiment, the disclosure relates to a composition comprising any of the engineered phytase polypeptides or fragments thereof disclosed herein in combination with an endoxylanase, e.g. an endo-1,4-P-d-xylanase, and another enzyme. All E.C. enzyme classifications referred to herein relate to the classifications provided in Enzyme Nomenclature—Recommendations (1992) of the nomenclature committee of the International Union of Biochemistry and Molecular Biology—ISBN 0-12-226164-3, which is incorporated herein.

In another embodiment, the xylanase may be a xylanase from Bacillus, Trichodermna, Therinomyces, Aspergillus, Humicola and Penicillium. In still another embodiment, the xylanase may be the xylanase in Axtra XAP® or Avizyme 1502®, both commercially available products from Danisco A/S. In one embodiment, the xylanase may be a mixture of two or more xylanases. In still another embodiment, the xylanase is an endo-1,4-β-xylanase or a 1,4-β-xylosidase.

In one embodiment, the disclosure relates to a non-inorganic phosphate-containing diet comprising any of the engineered phytase polypeptides or fragments thereof disclosed herein and a xylanase. In one embodiment, the non-inorganic phosphate-containing diet comprises 10-50, 50-100, 100-150, 150-200, 200-250, 250-300, 300-350, 350-400, 400-450, 450-500, 500-550, 550-600, 600-650, 650-700, 700-750, and greater than 750 xylanase units/g of composition.

In one embodiment, the non-inorganic phosphate-containing diet comprises 500-1000, 1000-1500, 1500-2000, 2000-2500, 2500-3000, 3000-3500, 3500-4000, 4000-4500, 4500-5000, 5000-5500, 5500-6000, 6000-6500, 6500-7000, 7000-7500, 7500-8000, and greater than 8000 xylanase units/g composition.

It will be understood that one xylanase unit (XU) is the amount of enzyme that releases 0.5 μmol of reducing sugar equivalents (as xylose by the Dinitrosalicylic acid (DNS) assay-reducing sugar method) from an oat-spelt-xylan substrate per min at pH 5.3 and 50° C. (Bailey, et al., Journal of Biotechnology, Volume 23, (3), May 1992, 257-270).

Amylase is a class of enzymes capable of hydrolysing starch to shorter-chain oligosaccharides, such as maltose. The glucose moiety can then be more easily transferred from maltose to a monoglyceride or glycosylmonoglyceride than from the original starch molecule. The term amylase includes α-amylases (E.G. 3.2.1.1), G4-forming amylases (E.G. 3.2.1.60), β-amylases (E.G. 3.2.1.2) and γ-amylases (E.C. 3.2.1.3). Amylases may be of bacterial or fungal origin, or chemically modified or protein engineered mutants.

In one embodiment, the amylase may be a mixture of two or more amylases. In another embodiment, the amylase may be an amylase, e.g. an α-amylase, from Bacillus licheniformis and an amylase, e.g. an α-amylase, from Bacillus amyloliquefaciens. In one embodiment, the α-amylase may be the α-amylase in Axtra XAP® or Avizyme 1502®, both commercially available products from Danisco A/S. In yet another embodiment, the amylase may be a pepsin resistant α-amylase, such as a pepsin resistant Trichoderma (such as Trichoderma reesei) alpha amylase. A suitably pepsin resistant α-amylase is taught in UK application number 101 1513.7 (which is incorporated herein by reference) and PCT/IB2011/053018 (which is incorporated herein by reference).

It will be understood that one amylase unit (AU) is the amount of enzyme that releases 1 mmol of glucosidic linkages from a water insoluble cross-linked starch polymer substrate per min at pH 6.5 and 37° C. (this may be referred to herein as the assay for determining 1 AU).

In one embodiment, disclosure relates to a non-inorganic phosphate-containing diet comprising any of the engineered phytase polypeptides or fragments thereof disclosed herein and an amylase. In one embodiment, disclosure relates to a non-inorganic phosphate-containing diet comprising any of the engineered phytase polypeptides or fragments thereof disclosed herein, xylanase and amylase. In one embodiment, the composition comprises 10-50, 50-100, 100-150, 150-200, 200-250, 250-300, 300-350, 350-400, 400-450, 450-500, 500-550, 550-600, 600-650, 650-700, 700-750, and greater than 750 amylase units/g composition.

In one embodiment, the non-inorganic phosphate-containing diet comprises 500-1000, 1000-1500, 1500-2000, 2000-2500, 2500-3000, 3000-3500, 3500-4000, 4000-4500, 4500-5000, 5000-5500, 5500-6000, 6000-6500, 6500-7000, 7000-

7500, 7500-8000, 8000-8500, 8500-9000, 9000-9500, 9500-10000, 10000-11000, 11000-12000, 12000-13000, 13000-14000, 14000-15000 and greater than 15000 amylase units/g composition.

The term protease as used herein is synonymous with peptidase or proteinase. The protease may be a subtilisin (E.G. 3.4.21.62) or a bacillolysin (E.G. 3.4.24.28) or an alkaline serine protease (E.G. 3.4.21.x) or a keratinase (E.G. 3.4.X.X). In one embodiment, the protease is a subtilisin. Suitable proteases include those of animal, vegetable or microbial origin.

Chemically modified or protein engineered mutants are also suitable. The protease may be a serine protease or a metalloprotease. e.g., an alkaline microbial protease or a trypsin-like protease. In one embodiment, provided herein are compositions comprising any of the engineered phytase polypeptides or fragments thereof disclosed herein and one or more protease.

Examples of alkaline proteases are subtilisins, especially those derived from *Bacillus* sp., e.g., subtilisin Novo, subtilisin Carlsberg, subtilisin 309 (see, e.g., U.S. Pat. No. 6,287,841), subtilisin 147, and subtilisin 168 (see, e.g., WO 89/06279). Examples of trypsin-like proteases are trypsin (e.g., of porcine or bovine origin), and *Fusarium* proteases (see, e.g., WO 89/06270 and WO 94/25583). Examples of useful proteases also include but are not limited to the variants described in WO 92/19729 and WO 98/20115.

In one embodiment, the protease is selected from the group consisting of subtilisin, a bacillolysin, an alkine serine protease, a keratinase, and a Nocardiopsis protease.

It will be understood that one protease unit (PU) is the amount of enzyme that liberates from the substrate (0.6% casein solution) one microgram of phenolic compound (expressed as tyrosine equivalents) in one minute at pH 7.5 (40 mM $Na_2PO_4$/lactic acid buffer) and 40° C. This may be referred to as the assay for determining 1 PU.

In one embodiment, disclosure relates to a non-inorganic phosphate-containing diet comprising any of the engineered phytase polypeptides or fragments thereof disclosed herein and a protease. In another embodiment, disclosure relates to a non-inorganic phosphate-containing diet comprising any of the engineered phytase polypeptides or fragments thereof disclosed herein and a xylanase and a protease. In still another embodiment, the disclosure relates to a non-inorganic phosphate-containing diet comprising any of the engineered phytase polypeptides or fragments thereof disclosed herein and an amylase and a protease. In yet another embodiment, the disclosure relates to a non-inorganic phosphate-containing diet comprising any of the engineered phytase polypeptides or fragments thereof disclosed herein and a xylanase, an amylase and a protease.

In one embodiment, the non-inorganic phosphate-containing diet comprises about 10-50, 50-100, 100-150, 150-200, 200-250, 250-300, 300-350, 350-400, 400-450, 450-500, 500-550, 550-600, 600-650, 650-700, 700-750, and greater than 750 protease units/g composition.

In one embodiment, the non-inorganic phosphate-containing diet comprises about 500-1000, 1000-1500, 1500-2000, 2000-2500, 2500-3000, 3000-3500, 3500-4000, 4000-4500, 4500-5000, 5000-5500, 5500-6000, 6000-6500, 6500-7000, 7000-7500, 7500-8000, 8000-8500, 8500-9000, 9000-9500, 9500-10000, 10000-11000, 11000-12000, 12000-13000, 13000-14000, 14000-15000 and greater than 15000 protease units/g composition.

In other embodiments, the diet can have reduced (such as substantially reduced) inorganic phosphate levels relative to those recommended by the National Research Council (NRC) or broiler breeders. In some embodiments, the diets contain from between 0.2% to about 75% inorganic phosphate levels relative to those recommended by the National Research Council (NRC) or broiler breeders, such as any of about 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, or 75% inorganic phosphate levels relative to those recommended by the National Research Council (NRC) or broiler breeders (such as the recommended levels discussed in the Examples section below).

At least one direct fed microbial (DFM) may comprise at least one viable microorganism such as a viable bacterial strain or a viable yeast or a viable fungi. Preferably, the DFM comprises at least one viable bacteria.

It is possible that the DFM may be a spore forming bacterial strain and hence the term DFM may be comprised of or contain spores, e.g. bacterial spores. Thus, the term "viable microorganism" as used herein may include microbial spores, such as endospores or conidia. Alternatively, the DFM in the feed additive composition described herein may not comprise of or may not contain microbial spores, e.g. endospores or conidia.

The microorganism may be a naturally-occurring microorganism or it may be a transformed microorganism.

A DFM as described herein may comprise microorganisms from one or more of the following genera: *Lactobacillus, Lactococcus, Streptococcus, Bacillus, Pediococcus, Enterococcus, Leuconostoc, Carnobacterium, Propionibacterium, Bifidobacterium, Clostridium* and *Megasphaera* and combinations thereof.

Preferably, the DFM comprises one or more bacterial strains selected from the following *Bacillus* spp: *Bacillus subtilis, Bacillus cereus, Bacillus licheniformis, Bacillus pumilis* and *Bacillus amyloliquefaciens*.

The genus "*Bacillus*", as used herein, includes all species within the genus "*Bacillus*," as known to those of skill in the art, including but not limited to *B. subtilis, B. licheniformis, B. lentus, B. brevis, B. stearothermophilus, B. alkalophilus, B. amyloliquefaciens, B. clausii, B. halodurans, B. megaterium, B. coagulans, B. circulans, B. gibsonii, B. pumilis* and *B. thuringiensis*. It is recognized that the genus *Bacillus* continues to undergo taxonomical reorganization. Thus, it is intended that the genus include species that have been reclassified, including but not limited to such organisms as *Bacillus stearothermophilus*, which is now named "*Geobacillus stearothermophilus*", or *Bacillus polymyxa*, which is now "*Paenibacillus polymyxa*" The production of resistant endospores under stressful environmental conditions is considered the defining feature of the genus *Bacillus*, although this characteristic also applies to the recently named *Alicyclobacillus, Amphibacillus, Aneurinibacillus, Anoxybacillus, Brevibacillus, Filobacillus, Gracilibacillus, Halobacillus, Paenibacillus, Salibacillus, Thermobacillus, Ureibacillus*, and *Virgibacillus*.

In another aspect, the DFM may be further combined with the following *Lactococcus* spp: *Lactococcus cremoris* and *Lactococcus lactis* and combinations thereof.

The DFM may be further combined with the following *Lactobacillus* spp: *Lactobacillus buchneri, Lactobacillus acidophilus, Lactobacillus casei, Lactobacillus kefiri, Lactobacillus bifidus, Lactobacillus brevis, Lactobacillus hel-* veticus, *Lactobacillus paracasei*, *Lactobacillus rhamnosus*, *Lactobacillus salivarius*, *Lactobacillus curvatus*, *Lactobacillus bulgaricus*, *Lactobacillus sakei*, *Lactobacillus reuteri*, *Lactobacillus fermentum*, *Lactobacillus farciminis*, *Lactobacillus lactis*, *Lactobacillus delbreuckii*, *Lactobacillus plantarum*, *Lactobacillus paraplantarum*, *Lactobacillus farciminis*, *Lactobacillus rhamnosus*, *Lactobacillus crispatus*, *Lactobacillus gasseri*, *Lactobacillus johnsonii* and *Lactobacillus jensenii*, and combinations of any thereof.

In still another aspect, the DFM may be further combined with the following Bifidobacteria spp: *Bifidobacterium lactis*, *Bifidobacterium bifidium*, *Bifidobacterium longum*, *Bifidobacterium animalis*, *Bifidobacterium breve*, *Bifidobacterium infantis*, *Bifidobacterium catenulatum*, *Bifidobacterium pseudocatenulatum*, *Bifidobacterium adolescentis*, and *Bifidobacterium angulatum*, and combinations of any thereof.

There can be mentioned bacteria of the following species: *Bacillus subtilis*, *Bacillus licheniformis*, *Bacillus amyloliquefaciens*, *Bacillus pumilis*, *Enterococcus*, *Enterococcus* spp, and *Pediococcus* spp, *Lactobacillus* spp, *Bifidobacterium* spp, *Lactobacillus acidophilus*, *Pediococsus acidilactici*, *Lactococcus lactis*, *Bifidobacterium bifidum*, *Bacillus subtilis*, *Propionibacterium thoenii*, *Lactobacillus farciminis*, *Lactobacillus rhamnosus*, *Megasphaera elsdenii*, *Clostridium butyricum*, *Bifidobacterium animalis* ssp. *animalis*, *Lactobacillus reuteri*, *Bacillus cereus*, *Lactobacillus salivarius* ssp. *Salivarius*, Propionibacteria sp and combinations thereof.

A direct-fed microbial described herein comprising one or more bacterial strains may be of the same type (genus, species and strain) or may comprise a mixture of genera, species and/or strains.

Alternatively, a DFM may be combined with one or more of the products or the microorganisms contained in those products disclosed in WO2012110778, and summarized as follows: *Bacillus subtilis* strain 2084 Accession No. NRRLB-50013, *Bacillus subtilis* strain LSSAO1 Accession No. NRRL B-50104, and *Bacillus subtilis* strain 15A-P4 ATCC Accession No. PTA-6507 (from Enviva Pro®. (formerly known as Avicorr®); *Bacillus subtilis* Strain C3102 (from Calsporin®); *Bacillus subtilis* Strain PB6 (from Clostat®); *Bacillus pumilis* (8G-134); *Enterococcus* NCIMB 10415 (SF68) (from Cylactin®); *Bacillus subtilis* Strain C3102 (from Gallipro® & GalliproMax®); *Bacillus licheniformis* (from Gallipro®Tect®); *Enterococcus* and *Pediococcus* (from Poultry Star®); *Lactobacillus*, *Bifidobacterium* and/or *Enterococcus* from Protexin®); *Bacillus subtilis* strain QST 713 (from Proflora®); *Bacillus amyloliquefaciens* CECT-5940 (from Ecobiol® & Ecobiol® Plus); *Enterococcus faecium* SF68 (from Fortiflora®); *Bacillus subtilis* and *Bacillus licheniformis* (from BioPlus2B®); Lactic acid bacteria 7 *Enterococcus faecium* (from Lactiferm®); *Bacillus* strain (from CSI®); *Saccharomyces cerevisiae* (from Yea-Sacc®); *Enterococcus* (from Biomin IMB52®); *Pediococcus acidilactici*, *Enterococcus*, *Bifidobacterium animalis* ssp. *animalis*, *Lactobacillus reuteri*, *Lactobacillus salivarius* ssp. *salivarius* (from Biomin C5®); *Lactobacillus farciminis* (from Biacton®); *Enterococcus* (from Oralin E1707®); *Enterococcus* (2 strains), *Lactococcus lactis* DSM 1103 (from Probios-pioneer PDFM®); *Lactobacillus rhamnosus* and *Lactobacillus farciminis* (from Sorbiflore®); *Bacillus subtilis* (from Animavit®); *Enterococcus* (from Bonvital®); *Saccharomyces cerevisiae* (from Levucell SB 20®); *Saccharomyces cerevisiae* (from Levucell SC 0 & SC10® ME); *Pediococcus acidilacti* (from Bactocell); *Saccharomyces cerevisiae* (from ActiSaf® (formerly Bio- Saf®)); *Saccharomyces cerevisiae* NCYC Sc47 (from Actisaf® SC47); *Clostridium butyricum* (from Miya-Gold®); *Enterococcus* (from Fecinor and Fecinor Plus®); *Saccharomyces cerevisiae* NCYC R-625 (from InteSwine®); *Saccharomyces cerevisia* (from BioSprint®); *Enterococcus* and *Lactobacillus rhamnosus* (from Provita®); *Bacillus subtilis* and *Aspergillus oryzae* (from PepSoyGen-C®); *Bacillus cereus* (from Toyocerin®); *Bacillus cereus* var. toyoi NCIMB 40112/CNCM I-1012 (from TOYOCERIN®), or other DFMs such as *Bacillus licheniformis* and *Bacillus subtilis* (from BioPlus® YC) and *Bacillus subtilis* (from GalliPro®).

The DFM may be combined with Enviva® PRO which is commercially available from Danisco A/S. Enviva Pro® is a combination of *Bacillus* strain 2084 Accession No. NRRL B-50013, *Bacillus* strain LSSAO1 Accession No. NRRL B-50104 and *Bacillus* strain 15A-P4 ATCC Accession No. PTA-6507 (as taught in U.S. Pat. No. 7,754,469 B—incorporated herein by reference).

It is also possible to combine the DFM described herein with a yeast from the genera: *Saccharomyces* spp.

Preferably, the DFM described herein comprises microorganisms which are generally recognized as safe (GRAS) and, preferably are GRAS-approved.

A person of ordinary skill in the art will readily be aware of specific species and/or strains of microorganisms from within the genera described herein which are used in the food and/or agricultural industries and which are generally considered suitable for animal consumption.

In some embodiments, it is important that the DFM be heat tolerant, i.e. is thermotolerant. This is particularly the case when the feed is pelleted. Therefore, in another embodiment, the DFM may be a thermotolerant microorganism, such as a thermotolerant bacteria, including for example *Bacillus* spp.

In other aspects, it may be desirable that the DFM comprises a spore producing bacteria, such as *Bacilli*, e.g. *Bacillus* spp. *Bacilli* are able to form stable endospores when conditions for growth are unfavorable and are very resistant to heat, pH, moisture and disinfectants.

The DFM described herein may decrease or prevent intestinal establishment of pathogenic microorganism (such as *Clostridium perfringens* and/or *E. coli* and/or *Salmonella* spp and/or *Campylobacter* spp.). In other words, the DFM may be antipathogenic. The term "antipathogenic" as used herein means the DFM counters an effect (negative effect) of a pathogen.

As described above, the DFM may be any suitable DFM. For example, the following assay "DFM ASSAY" may be used to determine the suitability of a microorganism to be a DFM. The DFM assay as used herein is explained in more detail in US2009/0280090. For avoidance of doubt, the DFM selected as an inhibitory strain (or an antipathogenic DFM) in accordance with the "DFM ASSAY" taught herein is a suitable DFM for use in accordance with the present disclosure, i.e. in the feed additive composition according to the present disclosure.

Tubes were seeded each with a representative pathogen (e.g., bacteria) from a representative cluster.

Supernatant from a potential DFM, grown aerobically or anaerobically, is added to the seeded tubes (except for the control to which no supernatant is added) and incubated. After incubation, the optical density (OD) of the control and supernatant treated tubes was measured for each pathogen.

Colonies of (potential DFM) strains that produced a lowered OD compared with the control (which did not contain any supernatant) can then be classified as an inhibitory strain (or an antipathogenic DFM). Thus, The DFM assay as used herein is explained in more detail in US2009/0280090.

Preferably, a representative pathogen used in this DFM assay can be one (or more) of the following: Clostridium, such as Clostridium perfringens and/or Clostridium difficile, and/or E. coli and/or Salmonella spp and/or Campylobacter spp. In one preferred embodiment, the assay is conducted with one or more of Clostridium perfringens and/or Clostridium difficile and/or E. coli, preferably Clostridium perfringens and/or Clostridium difficile, more preferably Clostridium perfringens.

Antipathogenic DFMs include one or more of the following bacteria and are described in WO2013029013:

Bacillus subtilis strain 3BP5 Accession No. NRRL B-50510,

Bacillus amyloliquefaciens strain 918 ATCC Accession No. NRRL B-50508, and

Bacillus amyloliquefaciens strain 1013 ATCC Accession No. NRRL B-50509.

DFMs may be prepared as culture(s) and carrier(s) (where used) and can be added to a ribbon or paddle mixer and mixed for about 15 minutes, although the timing can be increased or decreased. The components are blended such that a uniform mixture of the cultures and carriers result. The final product is preferably a dry, flowable powder. The DFM(s) comprising one or more bacterial strains can then be added to animal feed or a feed premix, added to an animal's water, or administered in other ways known in the art (preferably simultaneously with the enzymes described herein.

Inclusion of the individual strains in the DFM mixture can be in proportions varying from 1% to 99% and, preferably, from 25% to 75%

Suitable dosages of the DFM in animal feed may range from about $1\times10^3$ CFU/g feed to about $1\times10^{10}$ CFU/g feed, suitably between about $1\times10^4$ CFU/g feed to about $1\times10^8$ CFU/g feed, suitably between about $7.5\times10^4$ CFU/g feed to about $1\times10^7$ CFU/g feed.

In another aspect, the DFM may be dosed in feedstuff at more than about $1\times10^3$ CFU/g feed, suitably more than about $1\times10^4$ CFU/g feed, suitably more than about $5\times10^4$ CFU/g feed, or suitably more than about $1\times10^5$ CFU/g feed.

The DFM may be dosed in a non-inorganic phosphate-containing diet from about $1\times10^3$ CFU/g composition to about $1\times10^{13}$ CFU/g composition, preferably $1\times10^5$ CFU/g composition to about $1\times10^{13}$ CFU/g composition, more preferably between about $1\times10^6$ CFU/g composition to about $1\times10^{12}$ CFU/g composition, and most preferably between about $3.75\times10^7$ CFU/g composition to about $1\times10^{11}$ CFU/g composition. In another aspect, the DFM may be dosed in a feed additive composition at more than about $1\times10^5$ CFU/g composition, preferably more than about $1\times10^6$ CFU/g composition, and most preferably more than about $3.75\times10^7$ CFU/g composition. In one embodiment, the DFM is dosed in the feed additive composition at more than about $2\times10^5$ CFU/g composition, suitably more than about $2\times10^6$ CFU/g composition, suitably more than about $3.75\times10^7$ CFU/g composition.

In still another aspect, there is disclosed a non-inorganic phosphate-containing diet for use in animal feed comprising at least one polypeptide having phytase activity as described herein, used either alone or in combination with at least one direct fed microbial or in combination with at least one other enzyme or in combination with at least one direct fed microbial and at least one other enzyme, wherein the feed additive composition comprises may be in any form such as a granulated particle. Such granulated particles may be produced by a process selected from the group consisting of high shear granulation, drum granulation, extrusion, spheronization, fluidized bed agglomeration, fluidized bed spray coating, spray drying, freeze drying, prilling, spray chilling, spinning disk atomization, coacervation, tableting, or any combination of the above processes.

Furthermore, particles of the granulated feed additive composition can have a mean diameter of greater than 50 microns and less than 2000 microns Those skilled in the art will understand that animal feed may include plant material such as corn, wheat, sorghum, soybean, canola, sunflower or mixtures of any of these plant materials or plant protein sources for poultry, pigs, ruminants, aquaculture and pets. It is contemplated that animal performance parameters, such as growth, feed intake and feed efficiency, but also improved uniformity, reduced ammonia concentration in the animal house and consequently improved welfare and health status of the animals will be improved.

Thus, there is disclosed a method for improving the nutritional value of an animal feed, wherein any of the engineered phytases or fragments thereof as described herein can be added to animal feed.

The phrase, an "effective amount" as used herein, refers to the amount of an active agent (such as, a phytase, e.g. any of the engineered phytase polypeptides disclosed herein) required to confer improved performance on an animal on one or more metrics, either alone or in combination with one or more other active agents (such as, without limitation, one or more additional enzyme(s), one or more DFM(s), one or more essential oils, etc.).

The term "animal performance" as used herein may be determined by any metric such as, without limitation, the feed efficiency and/or weight gain of the animal and/or by the feed conversion ratio and/or by the digestibility of a nutrient in a feed (e.g., amino acid digestibility or phosphorus digestibility) and/or digestible energy or metabolizable energy in a feed and/or by nitrogen retention and/or by animals' ability to avoid the negative effects of diseases or by the immune response of the subject.

Animal performance characteristics may include but are not limited to: body weight; weight gain; mass; body fat percentage; height; body fat distribution; growth; growth rate; egg size; egg weight; egg mass; egg laying rate; mineral absorption; mineral excretion, mineral retention; bone density; bone strength; feed conversion rate (FCR); average daily feed intake (ADFI); Average daily gain (ADG) retention and/or a secretion of any one or more of copper, sodium, phosphorous, nitrogen and calcium; amino acid retention or absorption; mineralization, bone mineralization carcass yield and carcass quality.

By "improved animal performance on one or more metric" it is meant that there is increased feed efficiency, and/or increased weight gain and/or reduced feed conversion ratio and/or improved digestibility of nutrients or energy in a feed and/or by improved nitrogen retention and/or by improved ability to avoid the negative effects of necrotic enteritis and/or by an improved immune response in the subject resulting from the use of feed comprising the feed additive composition described herein as compared to a feed which does not comprise said feed additive composition.

Preferably, by "improved animal performance" it is meant that there is increased feed efficiency and/or increased weight gain and/or reduced feed conversion ratio. As used herein, the term "feed efficiency" refers to the amount of weight gain in an animal that occurs when the animal is fed ad-libitum or a specified amount of food during a period of time. "An improvement in a metric" or "improved metric" as used herein, refers to an improvement in at least one of the parameters listed under the metrics in an animal definition.

By "increased feed efficiency" it is meant that the use of a feed additive composition according the present invention in feed results in an increased weight gain per unit of feed intake compared with an animal fed without said feed additive composition being present.

As used herein, the term "feed conversion ratio" refers to the amount of feed fed to an animal to increase the weight of the animal by a specified amount.

An improved feed conversion ratio means a lower feed conversion ratio.

By "lower feed conversion ratio" or "improved feed conversion ratio" it is meant that the use of a feed additive composition in feed results in a lower amount of feed being required to be fed to an animal to increase the weight of the animal by a specified amount compared to the amount of feed required to increase the weight of the animal by the same amount when the feed does not comprise said feed additive composition.

The improvement in performance parameters may be in respect to a control in which the feed used does not comprise a phytase.

The term Tibia ash refers to a quantification method for bone mineralization. This parameter gives indication if phosphorus is deficient (e.g. the content should be low in the phosphorus deficient negative control diets) or sufficient (e.g. the content in phytase treatments are comparable to a positive control diets that meeting phosphorus requirement in broilers)

The term "phosphorus deficient diet" refers to a diet in which the phosphorous level is not sufficient to satisfy the nutritional requirements of an animal, e.g., a feed formulated with phosphorus levels much lower than the recommended levels by the National Research Council (NRC) or broiler breeders. The animal feed contains lower levels of the mineral than required for optimal growth. If the diet lacks phosphorus, the calcium will also not be taken up by the animal. Excess Ca can lead to poor phosphorus (P) digestibility and contribute to the formation of insoluble mineral-phytate complexes. Both deficiency of P and Ca can cause reduced skeletal integrity, subnormal growth and ultimately weight loss.

The terms "mineralization" or "mineralization" encompass mineral deposition or release of minerals. Minerals may be deposited or released from the body of the animal. Minerals may be released from the feed. Minerals may include any minerals necessary in an animal diet, and may include calcium, copper, sodium, phosphorus, iron and nitrogen.

Nutrient digestibility as used herein means the fraction of a nutrient that disappears from the gastro-intestinal tract or a specified segment of the gastro-intestinal tract, e.g. the small intestine. Nutrient digestibility may be measured as the difference between what is administered to the subject and what comes out in the faeces of the subject, or between what is administered to the subject and what remains in the digesta on a specified segment of the gastro intestinal tract, e.g., the ileum.

Nutrient digestibility as used herein may be measured by the difference between the intake of a nutrient and the excreted nutrient by means of the total collection of excreta during a period of time; or with the use of an inert marker that is not absorbed by the animal, and allows the researcher calculating the amount of nutrient that disappeared in the entire gastro-intestinal tract or a segment of the gastro-intestinal tract. Such an inert marker may be titanium dioxide, chromic oxide or acid insoluble ash. Digestibility may be expressed as a percentage of the nutrient in the feed, or as mass units of digestible nutrient per mass units of nutrient in the feed.

Nutrient digestibility as used herein encompasses phosphorus digestibility, starch digestibility, fat digestibility, protein digestibility, and amino acid digestibility. Digestible phosphorus (P) can be defined as ileal digestible P which is the proportion of total P intake absorbed at the end of the ileum by an animal or the fecal digestible P which is the proportion of total P intake that is not excreted in the feces.

The term "survival" as used herein means the number of subjects remaining alive. The term "improved survival" is another way of saying "reduced mortality".

The term "carcass yield" as used herein means the amount of carcass as a proportion of the live body weight, after a commercial or experimental process of slaughter. The term carcass means the body of an animal that has been slaughtered for food, with the head, entrails, part of the limbs, and feathers or skin removed. The term meat yield as used herein means the amount of edible meat as a proportion of the live body weight, or the amount of a specified meat cut as a proportion of the live body weight.

The terms "carcass quality" and "meat quality" are used interchangeably and refers to the compositional quality (lean to fat ratio) as well as palatability factors such as visual appearance, smell, firmness, juiciness, tenderness, and flavor. For example, producing poultry that does not have a "woody breast." The woody breast is a quality issue stemming from a muscle abnormality in a small percentage of chicken meat in the U.S. This condition causes chicken breast meat to be hard to the touch and often pale in color with poor quality texture. Woody breast does not create any health or food safety concerns for people and the welfare of the chicken itself is not negatively impacted.

An "increased weight gain" refers to an animal having increased body weight on being fed feed comprising a feed additive composition compared with an animal being fed a feed without said feed additive composition being present.

The terms "animal feed composition," "feed", "feedstuff," and "fodder" are used interchangeably and can comprise one or more feed materials selected from the group comprising a) cereals, such as small grains (e.g., wheat, barley, rye, oats and combinations thereof) and/or large grains such as maize or sorghum; b) by products from cereals, such as corn gluten meal, Distillers Dried Grains with Solubles (DDGS) (particularly corn based Distillers Dried Grains with Solubles (cDDGS), wheat bran, wheat middlings, wheat shorts, rice bran, rice hulls, oat hulls, palm kernel, and citrus pulp; c) protein obtained from sources such as soya, sunflower, peanut, lupin, peas, fava beans, cotton, canola, fish meal, dried plasma protein, meat and bone meal, potato protein, whey, copra, sesame; d) oils and fats obtained from vegetable and animal sources; and/or e) minerals and vitamins.

Suitably a premix as referred to herein may be a composition composed of microingredients such as vitamins, minerals, chemical preservatives, antibiotics, fermentation products, and other essential ingredients. Premixes are usually compositions suitable for blending into commercial rations.

As used herein the term "contacted" refers to the indirect or direct application of any of the engineered phytase polypeptides or fragments thereof (or composition comprising any of the engineered phytase polypeptides or fragments thereof) to a product (e.g. the feed). Examples of application methods which may be used, include, but are not limited to, treating the product in a material comprising the feed additive composition, direct application by mixing the feed additive composition with the product, spraying the feed additive composition onto the product surface or dipping the product into a preparation of the feed additive composition. In one embodiment, the feed additive composition of the present invention is preferably admixed with the product (e.g. feedstuff). Alternatively, the feed additive composition may be included in the emulsion or raw ingredients of a feedstuff. For some applications, it is important that the composition is made available on or to the surface of a product to be affected/treated. This allows the composition to impart a performance benefit.

Any of the engineered phytase polypeptides or fragments thereof described herein (or composition comprising such engineered phytase polypeptides or fragments thereof) may be applied to intersperse, coat and/or impregnate a product (e.g. a diet that contains no or substantially no inorganic phosphorus or feedstuff or raw ingredients of a feedstuff) with a controlled amount of said enzyme.

In another aspect, the feed additive composition can be homogenized to produce a powder. The powder may be mixed with other components known in the art. The powder, or mixture comprising the powder, may be forced through a die and the resulting strands are cut into suitable pellets of variable length.

Optionally, the pelleting step may include a steam treatment, or conditioning stage, prior to formation of the pellets. The mixture comprising the powder may be placed in a conditioner, e.g. a mixer with steam injection. The mixture is heated in the conditioner up to a specified temperature, such as from 60-100° C., typical temperatures would be 70° C., 80° C., 85° C., 90° C. or 95° C. The residence time can be variable from seconds to minutes. It will be understood that any of the engineered phytase polypeptides or fragments thereof (or composition comprising any of the engineered phytase polypeptides or fragments thereof) described herein are suitable for addition to any appropriate feed material.

In other embodiments, the granule may be introduced into a feed pelleting process wherein the feed pretreatment process may be conducted between 70° C. and 95° C. for up to several minutes, such as between 85° C. and 95° C.

In some embodiments, any of the engineered phytase polypeptides or fragments thereof can be present in the feed in the range of 1 ppb (parts per billion) to 10% (w/w) based on pure enzyme protein. In some embodiments, the engineered phytase polypeptides or fragments thereof are present in the feedstuff is in the range of 1-100 ppm (parts per million). A preferred dose can be 1-20 g of an engineered phytase polypeptide or fragment thereof per ton of feed product or feed composition or a final dose of 1-20 ppm engineered phytase polypeptide or fragment thereof in the final feed product.

Preferably, an engineered phytase polypeptide or fragment thereof is present in the feed should be at least about 50-10,000 FTU/kg corresponding to roughly 0.1 to 20 mg engineered phytase polypeptide or fragment thereof protein/kg.

Ranges can include, but are not limited to, any combination of the lower and upper ranges discussed above.

Formulations and/or preparations comprising any of the engineered phytase polypeptides or fragments thereof and compositions described herein may be made in any suitable way to ensure that the formulation comprises active phytase enzymes. Such formulations may be as a liquid, a dry powder or a granule which may be uncoated/unprotected or may involve the use of a thermoprotectant coating depending upon the processing conditions. As was noted above, the engineered phytase polypeptides and fragments thereof can be formulated inexpensively on a solid carrier without specific need for protective coatings and still maintain activity throughout the conditioning and pelleting process. A protective coating to provide additional thermostability when applied in a solid form can be beneficial for obtaining pelleting stability when required in certain regions where harsher conditions are used or if conditions warrant it, e.g., as in the case of super conditioning feed above 90° C.

Feed additive composition described herein can be formulated to a dry powder or granules as described in WO2007/044968 (referred to as TPT granules) or WO1997/016076 or WO1992/012645 (each of which is incorporated herein by reference).

In one embodiment the feed additive composition may be formulated to a granule for feed compositions comprising: a core; an active agent (for example, a phytase, such as any of the engineered phytase polypeptides disclosed herein); and at least one coating, the active agent of the granule retaining at least 50% activity, at least 60% activity, at least 70% activity, at least 80% activity after conditions selected from one or more of a) a feed pelleting process, b) a steam-heated feed pretreatment process, c) storage, d) storage as an ingredient in an unpelleted mixture, and e) storage as an ingredient in a feed base mix or a feed premix comprising at least one compound selected from trace minerals, organic acids, reducing sugars, vitamins, choline chloride, and compounds which result in an acidic or a basic feed base mix or feed premix.

With regard to the granule at least one coating may comprise a moisture hydrating material that constitutes at least 55% w/w of the granule; and/or at least one coating may comprise two coatings. The two coatings may be a moisture hydrating coating and a moisture barrier coating. In some embodiments, the moisture hydrating coating may be between 25% and 60% w/w of the granule and the moisture barrier coating may be between 2% and 15% w/w of the granule. The moisture hydrating coating may be selected from inorganic salts, sucrose, starch, and maltodextrin and the moisture barrier coating may be selected from polymers, gums, whey and starch.

In other embodiments, the granule may be introduced into a feed pelleting process wherein the feed pretreatment process may be conducted between 70° C. and 95° C. for up to several minutes, such as between 85° C. and 95° C.

The feed additive composition may be formulated to a granule for animal feed comprising: a core; an active agent, the active agent of the granule retaining at least 80% activity after storage and after a steam-heated pelleting process where the granule is an ingredient; a moisture barrier coating; and a moisture hydrating coating that is at least 25% w/w of the granule, the granule having a water activity of less than 0.5 prior to the steam-heated pelleting process.

The granule may have a moisture barrier coating selected from polymers and gums and the moisture hydrating material may be an inorganic salt. The moisture hydrating coating may be between 25% and 45% w/w of the granule and the moisture barrier coating may be between 2% and 10% w/w of the granule.

Alternatively, the composition is in a liquid formulation suitable for consumption preferably such liquid consumption contains one or more of the following: a buffer, salt, sorbitol and/or glycerol.

Also, the feed additive composition may be formulated by applying, e.g. spraying, the enzyme(s) onto a carrier substrate, such as ground wheat for example.

In one embodiment, the feed additive composition may be formulated as a premix. By way of example only the premix may comprise one or more feed components, such as one or more minerals and/or one or more vitamins.

In one embodiment a direct fed microbial ("DFM") and/or an engineered phytase polypeptide or fragment thereof are formulated with at least one physiologically acceptable carrier selected from at least one of maltodextrin, limestone (calcium carbonate), cyclodextrin, wheat or a wheat component, sucrose, starch, $Na_2SO_4$, Talc, PVA, sorbitol, benzoate, sorbate, glycerol, sucrose, propylene glycol, 1,3-propane diol, glucose, parabens, sodium chloride, citrate, acetate, phosphate, calcium, metabisulfite, formate and mixtures thereof.

It should be noted that any of the engineered phytase polypeptides and fragments thereof may be useful in grain applications, e.g. processing of grains for non-food/feed application, e.g. ethanol production

EXAMPLES

Unless defined otherwise herein, all technical and scientific terms used herein have the same meaning as commonly understood by one of ordinary skill in the art to which this disclosure belongs. Singleton, et al., *DICTIONARY OF MICROBIOLOGY AND MOLECULAR BIOLOGY*, 2D ED., John Wiley and Sons, New York (1994), and Hale & Marham, *THE HARPER COLLINS DICTIONARY OF BIOLOGY*, Harper Perennial, N.Y. (1991) provide one of skill with a general dictionary of many of the terms used with this disclosure.

The disclosure is further defined in the following Examples. It should be understood that these Examples, while indicating certain embodiments, are given by way of illustration only. From the above discussion and the Examples, one skilled in the art can ascertain essential characteristics of this disclosure, and without departing from the spirit and scope thereof, can make various changes and modifications to adapt to various uses and conditions.

Example 1: Efficacy of a Next Generation Biosynthetic Bacterial 6-Phytase Used in a Commercial Diet to Totally Replace Inorganic Phosphate The efficacy of phytase variant PHY-13885 used in commercial diet to totally replace inorganic P was evaluated in a study in broilers at Texas A&M university (USA). In total 10 treatments were tested and these are divided into a two-part study. In the first part of the study, the 4 test groups were fed diets with reduced calcium (Ca) with total replacement of inorganic P. In the second part of the study, the 4 test groups were fed diets with further reduction of digestible amino acids (AA), metabolizable energy (ME) and sodium (Na). Two positive controls were used in the data analysis of the two-part of the study.

Part 1: Comparison of 4 Test Diets with Reduction of Ca, Total Replacement of Inorganic P Compared to Two Positive Controls:

Six treatments were used. A nutrient adequate, but not over-specified positive control diet (PC1, treatment 1) was formulated meeting the nutritional requirement of the broilers. The diets were based on corn, wheat, soybean meal, rapeseed, rice and wheat bran, to provide enough substrate (e.g. phytate) in 4 phases: starter 0-10 days of age, grower 11-21 days of age, finisher 1, 21-35 days of age and finisher 2, 35-42 days of age. A negative control basal diet was formulated without any inorganic phosphorus (P), with reduction of Ca (about 0.2-0.3% unit in each phase relative to PC1, Table 1a,b). The basal diet was supplemented with the next generation biosynthetic bacterial 6-phytase: 1) at 1000 FTU/kg through all 4 phases (treatment 2, NC1a); 2) at 2000 FTU/kg in starter, 1500 FTU/kg in grower and 1000 FTU/kg in finisher 1 and 2 (NC1b, treatment 3); 3) at 3000 FTU/kg in starter, 2000 FTU/kg in grower and 1000 FTU/kg in finisher 1 and 2 (NC1c, treatment 4); 4) the same as NC1b but with reduction of 71 kcal/kg ME and supplemented with 2000 XU/kg Danisco xylanase (NC1d, treatment 5). A second positive control diet was formulated with reduction of 71 kcal/kg ME vs PC1, with addition of 2000 XU/kg Danisco xylanase (treatment 6, PC2).

For each of the 6 treatments 10 replicates of 24 birds per pen (Ross 308; 50% male & 50% female) was used. The birds were fed crumbles (starter phase) or pelleted diets (grower and finisher phases) ad lib in all phases. At day 21 and the end of the trial, 4 birds (2 male and 2 females) were randomly selected to determine defatted tibia ash content. At the end of the trial, carcass quality was measured from randomly selected birds (6 birds/pen).

TABLE 1a

Ingredient and calculated nutrient for Starter and Grower phases of trial 1, part 1

| | Starter (1-10 d) | | | | | | Grower (10-21 d) | | | | | |
|---|---|---|---|---|---|---|---|---|---|---|---|---|
| | PC1 | NC1a | NC1b | NC1c | NC1d | PC2 | PC1 | NC1a | NC1b | NC1c | NC1d | PC2 |
| Ingredient, % as is | | | | | | | | | | | | |
| Corn | 34.94 | 34.94 | 34.94 | 34.94 | 32.12 | 32.93 | 32.43 | 32.43 | 32.43 | 32.43 | 30.06 | 31.27 |
| Soybean meal | 27.64 | 27.64 | 27.64 | 27.64 | 27.64 | 27.64 | 26.53 | 26.53 | 26.53 | 26.53 | 26.53 | 26.53 |
| Wheat | 20.44 | 20.44 | 20.44 | 20.44 | 20.44 | 20.44 | 22.89 | 22.89 | 22.89 | 22.89 | 22.89 | 22.89 |
| Rapeseed meal | 5.00 | 5.00 | 5.00 | 5.00 | 5.00 | 5.00 | 5.50 | 5.50 | 5.50 | 5.50 | 5.50 | 5.50 |
| Rice Bran | 5.00 | 5.00 | 5.00 | 5.00 | 5.00 | 5.00 | 4.50 | 4.50 | 4.50 | 4.50 | 4.50 | 4.50 |
| Wheat bran | 1.00 | 1.00 | 1.00 | 1.00 | 2.53 | 1.74 | 1.00 | 1.50 | 1.50 | 1.50 | 2.65 | 1.87 |
| Oat Hulls | 1.00 | 2.65 | 2.65 | 2.65 | 4.17 | 2.57 | 2.25 | 2.22 | 2.22 | 2.22 | 3.73 | 2.30 |
| Soy oil | 0.74 | 0.74 | 0.74 | 0.74 | 0.51 | 0.46 | 1.00 | 2.25 | 2.25 | 9.95 | 1.96 | 1.76 |
| Limestone | 1.33 | 1.17 | 1.17 | 1.17 | 1.16 | 1.32 | 1.11 | 0.98 | 0.98 | 0.98 | 0.97 | 1.10 |
| MCP | 1.49 | — | — | — | — | 1.48 | 1.10 | — | — | — | — | 1.09 |
| DL-Methionine | 0.31 | 0.31 | 0.31 | 0.31 | 0.31 | 0.31 | 0.24 | 0.24 | 0.24 | 0.24 | 0.24 | 0.25 |
| L-Lysine HCL | 0.37 | 0.37 | 0.37 | 0.37 | 0.36 | 0.36 | 0.24 | 0.24 | 0.24 | 0.24 | 0.23 | 0.24 |
| L-Threonine | 0.10 | 0.10 | 0.10 | 0.10 | 0.10 | 0.10 | 0.08 | 0.08 | 0.08 | 0.08 | 0.08 | 0.08 |
| L-Tryptophan | 0.00 | 0.00 | 0.00 | 0.00 | 0.00 | 0.00 | — | — | — | — | — | — |
| NaCl | 0.35 | 0.35 | 0.35 | 0.35 | 0.35 | 0.35 | 0.35 | 0.35 | 0.35 | 0.35 | 0.35 | 0.35 |
| TEMU vitamin premix | 0.25 | 0.25 | 0.25 | 0.25 | 0.25 | 0.25 | 0.25 | 0.25 | 0.25 | 0.25 | 0.25 | 0.25 |
| TEMU mineral premix | 0.05 | 0.05 | 0.05 | 0.05 | 0.05 | 0.05 | 0.05 | 0.05 | 0.05 | 0.05 | 0.05 | 0.05 |
| Phytase, FTU/kg | — | 1,000 | 2,000 | 3,000 | 2,000 | — | — | 1,000 | 1,500 | 2,000 | 1,500 | — |
| Danisco Xylanase, U/kg | — | — | — | — | 2,000 | 2,000 | — | — | — | — | 2,000 | 2,000 |
| Nutrient composition, % | | | | | | | | | | | | |
| M.E. (kcal/kg) | 2950 | 2950 | 2950 | 2950 | 2879 | 2879 | 3050 | 3050 | 3050 | 3050 | 2978 | 2977.71 |
| Crude Protein | 22.01 | 22.09 | 22.09 | 22.09 | 22.18 | 22.04 | 21.64 | 21.70 | 21.70 | 21.70 | 21.76 | 21.67 |
| Crude Fat | 3.68 | 3.71 | 3.71 | 3.71 | 3.49 | 3.40 | 5.09 | 5.11 | 5.11 | 5.11 | 4.83 | 4.60 |
| Fiber | 3.70 | 4.14 | 4.14 | 4.14 | 4.64 | 4.15 | 3.76 | 4.09 | 4.09 | 4.09 | 4.56 | 4.12 |
| Calcium | 0.92 | 0.62 | 0.62 | 0.62 | 0.62 | 0.92 | 0.77 | 0.54 | 0.54 | 0.54 | 0.54 | 0.77 |
| Total Phosphorus | 0.84 | 0.50 | 0.50 | 0.50 | 0.52 | 0.85 | 0.74 | 0.50 | 0.50 | 0.50 | 0.51 | 0.75 |
| Available Phosphorus | 0.43 | 0.15 | 0.15 | 0.15 | 0.15 | 0.43 | 0.36 | 0.15 | 0.15 | 0.15 | 0.15 | 0.36 |
| Phytate Phosphorus | 0.41 | 0.36 | 0.36 | 0.36 | 0.37 | 0.41 | 0.39 | 0.35 | 0.35 | 0.35 | 0.36 | 0.39 |
| Sodium | 0.17 | 0.17 | 0.17 | 0.17 | 0.17 | 0.17 | 0.17 | 0.17 | 0.17 | 0.17 | 0.17 | 0.17 |
| Chloride | 0.25 | 0.25 | 0.25 | 0.25 | 0.26 | 0.25 | 0.25 | 0.25 | 0.25 | 0.25 | 0.25 | 0.25 |
| Dig. Lys | 1.22 | 1.22 | 1.22 | 1.22 | 1.22 | 1.22 | 1.10 | 1.10 | 1.10 | 1.10 | 1.10 | 1.10 |
| Dig. Met | 0.61 | 0.61 | 0.61 | 0.61 | 0.61 | 0.61 | 0.54 | 0.54 | 0.54 | 0.54 | 0.54 | 0.54 |
| Dig. TSAA | 0.91 | 0.91 | 0.91 | 0.91 | 0.91 | 0.91 | 0.84 | 0.84 | 0.84 | 0.84 | 0.84 | 0.84 |
| Dig. Thr | 0.76 | 0.76 | 0.76 | 0.76 | 0.76 | 0.76 | 0.73 | 0.73 | 0.73 | 0.73 | 0.73 | 0.73 |
| Dig. Trp | 0.22 | 0.22 | 0.22 | 0.22 | 0.22 | 0.22 | 0.22 | 0.22 | 0.22 | 0.22 | 0.22 | 0.22 |
| Dig. Arg | 1.25 | 1.25 | 1.25 | 1.25 | 1.25 | 1.25 | 1.23 | 1.23 | 1.23 | 1.23 | 1.23 | 1.23 |
| Dig. Val | 0.88 | 0.88 | 0.88 | 0.88 | 0.88 | 0.88 | 0.87 | 0.87 | 0.87 | 0.87 | 0.87 | 0.87 |
| Dig. Ile | 0.78 | 0.78 | 0.78 | 0.78 | 0.78 | 0.78 | 0.77 | 0.77 | 0.77 | 0.77 | 0.77 | 0.77 |

TABLE 1b

Ingredient and calculated nutrient composition for Finisher 1 and Finisher 2 phases of trial 1, part 1

| | Finisher 1 (21-35 d) | | | | | | Finisher 2 (35-42 d) | | | | | |
|---|---|---|---|---|---|---|---|---|---|---|---|---|
| | PC1 | NC1a | NC1b | NC1c | NC1d | PC2 | PC1 | NC1a | NC1b | NC1c | NC1d | PC2 |
| Ingredient, % as is | | | | | | | | | | | | |
| Corn | 31.89 | 31.89 | 31.89 | 31.89 | 31.28 | 30.98 | 31.19 | 31.18 | 31.18 | 31.18 | 30.61 | 30.28 |
| Soybean meal | 21.28 | 21.28 | 21.28 | 21.28 | 21.30 | 21.28 | 18.26 | 18.26 | 18.26 | 18.26 | 18.26 | 18.26 |
| Wheat, grain | 28.21 | 28.21 | 28.21 | 28.21 | 28.21 | 28.21 | 31.32 | 31.32 | 31.32 | 31.32 | 31.32 | 31.32 |
| Rapeseed meal | 6.00 | 6.00 | 6.00 | 6.00 | 6.00 | 6.00 | 6.30 | 6.30 | 6.30 | 6.30 | 6.30 | 6.30 |
| Rice Bran | 4.30 | 4.30 | 4.30 | 4.30 | 4.30 | 4.30 | 4.30 | 4.30 | 4.30 | 4.30 | 4.30 | 4.30 |
| Wheat bran | 2.00 | 2.00 | 2.00 | 2.00 | 2.05 | 2.44 | 2.20 | 2.20 | 2.20 | 2.20 | 2.54 | 2.54 |
| Oat Hulls | 1.00 | 1.90 | 1.90 | 1.90 | 3.06 | 2.13 | 1.00 | 1.99 | 1.99 | 1.99 | 2.93 | 2.16 |
| Soy oil | 2.50 | 2.50 | 2.50 | 2.50 | 1.89 | 1.85 | 2.67 | 2.67 | 2.67 | 2.67 | 1.97 | 2.09 |
| Limestone | 0.87 | 0.79 | 0.79 | 0.79 | 0.78 | 0.86 | 0.88 | 0.71 | 0.71 | 0.71 | 0.71 | 0.87 |
| MCP | 0.82 | — | — | — | — | 0.81 | 0.82 | — | — | — | — | 0.82 |
| DL-Methionine | 0.19 | 0.19 | 0.19 | 0.19 | 0.19 | 0.19 | 0.15 | 0.15 | 0.15 | 0.15 | 0.15 | 0.15 |
| L-Lysine HCL | 0.25 | 0.25 | 0.25 | 0.25 | 0.25 | 0.25 | 0.22 | 0.22 | 0.22 | 0.22 | 0.22 | 0.22 |
| L-Threonine | 0.06 | 0.06 | 0.06 | 0.06 | 0.06 | 0.06 | 0.05 | 0.05 | 0.05 | 0.05 | 0.05 | 0.05 |
| L-TRYPTOPHAN | — | — | — | — | — | — | — | — | — | — | — | — |
| NaCl | 0.34 | 0.34 | 0.34 | 0.34 | 0.34 | 0.34 | 0.34 | 0.34 | 0.34 | 0.34 | 0.33 | 0.34 |
| TEMU vitamin premix | 0.25 | 0.25 | 0.25 | 0.25 | 0.25 | 0.25 | 0.25 | 0.25 | 0.25 | 0.25 | 0.25 | 0.25 |
| TEMU mineral premix | 0.05 | 0.05 | 0.05 | 0.05 | 0.05 | 0.05 | 0.05 | 0.05 | 0.05 | 0.05 | 0.05 | 0.05 |
| Phytase*, FTU/kg | — | 1,000 | 1,000 | 1,000 | 1,000 | — | — | 1,000 | 1,000 | 1,000 | 1,000 | — |
| Danisco Xylanase, U/kg | — | — | — | — | 2,000 | 2,000 | — | — | — | — | 2,000 | 2,000 |
| Nutrient composition, % | | | | | | | | | | | | |
| M.E. (kcal/kg) | 3100 | 3100 | 3100 | 3100 | 3027 | 3023 | 3120 | 3120 | 3120 | 3120 | 3048 | 3047 |
| Crude Protein | 20.06 | 20.10 | 20.10 | 20.10 | 20.13 | 20.11 | 19.10 | 19.14 | 19.14 | 19.14 | 19.20 | 19.14 |
| Crude Fat | 5.34 | 5.36 | 5.36 | 5.36 | 4.76 | 4.70 | 5.52 | 5.54 | 5.54 | 5.54 | 4.86 | 4.94 |
| Fiber | 3.83 | 4.07 | 4.07 | 4.07 | 4.37 | 4.16 | 3.86 | 4.13 | 4.13 | 4.13 | 4.40 | 4.19 |
| Calcium | 0.62 | 0.46 | 0.46 | 0.46 | 0.46 | 0.62 | 0.62 | 0.42 | 0.42 | 0.42 | 0.42 | 0.62 |
| Total Phosphorus | 0.67 | 0.48 | 0.48 | 0.48 | 0.48 | 0.67 | 0.66 | 0.47 | 0.47 | 0.47 | 0.48 | 0.66 |
| Available Phosphorus | 0.30 | 0.14 | 0.14 | 0.14 | 0.14 | 0.30 | 0.30 | 0,14 | 0.14 | 0.14 | 0.14 | 0.30 |
| Phytate Phosphorus | 0.37 | 0.34 | 0.34 | 0.34 | 0.34 | 0.37 | 0.36 | 0.33 | 0.33 | 0.33 | 0.34 | 0.36 |
| Sodium | 0.17 | 0.17 | 0.17 | 0.17 | 0.17 | 0.17 | 0.17 | 0.17 | 0.17 | 0.17 | 0.17 | 0.17 |
| Chloride | 0.25 | 0.25 | 0.25 | 0.25 | 0.25 | 0.25 | 0.25 | 0.25 | 0.25 | 0.25 | 0.25 | 0.25 |
| Dig. Lys | 1.00 | 1.00 | 1.00 | 1.00 | 1.00 | 1.00 | 0.92 | 0.92 | 0.92 | 0.92 | 0.92 | 0.92 |
| Dig. Met | 0.47 | 0.47 | 0.47 | 0.47 | 0.47 | 0.47 | 0.42 | 0.42 | 0.42 | 0.42 | 0.42 | 0.42 |
| Dig. TSAA | 0.76 | 0.76 | 0.76 | 0.76 | 0.76 | 0.76 | 0.70 | 0.70 | 0.70 | 0.70 | 0.70 | 0.70 |
| Dig. Thr | 0.66 | 0.66 | 0.66 | 0.66 | 0.66 | 0.66 | 0.61 | 0.61 | 0.61 | 0.61 | 0.61 | 0.61 |
| Dig. Trp | 0.20 | 0.20 | 0.20 | 0.20 | 0.20 | 0.20 | 0.19 | 0.19 | 0.19 | 0.19 | 0.19 | 0.19 |
| Dig. Arg | 1.11 | 1.11 | 1.11 | 1.11 | 1.10 | 1.11 | 1.03 | 1.03 | 1.03 | 1.03 | 1.03 | 1.03 |
| Dig. Val | 0.81 | 0.81 | 0.81 | 0.81 | 0.81 | 0.81 | 0.77 | 0.77 | 0.77 | 0.77 | 0.77 | 0.77 |
| Dig. Ile | 0.70 | 0.70 | 0.70 | 0.70 | 0.70 | 0.70 | 0.66 | 0.66 | 0.66 | 0.66 | 0.66 | 0.66 |

*The phytase was produced by fermentation with a fungal (Trichoderma reesei) production strain expressing a biosynthetic variant of a consensus bacterial phytase gene (DuPont Nutrition and Biosciences).

Data were analysed using one-way ANOVA, treatment mean were separated using Tukey HSD test. P<0.05 was considered a statistically significant difference.

The performance results are summarized in Table 2

TABLE 2 effect of total replacement of inorganic P by phytase in the diets with reduced Ca on performance in broilers, trial 1, part 1

| 0-10 d | BW, kg d10 | | Feed Intake, g/d | FCR | |
|---|---|---|---|---|---|
| PC1 | 0.28 | b | 27.9 | 1.134 | |
| NC1a | 0.29 | ab | 28.2 | 1.117 | |
| NC1b | 0.29 | ab | 29.0 | 1.110 | |
| NC1c | 0.29 | ab | 30.1 | 1.106 | |
| NC1d | 0.29 | ab | 28.9 | 1.110 | |
| PC2 | 0.30 | a | 29.6 | 1.121 | |
| SEM | 0.00 | | 0.61 | 0.01 | |
| P values | 0.02 | | 0.11 | 0.18 | |

| 0-21d | BW, kg d21 | Feed Intake, g/d | FCR | |
|---|---|---|---|---|
| PC1 | 0.97 | 58.7 | 1.334 | a |
| NC1a | 0.96 | 58.3 | 1.354 | a |
| NC1b | 0.97 | 57.3 | 1.326 | a |
| NC1c | 1.00 | 59.2 | 1.325 | a |
| NC1d | 0.99 | 59.0 | 1.353 | a |
| PC2 | 0.98 | 59.6 | 1.340 | a |
| SEM | 0.01 | 0.72 | 0.01 | |
| P values | 0.06 | 0.28 | 0.04* | |

| 0-35d | BW, kg d35 | Feed intake, g/d | FCR | |
|---|---|---|---|---|
| PC1 | 2.22 | 85.5 | 1.534 | |
| NC1a | 2.24 | 83.8 | 1.532 | |
| NC1b | 2.23 | 83.0 | 1.544 | |
| NC1c | 2.31 | 85.1 | 1.508 | |
| NC1d | 2.25 | 82.1 | 1.516 | |
| PC2 | 2.25 | 85.0 | 1.527 | |
| SEM | 0.03 | 1.13 | 0.01 | |
| P values | 0.53 | 0.22 | 0.56 | |

| 0-42d | BW, kg d42 | Feed Intake, g/d | FCR | FCRc** |
|---|---|---|---|---|
| PC1 | 2.77 | 104.9 | 1.705 | 1.73 |
| NC1a | 2.87 | 107.0 | 1.681 | 1.68 |
| NC1b | 2.88 | 106.3 | 1.692 | 1.69 |
| NC1c | 2.98 | 108.2 | 1.654 | 1.61 |
| NC1d | 2.89 | 105.5 | 1.658 | 1.65 |
| PC2 | 2.86 | 106.0 | 1.694 | 1.69 |
| SEM | 0.06 | 1.50 | 0.02 | 0.03 |
| P values | 0.30 | 0.69 | 0.24 | 0.23 |

[a,b,c]different superscript in a column indicates significantly different at P < 0.05

*PC 1: a nutrient adequate, but not over-specified positive control diet;

NC1a. supplemented with the phytase at 1000 FTU/kg through all 4 phases.

NC1b: supplemented with the phytase at 2000 FTU/kg in starter, 1500 FTU/kg in grower and 1000 FTU/kg in finisher 1 and 2;

NC1c: supplemented FTU/kg in grower and 1000 FTU/kg in finisher 1 and 2;

NC1d: NC1b with reduction of 71 kcal/kg ME and supplemented with 2000 XU/kg Danisco xylanase;

PC2: reduction of 71 kcal/kg ME vs PC1, with addition of 2000 XU/kg Danisco xylanase.

*Tukey test showed the same superscript

**FCRc: body weight corrected FCR, e.g. BW difference to 2.85 kg: FCRc = $FCR_{(0-42d)} + (((2.85-BW_{042,kg}) * 1000)/32)/100$, BW at 2.85 kg is used for Ross 308 mixed sex.

The results showed that phytase with different dosing strategy in the diets or in combination with xylanase, with diets were formulated with low Ca, sufficient phytate substrate and with oat hulls to support gizzard development, could totally replace all inorganic P and maintain the performance of broilers compared to the PCs and the Ross 308 broiler breeders objectives (Table 2 and 14).

Bone breaking strength of the treatments did not deteriorate compared to the controls, on the contrary at 42 days the bone strength was significant higher (P<0.05) for the highest start phytase dose (3000 FTU) and 2000 FTU phytase+ xylanase combination compared to the PC without any enzymes (Table 4).

TABLE 4 effect of total replacement of inorganic P by phytase in the diets with reduced Ca on bone ash and bone breaking strength in broilers, trial 1, part 1

| | d21 Tibia Ash, % | | d21 Breaking Strength | d42 Tibia Ash, % | d42 Breaking Strength | |
|---|---|---|---|---|---|---|
| PC1 | 51.4 | ab | 32.5 | 46.6 | 39.2 | b |
| NC1a | 50.6 | b | 31.2 | 46.6 | 44.5 | ab |
| NC1b | 50.6 | b | 33.6 | 45.4 | 44.6 | ab |
| NC1c | 50.7 | b | 33.7 | 45.8 | 44.9 | a |
| NC1d | 51.1 | ab | 32.0 | 45.8 | 47.0 | a |
| PC2 | 51.9 | a | 33.0 | 47.5. | 43.1 | ab |
| SEM | 0.28 | | 0.94 | 0.62 | 1.38 | |
| P value | 0.01 | | 0.41 | 0.19 | 0.00 | |

[a,b,c]different superscript in a column indicates significantly different at $P < 0.05$
*PC1: a nutrient adequate, but not over-specified positive control diet;
NC1a: supplemented with the phytase at 1000 FTU/kg through all 4 phases.
NC1b: supplemented with the phytase at 2000 FTU/kg in starter, 1500 FTU/kg in grower and 1000 FTU/kg in finisher 1 and 2;
NC1c: supplemented with phytase at 3000 FTU/kg in starter, 2000 FTU/kg in grower and 1000 FTU/kg in finisher 1 and 2
NC1d: NC1b with reduction of 71 kcal/kg ME and supplemented with 2000 XU/kg Danisco xylanase;
PC2: reduction of 71 kcal/kg ME vs PC1, with addition of 2000 XU/kg Danisco xylanase.

All test groups maintained carcass characteristics. However, the treatment with phytase added at 3000 (starter), 2000 (grower), 1000 (finisher 1&2) FTU/kg showed greater (P<0.05) breast yield compared to both of the controls (Table 5).

TABLE 5 effect of total replacement of inorganic P by phytase in the diets with reduced Ca on carcass characteristics in broilers, trial 1, part 1

| Yield, % | Carcass Yield | breast yield | | Tender Yield | Leg Yield | | Fat Pad Yield | |
|---|---|---|---|---|---|---|---|---|
| PC1 | 76.94 | 24.55 | c | 4.74 | 33.61 | a | 1.42 | a |
| NC1a | 77.00 | 25.54 | ab | 4.84 | 32.70 | a | 1.24 | ab |
| NC1b | 76.62 | 25.13 | abc | 4.81 | 32.79 | a | 1.31 | ab |
| NC1c | 76.81 | 25.99 | a | 4.86 | 32.74 | a | 1.23 | b |
| NC1d | 76.97 | 25.07 | abc | 4.88 | 33.00 | a | 1.20 | b |
| PC2 | 77.63 | 24.75 | bc | 4.74 | 33.29 | a | 1.37 | ab |
| SEM | 0.43 | 0.23 | | 0.043 | 0.24 | | 0.05 | |
| P values | 0.66 | 0.0001 | | 0.0732 | 0.042 | | 0.006 | |

[a,b,c]different superscript in a column indicates significantly different at $P < 0.05$
*PC1: a nutrient adequate, but not over-specified positive control diet;
NC1a: supplemented with the phytase at 1000 FTU/kg through all 4 phases.
NC1b. supplemented with the phytase at 2000 FTU/kg in starter, 1500 FTU/kg in grower and 1000 FTU/kg in finisher 1 and 2;
NC1c: supplemented with phytase at 3000 FTU/kg in starter, 2000 FTU/g in grower and 1000 FTU/kg in finisher 1 and 2;
NC1d: NC1b with reduction of 71 kcal/kg ME and supplemented with 2000 XU/kg Danisco xylanase;
PC2: reduction of 71 kcal/kg ME vs PC1, with addition of 2000 XU/g Danisco xylanase.

Part 2: Comparison of 4 Test Diets with Further Reduction on Digestible AA, ME and Na, in Addition to Reduction of Ca, Total Replacement of Inorganic P Compared to Two Positive Controls.

In the four test groups (NC2a, NC2,b, NC2c, NC2d), same enzyme inclusion was used as NC1a, NC1b, NC1c and NC1d, however, these diets were formulated with further reduction of digestible AA, ME and Na, based on the substrate specific matrix (developed for Axtra® PHY, a commercial phytase produced by DuPont Nutrition & Biosciences) at given dose levels, as shown in Table 6,a,b.

Table 6a

Ingredient and calculated nutrient for Starter and Grower phases of trial 1, part 2

| | Starter (1-10 d) | | | | | | Grower (10-21 d) | | | | | |
|---|---|---|---|---|---|---|---|---|---|---|---|---|
| | PC1 | NC2a | NC2b | NC2c | NC2d | PC2 | PC1 | NC2a | NC2b | NC2c | NC2d | PC2 |
| Ingredient, % as is | | | | | | | | | | | | |
| Corn | 34.94 | 32.30 | 32.30 | .32.30 | 30.43 | 32 93 | 32.43 | 30.91 | 30.91 | 30.91 | 28.06 | 31.27 |
| Soybean meal | 27.64 | 25.62 | 25.62 | 25.62 | 24.48 | 27.64 | 26.53 | 24.78 | 24.78 | 24.78 | 23.76 | 26.53 |

Table 6a-continued

Ingredient and calculated nutrient for Starter and Grower phases of trial 1, part 2

| | Starter (1-10 d) | | | | | | Grower (10-21 d) | | | | | |
|---|---|---|---|---|---|---|---|---|---|---|---|---|
| | PC1 | NC2a | NC2b | NC2c | NC2d | PC2 | PC1 | NC2a | NC2b | NC2c | NC2d | PC2 |
| Wheat | 20.44 | 20.44 | 20.44 | 20.44 | 20.44 | 20.44 | 22.89 | 22.89 | 22.89 | 22.89 | 22.89 | 22.89 |
| Rapeseed meal | 5.00 | 5.51 | 5.51 | 5.51 | 7.21 | 5.00 | 5.50 | 6.23 | 6.23 | 6.23 | 6.78 | 5.50 |
| Rice Bran | 5.00 | 6.00 | 6.00 | 6.00 | 5.20 | 5.00 | 4.50 | 5.00 | 5.00 | 5.00 | 5.62 | 4.50 |
| Wheat bran | 1.00 | 2.15 | 2.15 | 2.15 | 4.21 | 1.74 | 1.50 | 2.84 | 2.84 | 2.84 | 4.49 | 1.87 |
| Oat Hulls | 1.00 | 4.92 | 4.92 | 4.92 | 5.30 | 2.57 | 1.00 | 3.53 | 3.53 | 3.53 | 4.72 | 2.30 |
| Soy oil | 0.74 | 0,62 | 0.62 | 0.62 | 0.32 | 0.46 | 2.25 | 1.76 | 1 76 | 1.76 | 1.60 | 1.76 |
| Limestone | 1.33 | 1 17 | 1.17 | 1.17 | 1.14 | 1.32 | 1.11 | 1.05 | 1.05 | 1.05 | 1.04 | 1.10 |
| MCP | 1.49 | — | — | — | — | 1.48 | 1.10 | — | — | — | — | 1.09 |
| DL-Methionine | 0.31 | 0.29 | 0.29 | 0.29 | 0.28 | 0.31 | 0.24 | 0.22 | 0.22 | 0.22 | 0.22 | 0.25 |
| L-Lysine HCL | 0.37 | 0.36 | 0.36 | 0.36 | 0.36 | 0.36 | 0.24 | 0.22 | 0.22 | 0.22 | 0.23 | 0.24 |
| L-Threonine | 0.10 | 0.09 | 0.09 | 0.09 | 0.09 | 0.10 | 0.08 | 0.06 | 0.06 | 0.06 | 0.06 | 0.08 |
| L-Tryptophan | 0.00 | 0.00 | 0.00 | 0.00 | 0.00 | 0.00 | — | — | — | — | — | — |
| NaCl | 0.35 | 0.24 | 0.24 | 0 24 | 0.24 | 0.35 | 0.35 | 0.24 | 0.24 | 0.24 | 0.24 | 0.35 |
| TEMU vitamin premix | 0.25 | 0.25 | 0.25 | 0.25 | 0.25 | 0.25 | 0.25 | 0.25 | 0.25 | 0.25 | 0.25 | 0.25 |
| TEMU mineral premix | 0.05 | 0.05 | 0.05 | 0.05 | 0.05 | 0.05 | 0.05 | 0.05 | 0.05 | 0.05 | 0.05 | 0.05 |
| Phytase. FTU/kg | — | 1,000 | 2,000 | 3,000 | 2.000 | — | — | 1,000 | 1.500 | 2,000 | 1,500 | — |
| Danisco Xylanase, U/kg | — | — | — | — | 2,000 | 2,000 | — | — | — | — | 2,000 | 2,000 |
| Nutrient composition, % | | | | | | | | | | | | |
| M.E. (kcal/kg) | 2950 | 2876 | 2876 | 2876 | 2824 | 2879 | 3050 | 2978 | 2978 | 2978 | 2924 | 2978 |
| Crude Protein | 22.01 | 21.50 | 21.50 | 21.50 | 21.64 | 22.04 | 21.64 | 21.30 | 21.30 | 21.30 | 21.21 | 21.67 |
| Crude Fat | 3.68 | 3.74 | 3.74 | 3.74 | 3.39 | 3.40 | 5.09 | 4.73 | 4.73 | 4.73 | 4.67 | 4.60 |
| Fiber | 3.70 | 4.88 | 4.88 | 4.88 | 5.27 | 4.15 | 3.76 | 4.61 | 4.61 | 4.61 | 5.12 | 4.12 |
| Calcium | 0.92 | 0.62 | 0.62 | 0.62 | 0.62 | 0.92 | 0.77 | 0.57 | 0.57 | 0.57 | 0.57 | 0.77 |
| Total Phosphors | 0.84 | 0.53 | 0.53 | 0.53 | 0.55 | 0.85 | 0.74 | 0.52 | 0.52 | 0.52 | 0.55 | 0.75 |
| Available Phosphorus | 0.43 | 0.15 | 0.15 | 0.15 | 0.16 | 0.43 | 0.36 | 0.15 | 0.15 | 0.15 | 0.16 | 0.36 |
| Phytate Phosphorus | 0.41 | 0.38 | 0.38 | 0.38 | 0.40 | 0.41 | 0.39 | 0.37 | 0.37 | 0.37 | 0.40 | 0.39 |
| Sodium | 0.17 | 0.13 | 0.13 | 0.1 3 | 0.13 | 0.17 | 0.17 | 0.13 | 0.13 | 0.13 | 0.13 | 0.17 |
| Chloride | 0.25 | 0.19 | 0.19 | 0.19 | 0.19 | 0.25 | 0.25 | 0.19 | 0.19 | 0.19 | 0.19 | 0.25 |
| Dig, Lys | 1.22 | 1.18 | 1.18 | 1.18 | 1.18 | 1.22 | 1.10 | 1.06 | 1.06 | 1.06 | 1.06 | 1.10 |
| Dig. Met | 0.61 | 0.58 | 0.58 | 0.58 | 0.57 | 0.61 | 0.54 | 0.51 | 0.5 1 | 0.51 | 0.51 | 0.54 |
| Dig. TSAA | 0.91 | 0.87 | 0.87 | 0.87 | 0.87 | 0.91 | 0.84 | 0.81 | 0.81 | 0.81 | 0.81 | 0.84 |
| Dig. Thr | 0.76 | 0.73 | 0.73 | 0.73 | 0.73 | 0.76 | 0.73 | 0.70 | 0.70 | 0.70 | 0.70 | 0.73 |
| Dig. Trp | 0.22 | 0.22 | 0.22 | 0.22 | 0.22 | 0.22 | 0.22 | 0.21 | 0.21 | 0.21 | 0.21 | 0.22 |
| Dig. Arg | 1.25 | 1.20 | 1.20 | 1.20 | 1.21 | 1.25 | 1.23 | 1.20 | 1.20 | 1.20 | 1.19 | 1.23 |
| Dig. Val | 0.88 | 0.85 | 0.85 | 0.85 | 0.86 | 0.88 | 0.87 | 0.85 | 0.85 | 0.85 | 0.85 | 0.87 |
| Dig. He | 0.78 | 0.75 | 0.75 | 0.75 | 0.75 | 0.78 | 0.77 | 0.75 | 0.75 | 0.75 | 0.74 | 0.77 |

TABLE 6b

Ingredient and calculated nutrient composition for Finisher 1 and Finisher 2 phases of trial 1, part 2

| | Finisher 1 (21-35 d) | | | | | | Finisher 2 (35-42 d) | | | | | |
|---|---|---|---|---|---|---|---|---|---|---|---|---|
| | PC1 | NC2a | NC2b | NC2c | NC2d | PC2 | PC1 | NC2a | NC2b | NC2c | NC2d | PC2 |
| Ingedient, % as is | | | | | | | | | | | | |
| Corn | 31.89 | 29.51 | 29.51 | 29.51 | 27 12 | 30.98 | 31.19 | 28.38 | 28.38 | 28.38 | 27.82 | 30.28 |
| Soybean meal | 21.28 | 19.65 | 19,65 | 19.6.5 | 19.00 | 21.28 | 78.26 | 17.25 | 17.25 | 17.25 | 17.25 | 18.20 |
| Wheat grain | 28.21 | 28.21 | 28.21 | 28.21 | 28.21 | 28.21 | 31.32 | 31.32 | 31.32 | 31.32 | 31.32 | 31.3 |
| Rapeseed meal | 6.00 | 7.47 | 7.47 | 7.47 | 8.29 | 6.00 | 6.30 | 6.82 | 6.82 | 6.82 | 6.82 | 6.30 |
| Rice Bran | 4.30 | 4 85 | 4.85 | 4.85 | 5.32 | 4.30 | 4.30 | 4.42 | 4.42 | 4.42 | 4 42 | 4.30 |
| Wheat bran | 2.00 | 4.00 | 4.00 | 4.00 | 4.75 | 2.44 | 2.20 | 4.00 | 4.00 | 4.00 | 4.48 | 2.54 |
| Oat Hulls | 1.00 | 2.87 | 2.87 | 2.87 | 3.99 | 2.13 | 1.00 | 3.76 | 3.76 | 3.76 | 4.38 | 2.16 |
| Soy oil | 2.50 | 1.85 | 1.85 | 1.85 | 1.73 | 1.85 | 2.67 | 2.50 | 2.50 | 2.50 | 1.96 | 2.09 |
| Limestone | 0.87 | 0.67 | 0.67 | 0.67 | 0.66 | 0.86 | 0.88 | 0.70 | 0.70 | 0.70 | 0.70 | 0.87 |
| MCP | 0.82 | — | — | — | — | 0.81 | 0.82 | — | — | — | — | 0.82 |
| DL-Methionine | 0.19 | 0.15 | 0.15 | 0.15 | 0.15 | 0.19 | 0.15 | 0.12 | 0.12 | 0.12 | 0.12 | 0.15 |
| L-Lysine HCL | 0.25 | 0.21 | 0.21 | 0.21 | 0.21 | 0.25 | 0.22 | 0.19 | 0.19 | 0.19 | 0.19 | 0.22 |
| L-Threonine | 0.06 | 0.03 | 0.03 | 0.03 | 0.03 | 0.06 | 0.05 | 0.02 | 0.02 | 0.02 | 0.02 | 0.05 |
| L-TRYPTOPHAN | — | — | — | — | — | — | — | — | — | — | — | — |
| NaCl | 0.34 | 0.23 | 0.23 | 0.23 | 0.23 | 0.34 | 0.34 | 0.23 | 0.23 | 0.23 | 0.23 | 0.34 |
| TEMU vitamin premix | 0.25 | 0.25 | 0.25 | 0.25 | 0.25 | 0.25 | 0.25 | 0.25 | 0.25 | 0.25 | 0.25 | 0.25 |
| TEMU mineral premix | 0.05 | 0.05 | 0.05 | 0.05 | 0.05 | 0.05 | 0.05 | 0.05 | 0.05 | 0.05 | 0.05 | 0.05 |
| Phytase*, FTU/kg | — | 1,000 | 1.000 | 1,000 | 1,000 | — | — | 1,000 | 1,000 | 1,000 | 1,000 | — |
| Danisco Xylanase, U/kg | — | — | — | — | 2,000 | 2,000 | — | — | — | — | 2,000 | 2,000 |
| Nutrient composition, % | | | | | | | | | | | | |
| M.E. (kcal/kg) | 3100 | 3,023 | 3,023 | 3,023 | 2.974 | 3023 | 3120 | 3047 | 3047 | 3047 | 2994 | 3047 |
| Crude Protein | 20.06 | 20.02 | 20.02 | 20.02 | 20.05 | 20.11 | 9.10 | 18.94 | 18.94 | 18.94 | 19.00 | 19.14 |

TABLE 6b-continued

Ingredient and calculated nutrient composition for Finisher 1 and Finisher 2 phases of trial 1, part 2

| | Finisher 1 (21-35 d) | | | | | | Finisher 2 (35-42 d) | | | | | |
|---|---|---|---|---|---|---|---|---|---|---|---|---|
| | PC1 | NC2a | NC2b | NC2c | NC2d | PC2 | PC1 | NC2a | NC2b | NC2c | NC2d | PC2 |
| Crude Fat | 5.34 | 4.84 | 4.84 | 4.84 | 4.80 | 4.70 | 5.52 | 5.40 | 5.40 | 5.40 | 4.88 | 4.94 |
| Fiber | 3.83 | 4.66 | 4.66 | 4.66 | 5.10 | 4.16 | 3.86 | 4.76 | 4.76 | 4.76 | 4.97 | 4.19 |
| Calcium | 0.62 | 0.42 | 0.42 | 0.42 | 0.42 | 0.62 | 0.62 | 0.42 | 0.42 | 0.42 | 0.42 | 0.62 |
| Total Phosphorus | 0.67 | 0.52 | 0.52 | 0.52 | 0.54 | 0.67 | 0.66 | 0.50 | 0.50 | 0.50 | 0.50 | 0.66 |
| Available Phosphorus | 0.30 | 0.15 | 0.15 | 0.15 | 0.15 | 0.30 | 0.30 | 0.15 | 0.15 | 0.15 | 0.15 | 0.30 |
| Phytate Phosphorus | 0.37 | 0.37 | 0.37 | 0.37 | 0.39 | 0.37 | 0.36 | 0.35 | 0.35 | 0.35 | 0.36 | 0.36 |
| Sodium | 0.17 | 0.13 | 0.13 | 0.13 | 0.13 | 0.17 | 0.17 | 0.13 | 0.13 | 0.13 | 0.13 | 0.17 |
| Chloride | 0.25 | 0.19 | 0.19 | 0.19 | 0 18 | 0.25 | 0.25 | 0.19 | 0.19 | 0 19 | 0.19 | 0.25 |
| Dig. Lys | 1.00 | 0.96 | 0.96 | 0.96 | 0.96 | 1.00 | 0.92 | 0.88 | 0.88 | 0.88 | 0.88 | 0.92 |
| Dig. Met | 0.47 | 0.43 | 0.43 | 0.43 | 0.43 | 0.47 | 0.42 | 0.39 | 0.39 | 0.39 | 0.39 | 0.42 |
| Dig. TSAA | 0.76 | 0.73 | 0.73 | 0.73 | 0.73 | 0.76 | 0.70 | 0.67 | 0.67 | 0.67 | 0.67 | 0.70 |
| Dig. Thr | 0.66 | 0.63 | 0.63 | 0.63 | 0.63 | 0.66 | 0.61 | 0.58 | 0.58 | 0.58 | 0.58 | 0.61 |
| Dig. Trp | 0.20 | 0.20 | 0.20 | 0.20 | 0.20 | 0.20 | 0.19 | 0.19 | 0.19 | 0.19 | 0.19 | 0.19 |
| Dig. Arg | 1.11 | 1.10 | 1.10 | 1.10 | 1.10 | 1.11 | 1.03 | 1.02 | 1.02 | 1.02 | 1.02 | 1.03 |
| Dig. Val | 0.81 | 0.80 | 0.80 | 0.80 | 0.80 | 0.81 | 0.77 | 0.76 | 0.76 | 0.76 | 0.76 | 0.77 |
| Dig. Ile | 0 70 | 0.69 | 0.69 | 0.69 | 0.69 | 0.70 | 0 66 | 0.65 | 0.65 | 0.65 | 0.65 | 0.66 |

*The phytase was produced by fermentation with a fungal (*Trichoderma reesei*) production strain expressing a biosynthetic variant of a consensus bacterial phytase (DuPont Nutrition and Biosciences).

When compared to the control without enzymes (PC1), when phytase and phytase+xylanase added to the diets with reduction of digestible AA, ME and Na, all test groups maintained performance parameters in each phase and during 0-42d (Table 7).

TABLE 7 effect of total replacement of inorganic P by phytase supplemented to diets with reduction of Ca, digestible AA, ME and Na on performance in broilers, trial 1, part 2

| 0-10d | BWd10 | | FI | FCR | |
|---|---|---|---|---|---|
| PC1 | 0.284 | b | 27.9 | 1.134 | b |
| PC2 | 0.296 | a | 29.6 | 1.121 | b |
| NC2a | 0.284 | b | 28.8 | 1.130 | b |
| NC2b | 0.287 | b | 28.8 | 1.128 | b |
| NC2c | 0.284 | b | 29.1 | 1.147 | ab |
| NC2d | 0.285 | b | 29.3 | 1.172 | a |
| SEM | 0.00 | | 0.53 | 0.01 | |
| P values | 0.0005 | | 0.2855 | 0.0008 | |
| 0-21d | BWd21 | | FI | FCR | |
| PC1 | 0.966 | | 58.7 | 1.334 | b |
| PC2 | 0.98 | | 59.6 | 1.340 | b |
| NC2a | 0.96 | | 58.2 | 1.353 | b |
| NC2b | 0.98 | | 59.8 | 1.353 | b |
| NC2c | 0.97 | | 58.8 | 1.346 | b |
| NC2d | 0.96 | | 60.6 | 1.391 | a |
| SEM | 0.01 | | 0.71 | 0.01 | |
| P values | 0.3625 | | 0.2045 | <.0001 | |
| 0-35d | BWd35 | | FI | FCR | |
| PC1 | 2.22 | | 85.5 | 1.534 | bc |
| PC2 | 2.25 | | 85.0 | 1.527 | c |
| NC2a | 2.23 | | 84.5 | 1.554 | abc |
| NC2b | 2.20 | | 85.4 | 1.567 | ab |
| NC2c | 2.21 | | 84.9 | 1.560 | abc |
| NC2d | 2.23 | | 88.2 | 1.589 | a |
| SEM | 0.03 | | 1.16 | 0.01 | |
| P values | 0.9054 | | 0.2647 | 0.0003 | |
| 0-42d | BWd42 | | FI | FCR | FCRc** |
| PC1 | 2.77 | | 104.9 | 1.705 | 1.730 |
| PC2 | 2.86 | | 106.0 | 1.694 | 1.690 |
| NC2a | 2.84 | | 106.8 | 1.721 | 1.726 |
| NC2b | 2.79 | | 105.5 | 1.720 | 1.738 |
| NC2c | 2.82 | | 106.1 | 1.718 | 1.728 |
| NC2d | 2.82 | | 109.7 | 1.759 | 1.768 |

TABLE 7-continued effect of total replacement of inorganic P by phytase supplemented to diets with reduction of Ca, digestible AA, ME and Na on performance in broilers, trial 1, part 2

| 0-10d | BWd10 | FI | FCR | |
|---|---|---|---|---|
| SEM | 0.06 | 1.64 | 0.02 | 0.04 |
| P values | 0.9419 | 0.3956 | 0.1375 | 0.771 | a,b,c: different superscript in a column indicates significantly different at P < 0.05

*PC1: a nutrient adequate, but not over-specified positive control diet; all NC2 diets are with reduction on Ca, digestible animal acids, ME and Na compared to PC1. NC2a: supplemented with the phytase at 1000 FTU/kg through all 4 phases. NC2b: supplemented with the phytase at 2000 FTU/kg in starter, 1500 FTU/kg in grower and 1000 FTU/kg in finisher 1 and 2; NC2c: supplemented with phytase at 3000 FTU/kg in starter, 2000 FTU/kg in grower and 1000 FTU/kg in finisher 1 and 2; NC2d: NC2b with reduction of 71 kcal/kg ME and supplemented with 2000XU/kg Danisco xylanase; PC2: reduction of 71 kcal/kg ME vs PC1, with addition of 2000XU/kg Danisco xylanase.

**FCRc: body weight corrected FCR, e.g. FCRc = FCR(0-42d) + (((2.85-BWd42, kg)*1000)32)/100,. BW at 2.85 kg is used for Ross 308 mixed sex.

When compared to the control without enzymes (PC1), when phytase and phytase+xylanase added to the diets with reduction of digestible AA, ME and Na, in addition to reduction of Ca and total replacement of inorganic P, all test groups maintained tibia ash and tibia breaking strength at day 21 and day 42 (Table 8).

TABLE 8 effect of total replacement of inorganic P by phytase supplemented to diets with reduction of Ca. digestible AA, ME and Na on tibia ash and tibia breaking strength in broilers, trial 1, part 2

| | d21 tibia ash | d21 Breaking strength | | d42 tibia ash | d42 Breaking strength | |
|---|---|---|---|---|---|---|
| PC1 | 32.5 | 51.4 | ab | 39.2 | b | 46.6 | ab |
| PC2 | 33.0 | 51.9 | a | 43.1 | ab | 47.5 | a |
| NC2a | 32.3 | 50.7 | b | 41.7 | ab | 45.7 | ab |
| NC2b | 32.9 | 509 | ab | 44 8 | a | 470 | ab |
| NC2c | 31.8 | 51.2 | ab | 39.9 | ab | 45.4 | b |
| NC2d | 34.3 | 51.3 | ab | 43.3 | ab | 46.7 | ab |

TABLE 8-continued effect of total replacement of inorganic P by phytase supplemented
to diets with reduction of Ca. digestible AA, ME and Na on
tibia ash and tibia breaking strength in broilers,
trial 1, part 2

| | d21 tibia ash | d21 Breaking strength | d42 tibia ash | d42 Breaking strength |
|---|---|---|---|---|
| SEM | 1.0 i | 0.2 | 1.3 | 0.5 |
| P values | 0.58 | 0.01 | 0.02 | 0.01 |

[a,b,c]different superscript in a column indicates significantly different at $P < 0.05$

*PC1: a nutrient adequate, but not over-specified positive control diet; all NC2 diets are with reduction on Ca, digestible animal acids, ME and Na compared to PC1.
NC2a: supplemented with the phytase at 1000 FTU/kg through all 4 phases.
NC2b: supplemented with the phytase at 2000 FTU/kg in starter, 1500 FTU/kg in grower and 1000 FTU/kg in finisher 1 and 2;
NC2c: supplemented with phytase at 3000 FTU/kg in starter, 2000 FTU/kg in grower and 1000 FTU/kg in finisher 1 and 2;
NC2d: NC2b with reduction of 71 kcal/kg ME and supplemented with 2000 XU/g Danisco xylanase; PC2 reduction of 71 kcal/kg ME vs PC 1, with addition of 2000 XU/kg Danisco xylanase.

When compared to the control without enzymes (PC1), when phytase and phytase+xylanase added to the diets with reduction of digestible AA, ME and Na, in addition to reduction of Ca and total replacement of inorganic P, all test groups maintained carcass characteristics, however, the treatment with combination of phytase (2000, 1500 and 1000 FTU in starter, grower and finisher)+xylanase (2000 U/kg) reduced fat pad yield (Table 9).

TABLE 9 effect of total replacement of inorganic P by phytase supplemented to diets with
reduction of digestible Ca, AA, ME and Na on carcass yield (%) in broilers, trial 1, part 2

| | Carcass Yield | Breast Yield | Tender Yield | Leg Yield | Fat Pad Yield | |
|---|---|---|---|---|---|---|
| PC1 | 76.9 | 24.5 | 4.7 | 33.6 | 1.42 | a |
| PC2 | 77.6 | 24.7 | 4.7 | 33.3 | 1.37 | ab |
| NC2a | 76.2 | 25.2 | 4 9 | 32.9 | 1.33 | ab |
| NC2b | 77.1 | 24.7 | 4.8 | 33.2 | 1.26 | ab |
| NC2c | 77.4 | 24.9 | 4.8 | 33 2 | 1.26 | ab |
| NC2d | 76.5 | 24.8 | 4.8 | 33 3 | 1.21 | b |
| SEM | 0.47 | 0.22 | 0.05 | 0.22 | 0.05 | |
| P values | 0.25 | 0.53 | 0.24 | 0.42 | 0.01 | |

[a,b,c]different superscript in a column indicates significantly different at $P < 0.05$

*PC1: a nutrient adequate, but not over-specified positive control diet; all NC2 diets are with reduction on Ca, digestible animal acids, ME and Na compared to PC1.

NC2a: supplemented with the phytase at 1000 FTU/kg through all 4 phases.

NC2b: supplemented with the phytase at 2000 FTU/kg in starter, 1500 FTU/g in grower and 1000 FTU/kg in finisher 1 and 2;

NC2c: supplemented with phytase at 3000 FTU/kg in starter, 2000 FTU/kg in grower and 1000 FTU/kg in finisher 1 and 2;

NC2d: NC2b with reduction of 71 kcal/kg ME and supplemented with 2000 XU/g Danisco xylanase;

PC2: reduction of 71 kcal/kg ME vs PC1, with addition of 2000 XU/kg Danisco xylanase.

Example 2: Further Assessment of the Efficacy of a Next Generation Biosynthetic Bacterial 6-Phytase Used in a Commercial Diet to Totally Replace Inorganic Phosphate The trial described in Example 1 was repeated in a second study, to increase the robustness of the findings. The second study was also carried out at Texas A&M university (USA). Ten treatments were tested and with the exactly the same design as in trial 1. The only modifications are: 1) only male Ross 308 broilers were used with 26 birds per pen; 2) Oat hull was maintained at 1% and soy hulls was used (Table 10 a, b).

The data were analysed in the same way as in trial 1, first part compared to controls with test groups formulated only with reduction of minerals (e.g. Ca and total replacement of inorganic P). Second part compared to controls with test groups with further reduction of digestible AA, ME and Na.

Part 1: Comparison of 4 Test Diets with Reduction of Ca, Total Replacement of Inorganic P Compared to Two Positive Controls TABLE 10a Ingredient and calculted nutrient composition for Starter and Grower phases of trial J, part 1

| | Starter (1-10 d) | | | | | | Grower (10-21 d) | | | | | |
|---|---|---|---|---|---|---|---|---|---|---|---|---|
| | FC1 | NC1a | NC1b | NC1c | NC1d | PC2 | PC1 | NC1a | NC1b | NC1c | NC1d | PC2 |
| Ingredient, % as is | | | | | | | | | | | | |
| Corn | 34.94 | 34.94 | 34.94 | 34.94 | 32.12 | 32.93 | 32.43 | 32.43 | 32.43 | 32.43 | 30.06 | 31.28 |
| Soybean meal | 27.64 | 27.64 | 27.64 | 27.64 | 27.64 | 27.64 | 26.62 | 26.53 | 26.53 | 26.53 | 26.53 | 26.53 |
| Wheat grain | 20.44 | 20.44 | 20.44 | 20.44 | 20.44 | 20.44 | 22.45 | 22.89 | 22.89 | 22.89 | 22.89 | 22.89 |
| Rapeseed meal | 5.00 | 5.00 | 5.00 | 5.00 | 5.00 | 5.00 | 5.50 | 5.50 | 5.50 | 5.50 | 5.59 | 5.50 |
| Rice Bran | 5.00 | 5.00 | 3.00 | 5.00 | 5.00 | 5.00 | 4.50 | 4.50 | 4.50 | 4.50 | 4.50 | 4.50 |
| Wheat bran | 1.00 | 1.00 | 1.00 | 1.00 | 2.54 | 1.61 | 1.50 | 1.50 | 1.50 | 1.50 | 2.65 | 1.85 |
| Oat Hulls | 1.00 | 1.00 | 1.00 | 1.00 | 1.00 | 1.00 | 1.00 | 1.00 | 1.00 | 1.00 | 1.00 | 1.00 |
| Soy Hulls | 0.05 | 1.41 | 1.41 | 1.41 | 2.94 | 1.72 | 0.10 | 1.00 | 100 | 1.00 | 2.53 | 1.18 |
| Soy oil | 0.75 | 0.75 | 0.75 | 0.75 | 0.53 | 0.51 | 2.38 | 2.25 | 2.25 | 2.25 | 197 | 1.76 |
| Limestone | 1.30 | 1.39 | 1.39 | 1.39 | 1.36 | 1.28 | 1.27 | 1.18 | 1.18 | 1.18 | 1.15 | 1.25 |
| Monocelcium Phosphate | 1.44 | — | — | — | — | 1.43 | 1.04 | — | — | — | — | 1.03 |
| L-Lyaine HCL | 0.37 | 0.37 | 0.37 | 0.37 | 0.36 | 0.37 | 0.23 | 0.24 | 0.24 | 0.24 | 0.23 | 0.24 |
| DL-Methioninesine | 0.31 | 0.31 | 0.31 | 0.31 | 0.31 | 0.31 | 0.24 | 0.24 | 0.24 | 0.24 | 0.24 | 0.25 |
| L-Threonine | 0.10 | 0.10 | 0.10 | 0.10 | 0.10 | 0.10 | 0.08 | 0.08 | 0.08 | 0.08 | 0.08 | 0.08 |
| L-Tryptophan | 0.00 | 0.00 | 0.00 | 0.00 | — | 0.00 | — | — | — | — | — | — |
| Vitamin premix | 0.25 | 0.25 | 0.25 | 0.25 | 0.25 | 0.25 | 0.25 | 0.25 | 0.25 | 0.25 | 0.25 | 0.25 |
| Mineral premix | 0.05 | 0.05 | 0.05 | 0.05 | 0.05 | 0.05 | 0.05 | 0.05 | 005 | 0.05 | 0.05 | 0.95 |
| NaCl | 0.37 | 0.37 | 0.37 | 0.31 | 0.37 | 0.37 | 0.37 | 0.37 | 0.37 | 0.37 | 036 | 0.37 |
| Phytase, FTU/kg | — | 1.000 | 2,006 | 3,000 | 2 000 | — | — | 1,000 | 3,500 | 2,000 | 1.500 | — |
| Danisco Xylanase, XU/kg | — | — | — | — | 2,000 | 2,500 | — | — | — | — | 2,000 | 2,600 |
| Nutrient composition, % | | | | | | | | | | | | |
| M.E. (kcal/kg) | 2950 | 2950 | 2950 | 2956 | 2879 | 2879 | 3050 | 3050 | 3056 | 3056 | 2978 | 2978 |
| Crude Protein | 21.38 | 21.54 | 21.54 | 21.54 | 21.74 | 21.52 | 20.99 | 21.11 | 21.11 | 21.11 | 21.29 | 21.11 |
| Crude Fat | 3.47 | 3.50 | 3.50 | 3.50 | 3.30 | 3.24 | 4.99 | 4.89 | 4.89 | 4.89 | 4.62 | 4.38 |
| Fiber | 2.92 | 3.52 | 3.52 | 3.52 | 4.29 | 3.67 | 2.96 | 3.37 | 3.37 | 3.37 | 4.11 | 3.48 |
| Calcium | 0.92 | 0.72 | 0.72 | 0.72 | 0.72 | 0.92 | 0.84 | 0.64 | 0.64 | 0.64 | 0.64 | 0.84 |
| Total Phosphorus | 0.87 | 0.55 | 0.55 | 0.55 | 0.57 | 0.87 | 0.78 | 0.54 | 0.54 | 0.54 | 0.56 | 0.78 |
| Available Phosphorus | 0.43 | 0.16 | 0.16 | 0.16 | 0.16 | 0.43 | 0.36 | 0.16 | 0.16 | 0.16 | 0.16 | 0.36 |
| Phytate Phosphorus | 0.34 | 0.34 | 0.34 | 0.34 | 0.35 | 0.34 | 0.34 | 0.34 | 0.34 | 0.34 | 0.35 | 0.34 |
| Sodium | 0.17 | 0.17 | 0.17 | 0.17 | 0.17 | 0.17 | 0.17 | 0.17 | 0.17 | 0.17 | 0.17 | 0.17 |
| Chloride | 0.26 | 0.26 | 0.26 | 0.26 | 0.26 | 0.26 | 0.26 | 0.26 | 0.26 | 0.26 | 0.26 | 0.26 |
| Dig. Lys | 1.22 | 1.22 | 1.22 | 1.22 | 1.22 | 1.22 | 1.10 | 1.10 | 1.10 | 1.10 | 1.10 | 1.10 |
| Dig. Met | 0.61 | 0.61 | 0 61 | 0.61 | 0.61 | 0.61 | 0.54 | 0.54 | 0.54 | 0.54 | 0.54 | 0.54 |
| Dig. TSAA | 0.91 | 0.91 | 0.91 | 0.91 | 0.91 | 0.91 | 0.84 | 0.84 | 0.84 | 0.84 | 0.84 | 0.84 |
| Dig. Thr | 0.76 | 0.76 | 0.76 | 0.76 | 0.76 | 0.76 | 0.73 | 0.73 | 0.73 | 0.73 | 0.73 | 0.73 |
| Dig. Trp | 0.22 | 0.22 | 0.22 | 0.22 | 0.22 | 0.22 | 0.22 | 0.22 | 0.22 | 0.22 | 0.22 | 0.22 |
| Dig. Arg | 1.25 | 1.25 | 5.25 | 1.25 | 1.25 | 1.25 | 1.23 | 1.23 | 1.23 | 1.23 | 1.23 | 1.23 |
| Dig. Val | 0.88 | 0.88 | 0.38 | 0.88 | 0.88 | 3.88 | 0.87 | 0.87 | 0.87 | 0.87 | 0.87 | 0.87 |
| Dig. Ile | 0.78 | 0.78 | 0.78 | 0.78 | 0.75 | 0.78 | 0.77 | 0.77 | 0.77 | 0.77 | 0.77 | 0.77 |

TABLE 10b

Ingredient and calculted nutrient composition for Finisher 1 and Finisher 2 phases of trial 2

| | Finisher 1 (21-35 d) | | | | | | Finisher 2 (35-42 d) | | | | | |
|---|---|---|---|---|---|---|---|---|---|---|---|---|
| | PC1 | NC1a | NCSs | NCte | NCid | PC2 | PC1 | NC1a | NCte | NCic | ncis | PC2 |
| Ingredient, % as is | | | | | | | | | | | | |
| Com | 31.89 | 31.89 | 31.89 | 31.89 | 31.28 | 30.44 | 31.19 | 31.18 | 31.18 | 31.18 | 30.61 | 30.28 |
| Soybean meal | 21.28 | 21.28 | 21.28 | 21.28 | 21.30 | 21.28 | 18.26 | 18.26 | 18.26 | 18.26 | 18.26 | 18.26 |
| Wheat, grain | 27.45 | 28.21 | 28.21 | 28.21 | 28.21 | 28.2.1 | 30.76 | 31.32 | 31.32 | 31.32 | 31.32 | 31.32 |
| Rapeseed meal | 6.00 | 6.00 | 6.00 | 6.00 | 6.00 | 6.00 | 6.60 | 6.30 | 6.30 | 6.30 | 6.30 | 6.30 |
| Rice Bran | 4.30 | 4.30 | 4.30 | 4.30 | 4.30 | 4.30 | 4.30 | 4.31 | 4.31 | 4.31 | 4.30 | 4.30 |
| Wheat bran | 2.00 | 2.00 | 2.00 | 2.00 | 2.24 | 3.12 | 2.20 | 2.20 | 2.20 | 2.20 | 2.54 | 2.54 |
| Oat Hulls | 1.00 | 1.00 | 1.00 | 1.00 | 1.00 | 1.00 | 1.00 | 1.00 | 1.00 | 1.00 | 1.00 | 1.00 |
| Sov hulls | 0.15 | 0.67 | 0.67 | 0.67 | 1.71 | 0.28 | 0.20 | 0.80 | 0.80 | 0.80 | 1.75 | 1.01 |
| Soy oil | 2.76 | 2.50 | 2.50 | 2.50 | 1.85 | 1.85 | 2.87 | 2.67 | 2.67 | 2.67 | 1.98 | 2.00 |
| Limestone | 1.15 | 0.99 | 0.99 | 0.99 | 0.97 | 1.14 | 1.08 | 0.88 | 0.88 | 0.88 | 0.86 | 1.07 |
| MCP | 0.87 | — | — | — | — | 0.85 | 0.76 | — | — | — | — | 0.76 |
| L-LysineHCL | 0.25 | 0.25 | 0.25 | 0.25 | 0.25 | 0.24 | 0.23 | 0.22 | 0.22 | 0.22 | 0.22 | 0.22 |
| DL-Methsonsse | 0.19 | 0.19 | 0.19 | 0.19 | 0.19 | 0.19 | 0.15 | 0.15 | 0.15 | 0.15 | 0.15 | 0.15 |
| L-Threonine | 0.07 | 0.06 | 0.06 | 0.06 | 0.06 | 0.06 | 0.05 | 0.05 | 0.05 | 0.05 | 0.05 | 0.05 |

TABLE 10b-continued

Ingredient and calculted nutrient composition for Finisher 1 and Finisher 2 phases of trial 2

| | Finisher 1 (21-35 d) | | | | | | Finisher 2 (35-42 d) | | | | | |
|---|---|---|---|---|---|---|---|---|---|---|---|---|
| | PC1 | NC1a | NCSs | NCte | NCid | PC2 | PC1 | NC1a | NCte | NCic | ncis | PC2 |
| Vitamin premis | 0.25 | 0.25 | 0.25 | 0.25 | 0.25 | 0.25 | 0.25 | 0.25 | 0.25 | 0.25 | 0.25 | 0.25 |
| Mineral premix | 0.05 | 0.05 | 0.05 | 0.05 | 0.05 | 0.05 | 0.05 | 0.05 | 0.05 | 0.05 | 0.05 | 0.05 |
| NaCl | 0.36 | 0.36 | 0.36 | 0.36 | 0.36 | 0.36 | 0.36 | 0.35 | 0.35 | 0.35 | 0.35 | 0.35 |
| Phytase, FTU/kg | — | 1,000 | 1,000 | 1,000 | 1,000 | — | — | 1,000 | 1,000 | 1,000 | 1,000 | — |
| Damsce Xylanase, XU/kg | — | — | — | — | 2,000 | 2,000 | — | — | — | — | 2,000 | 2,000 |
| Nutrient composition, % | | | | | | | | | | | | |
| M.E. (kcal/kg) | 3100 | 3100 | 3100 | 3100 | 3028 | 3023 | 3120 | 3120 | 3120 | 3120 | 3048 | 3047 |
| Crude Protein | 19.31 | 19.47 | 19.47 | 19.47 | 19.58 | 19.53 | 18.36 | 18.50 | 18.50 | 18.50 | 18.62 | 18.51 |
| Crude Fat | 5.33 | 5.09 | 5.09 | 5.09 | 4.45 | 4.43 | 5.41 | 5.24 | 5.24 | 5.24 | 4.57 | 4.65 |
| Fiber | 3.07 | 3.33 | 3.33 | 3.33 | 3.80 | 3.41 | 3.16 | 3.44 | 3.44 | 3 44 | 3.88 | 3.54 |
| Calcium | 0.75 | 0.55 | 0.55 | 0.55 | 0 55 | 0.75 | 0.70 | 0.50 | 0.50 | 0.50 | 0.50 | 0.70 |
| Total Phosphorus | 0.73 | 0.53 | 0.53 | 0.53 | 0.54 | •0.74 | 0.70 | 0.53 | 0.53 | 0.53 | 0.53 | 0.70 |
| Available Phosphorus | 0.32 | 0.10 | 0.10 | 0.10 | 0.16 | 0.32 | 0.30 | 0.15 | 0.15 | 0.15 | 0.15 | 0.30 |
| Phytate Phosphorus | 0.33 | 0.33 | 0.33 | 0.33 | 0.33 | 0.34 | 0.33 | 0.33 | 0.33 | 0.33 | 0.33 | 0.33 |
| Sodium | 0.17 | 0.17 | 0.17 | 0.17 | 0.17 | 0.17 | 0.17 | 0.17 | 0.17 | 0.17 | 0.17 | 0.17 |
| Chloride | 0.26 | 0.26 | 0.26 | 0.26 | 0.26 | 0.26 | 0.26 | 0.26 | 0.26 | 0.26 | 0.26 | 0.26 |
| Dig. Lys | 1.00 | 1.00 | 1.00 | 1.00 | 1.00 | 1.00 | 0.92 | 0.92 | 0.92 | 0.92 | 0.92 | 0.92 |
| Dig. Met | 0.47 | 0.47 | 0.47 | 0.47 | 0.47 | 0.47 | 0.42 | 0.42 | 0.42 | 0.42 | 0.42 | 0.42 |
| Dig. TSAA | 0.76 | 0.76 | 0.76 | 0.76 | 0.76 | 0.76 | 0.70 | 0.70 | 0 70 | 0.70 | 0.70 | 0.7 |
| Dig. Thr | 0.66 | 0.66 | 0.66 | 0.66 | 0.66 | 0.66 | 0.61 | 0.61 | 0.61 | 0.61 | 0.61 | 0.61 |
| Dig. Trp | 0.20 | 0.20 | 0.20 | 0.20 | 0.20 | 0.20 | 0.19 | 0.19 | 0.19 | 0.19 | 0.19 | 0.19 |
| Dig. Ag | 1.10 | 1.11 | 1.11 | 1.11 | 1.11 | 1.11 | 1.03 | 1.03 | 1.03 | 1.03 | 1.04 | 1.03 |
| Dig. Val | 0.80 | 0.81 | 0.81 | 0.81 | 0.81 | 0.81 | 0.77 | 0.77 | 0.77 | 0.77 | 0.77 | 0.77 |
| Das. Ile | 0.70 | 0.70 | 0.70 | 0.70 | 0.70 | 0.70 | 0.66 | 0.66 | 0.66 | 0.66 | 0.66 | 0.66 |

The phytase was produced by fermentation with a fungal (*Trichoderma reesei*) production strain expressing a biosynthetic variant of a consensus bacterial phytase (DuPont Nutrition and Biosciences).

During starter phase, no significant difference was found on performance between positive control and test groups. During 0-21 days of age, NC1a, NC1c and NC1d, PC2 improved (P<0.05) BW and reduced FCR compared to PC1. During overall 0-42 days of age, similar response was seen for BW, FCR was reduced (P<0.05) in NC1a,b,c compared to PC1 (Table 11). The body weight corrected FCRc is lower (P<0.05) in test diets than PC1.

These results confirmed the finding from the first trial: that phytase with different dosing strategy in the diets or in combination with xylanase, with diets were formulated with low Ca, sufficient phytate substrate and with oat hulls to support gizzard development, could totally replace all inorganic P and maintain the performance of broilers compared to the PCs and the Ross 308 broiler breeders' recommendations.

TABLE 11 effect of total replacement of inorganic P by phytase in the diets with reduced Ca on performance in broilers, trial 2, part 1

| 0-10d | BWd10 | FI | FCR |
|---|---|---|---|
| PC1 | 0.26 | 26.7 | 1.187 |
| NC1a | 0.27 | 27.7 | 1.181 |
| NC1b | 0.27 | 26.9 | 1.165 |
| NC1c | 0.27 | 27.4 | 1.183 |
| NC1d | 0.27 | 27.7 | 1.167 |
| PC2 | 0.27 | 27.4 | 1.171 |
| SEM | 0.27 | 27.30 | 1.18 |
| P values | 0.85 | 0.31 | 0.67 |

| 0-21d | BWd21 | | FI | FCR | |
|---|---|---|---|---|---|
| PC1 | 0.93 | [b] | 58.6 | 1.394 | [a] |
| NC1a | 0.97 | [a] | 58.2 | 1.339 | [b] |
| NC1b | 0 96 | [ab] | 58.1 | 1.359 | [ab] |
| NC1c | 1.00 | [a] | 59.7 | 1.325 | [b] |
| NC1d | 0.99• | [a] | 58.1 | 1.334 | [b] |
| PC2 | 0.99 | [a] | 58.8 | 1.346 | [b] |
| SEM | 0.97 | | 58.58 | 1.35 | |
| P values | <.0001 | | 0.32 | 0.001 | |

| 0-35d | BWd35 | | FI | FCR |
|---|---|---|---|---|
| PC1 | 2.26 | [b] | 87.5 | 1.537 |
| NC1a | 2.33 | [ab] | 87.4 | 1.520 |
| NC1b | 2 33 | [ab] | 85.9 | 1.511 |
| NC1c | 2.34 | [ab] | 87.8 | 1.511 |

TABLE 11-continued

| | | | | |
|---|---|---|---|---|
| NC1d | 2.35 | $a$ | 86.4 | 1.512 |
| PC2 | 2.39 | $a$ | 88.0 | 1.505 |
| SEM | 2.33 | | 87.18 | 1.52 |
| P values | 0.001 | | 0.67 | 0.22 |

| 0-42d | BWd42 | | FI | FCR | | FCRc** | |
|---|---|---|---|---|---|---|---|
| PC1 | 2.99 | $b$ | 113.3 | 1.696 | $a$ | 1.73 | $a$ |
| NC1a | 3.16 | $a$ | 114.1 | 1.641 | $b$ | 1.63 | $b$ |
| NC1b | 3.09 | $ab$ | 112.5 | 1.641 | $b$ | 1.65 | $b$ |
| NC1c | 3.14 | $a$ | 114.0 | 1.634 | $b$ | 1.62 | $b$ |
| NC1d | 3.14 | $a$ | 114.9 | 1.654 | $ab$ | 1.65 | $b$ |
| PC2 | 3.19 | $a$ | 116.3 | 1.651 | $ab$ | 1.63 | $b$ |
| SEM | 3.12 | | 114.20 | 1.65 | | 0.02 | |
| P values | 0.0002 | | 0.08 | 0.01 | | 0.00 | |

$a,b,c$different superscript in a column indicates significantly different at $P < 0.05$

*PC1: a nutrient adequate, but not over-specified positive control diet;

NC1a: supplemented with the phytase at 1000 FTU/kg through all 4 phases.

NC1b: supplemented with the phytase at 2000 FTU/kg in starter, 1500 FTU/kg in grower and 1000 FTU/kg in finisher 1 and 2

NC1c: supplemented with phytase at 3000 FTU/kg in starter, 2000 FTU/kg in grower and 1000 FTU/kg in finisher 1 and 2;

NC1d: NC1b with reduction of 71 kcal/kg ME and supplemented with 2000 XU/kg Danisco xylanase;

PC2: reduction of 71 kcal/kg ME vs PC1, with addition of 2000 XU/g Danisco xylanase.

**FCRc: body weight corrected FCR, corrected to BW at 3.11kg (e.g. FCRc = FCR(0-42d) + (((3.11-BWd42, kg) * 1000)/32)/100) The 3.11 kg is used for Ross 308 male broilers.

Part 2: Comparison of 4 Test Diets With Further Reduction on Digestible AA, ME and Na, Addition to Reduction of Ca, Total Replacement of Inorganic P Compared to Two Positive Controls.

In the four test groups (NC2a, NC2,b, NC2c, NC2d), same enzyme inclusion was used as NC1a, NC1b, NC1c and NC1d, however, these diets were formulated with further reduction of digestible AA, ME and Na, based on the substrate specific matrix at give dose levels, as shown in Table 12,a,b.

TABLE 12a

Ingredient and calculated nutrient composition for Starter and Grower phases of trial 2, part 1

| | Starter (1-10 d) | | | | | | Grower (10-21 d) | | | | | |
|---|---|---|---|---|---|---|---|---|---|---|---|---|
| | PC1 | NC2a | NC2b | NC2c | NC2d | PC2 | PC1 | NC2a | NC2b | NC2c | NC2d | PC2 |
| Ingredient, % as is | | | | | | | | | | | | |
| Corn | 34.94 | 32.30 | 32.30 | 32.30 | 30.43 | 32.93 | 32.43 | 30.91 | 30.91 | 30.91 | 28.06 | 31.28 |
| Soybean meal | 27.64 | 25.62 | 25.62 | 25.62 | 24.48 | 27.64 | 26.62 | 24.78 | 24.78 | 24.78 | 23.76 | 26.53 |
| Wheat, grain | 20.44 | 20.44 | 20.44 | 20.44 | 20.44 | 20.44 | 22.45 | 22.89 | 22.89 | 22.89 | 22.89 | 22.89 |
| Rapeseed meal | 5.00 | 6.00 | 6.00 | 6.00 | 7.21 | 5.00 | 5.50 | 6.23 | 6.23 | 6.23 | 6.78 | 5.50 |
| Rice Bran | 5.00 | 5.00 | 5.00 | 5.00 | 5.00 | 5.00 | 4.50 | 5.00 | 5.00 | 5.00 | 5.62 | 4.50 |
| Wheat bran | 1.00 | 3.00 | 3.00 | 3.00 | 4.19 | 1.61 | 1.50 | 2.84 | 2.84 | 2.84 | 4.49 | 1.86 |
| Oat Hulls | 1.00 | 1.00 | 1.00 | 1.00 | 1.00 | 1.00 | 1.00 | 1.00 | 1.00 | 1.00 | 1.00 | 1.00 |
| Soy hulls | 0.05 | 3.41 | 3.41 | 3.41 | 4.32 | 1.72 | 0.10 | 2.42 | 2.42 | 2.42 | 3.63 | 1.18 |
| Soy oil | 0.75 | 0.61 | 0.61 | 0.61 | 0.32 | 0.51 | 2.38 | 1.73 | 1.73 | 1.73 | 1.57 | 1.76 |
| Limestone | 1.30 | 1.35 | 1.35 | 1.35 | 1.32 | 1.28 | 1.27 | 1.16 | 1.16 | 1.16 | 1.13 | 1.25 |
| Monocalcium Phosphate | 1.44 | | | | | 1.43 | 1.04 | | | | | 1.03 |
| L-Lysine HCL | 0.37 | 0.35 | 0.35 | 0.35 | 0.36 | 0.37 | 0.23 | 0.22 | 0.22 | 0.22 | 0.23 | 0.24 |
| DL-Methionine | 0.31 | 0.28 | 0.28 | 0.28 | 0.28 | 0.31 | 0.24 | 0.22 | 0.22 | 0.22 | 0.22 | 0.25 |
| L-Threonine | 0.10 | 0.08 | 0.08 | 0.08 | 0.09 | 0.10 | 0.08 | 0.06 | 0.06 | 0.06 | 0.06 | 0.08 |
| L-Tryptophan | 0.00 | | | | | 0.00 | | | | | | |
| Vitamin premix | 0.25 | 0.25 | 0.25 | 0.25 | 0.25 | 0.25 | — | 0.25 | 0.25 | 0.25 | 0.25 | 0.25 |
| Mineral premix | 0.05 | 0.05 | 0.05 | 0.05 | 0.05 | 0.05 | — | 0.05 | 0.05 | 0.05 | 0.05 | 0.05 |
| NaCl | 0.37 | 0.26 | 0.26 | 0.26 | 0.26 | 0.37 | 0.37 | 0.26 | 0.26 | 0.26 | 0.26 | 0.37 |
| Phytase, FTU/kg | — | 1,000 | 2,000 | 3,000 | 2,000 | — | — | 1,000 | 1,500 | 2,000 | 1,500 | — |
| Danisco Xylanase, XU/kg | — | — | — | — | 2,000 | 2,000 | — | — | — | — | 2,000 | 2,000 |
| Nutrient composition, % | | | | | | | | | | | | |
| M.E. (kcal/kg) | 2950 | 2876 | 2876 | 2876 | 2824 | 2879 | 3050 | 2978 | 2978 | 2978 | 2924 | 2978 |
| Crude Protein | 21.38 | 21.27 | 21.27 | 21.27 | 21.35 | 21.52 | 20.99 | 20.85 | 20.85 | 20.85 | 20.86 | 21.11 |
| Crude Fat | 3.47 | 3.42 | 3.42 | 3.42 | 3.18 | 3.24 | 4.99 | 4.48 | 4.48 | 4.48 | 4.41 | 4.38 |
| Fiber | 2.92 | 4.59 | 4.59 | 4.59 | 5.15 | 3.67 | 2.96 | 4.17 | 4.17 | 4.17 | 4.89 | 3.46 |
| Calcium | 0.92 | 0.72 | 0.72 | 0.72 | 0.72 | 0.92 | 0.84 | 0.64 | 0.64 | 0.64 | 0.64 | 0.84 |
| Total Phosphorus | 0.87 | 0.57 | 0.57 | 0.57 | 0.59 | 0.87 | 0.78 | 0.57 | 0.57 | 0.57 | 0.60 | 0.78 |
| Available Phosphorus | 0.43 | 0.16 | 0.16 | 0.16 | 0.16 | 0.43 | 0.36 | 0.16 | 0.16 | 0.16 | 0.17 | 0.36 |
| Phytate Phosphorus | 0.34 | 0.36 | 0.36 | 0.36 | 0.37 | 0.34 | 0.34 | 0.36 | 0.36 | 0.36 | 0.38 | 0.34 |
| Sodium | 0.17 | 0.13 | 0.13 | 0.13 | 0.13 | 0.17 | 0.17 | 0.13 | 0.13 | 0.13 | 0.13 | 0.17 |
| Chloride | 0.26 | 0.20 | 0.20 | 0.20 | 0.20 | 0.26 | 0.26 | 0.20 | 0.20 | 0.20 | 0.20 | 0.26 |
| Dig. Lys | 1.22 | 1.18 | 1.18 | 1.18 | 1.18 | 1.22 | 1.10 | 1.06 | 1.06 | 1.06 | 1.06 | 1.10 |
| Dig. Met | 0.61 | 0.58 | 0.58 | 0.58 | 0.57 | 0.61 | 0.54 | 0.51 | 0.51 | 0.51 | 0.51 | 0.54 |
| Dig. TSAA | 0.91 | 0.87 | 0.87 | 0.87 | 0.87 | 0.91 | 0.84 | 0.81 | 0.81 | 0.81 | 0.81 | 0.84 |
| Dig. Thr | 0.76 | 0.73 | 0.73 | 0.73 | 0.73 | 0.76 | 0.73 | 0.70 | 0.70 | 0.70 | 0.70 | 0.73 |
| Dig. Trp | 0.22 | 0.22 | 0.22 | 0.22 | 0.21 | 0.22 | 0.22 | 0.21 | 0.21 | 0.21 | 0.21 | 0.22 |
| Dig. Arg | 1.25 | 1.21 | 1.21 | 1.21 | 1.21 | 1.25 | 1.23 | 1.20 | 1.20 | 1.20 | 1.19 | 1.23 |
| Dig. Val | 0.88 | 0.86 | 0.86 | 0.86 | 0.85 | 0.88 | 0.87 | 0.85 | 0.85 | 0.85 | 0.85 | 0.87 |
| Dig. Ile | 0.78 | 0.76 | 0.76 | 0.76 | 0.75 | 0.78 | 0.77 | 0.75 | 0.75 | 0.75 | 0.74 | 0.77 |

TABLE 12b

Ingredient and calculated nutrient composition for Finisher 1 and Finisher 2 phases of trial 2

| | Finisher 1 (21-35 d) | | | | | | Finisher 1 (3542 d) | | | | | |
|---|---|---|---|---|---|---|---|---|---|---|---|---|
| | PC1 | NC2a | NC2b | NC2c | NC2d | PC2 | PC1 | NC2a | NC2b | NC2c | NC2d | PC2 |
| Ingredient, % as is | | | | | | | | | | | | |
| Corn | 31.89 | 29.47 | 29.47 | 29.47 | 27.12 | 30.44 | 31.19 | 28.38 | 28.38 | 28.38 | 27.82 | 30.28 |
| Soybean meal | 21.28 | 19.55 | 19.55 | 19.50 | 19.00 | 21.28 | 18.26 | 17.25 | 17.25 | 17.25 | 17.25 | 18.26 |
| Wheat, grain | 27.45 | 28.21 | 28.21 | 28.21 | 28.21 | 28.21 | 30.76 | 31.32 | 31.32 | 31.32 | 31.32 | 31.32 |
| Rapeseed meal | 6.00 | 7.72 | 7.72 | 7.72 | 8.29 | 6.00 | 6.30 | 6.82 | 6.82 | 6.82 | 6.82 | 6.30 |
| Rice Bran | 4.30 | 4.64 | 4.64 | 4.64 | 5.32 | 4.30 | 4.30 | 4.42 | 4.42 | 4.42 | 4.42 | 4.30 |
| Wheat bran | 2.00 | 4.00 | 4.00 | 4.00 | 4.75 | 3.12 | 2.20 | 4.00 | 4.00 | 4.00 | 4.48 | 2.54 |
| Oat Hulls | 1.00 | 1.00 | 1.00 | 1.00 | 1.00 | 1.00 | 1.00 | 1.00 | 1.00 | 1.00 | 1.00 | 1.00 |
| Soy hulls | 0.15 | 1.67 | 1.67 | 1.67 | 2.77 | 0.68 | 0.20 | 2.61 | 2.61 | 2.61 | 3.24 | 1.01 |
| Soy oil | 2.76 | 1.85 | 1.85 | 1.85 | 1.66 | 1.85 | 2.87 | 2.49 | 2.49 | 2.49 | 1.95 | 2.09 |
| Limestone | 1.15 | 0.95 | 0.95 | 0.95 | 0.93 | 1.14 | 1.08 | 0.84 | 0.84 | 0.84 | 0.83 | 1.07 |
| MCP | 0.87 | | | | | 0.85 | 0.76 | | | | | 0.76 |
| L-Lysine HCL | 0.25 | 0.21 | 0.21 | 0.21 | 0.21 | 0.24 | 0.23 | 0.19 | 0.19 | 0.19 | 0.19 | 0.22 |
| DL-Methionine | 0.19 | 0.15 | 0.15 | 0.15 | 0.15 | 0.19 | 0.15 | 0.12 | 0.12 | 0.12 | 0.12 | 0.15 |
| L-Threonine | 0.07 | 0.03 | 0.03 | 0.03 | 0.03 | 0.06 | 0.05 | 0.02 | 0.02 | 0.02 | 0.02 | 0.05 |
| Vitamin premix | 0.25 | 0.25 | 0.25 | 0.25 | 0.25 | 0.25 | 0.25 | 0.25 | 0.25 | 0.25 | 0.25 | 0.25 |
| Mineral premix | 0.05 | 0.05 | 0.05 | 0.05 | 0.05 | 0.05 | 0.05 | 0.05 | 0.05 | 0.05 | 0.05 | 0.05 |
| NaCl | 0.36 | 0.25 | 0.25 | 0.25 | 0.25 | 0.36 | 0.36 | 0.25 | 0.25 | 0.25 | 0.25 | 0.35 |
| Phytase, FTU/g | — | 1,000 | 1,000 | 1,000 | 1,000 | — | — | 1,000 | 1,000 | 1,000 | 1,000 | — |
| Danisco Xylanase, XU/kg | — | — | — | — | 2,000 | 2,000 | — | — | — | — | 2,000 | 2,000 |
| Nutrient composition, % | | | | | | | | | | | | |
| M.E. (kcal/kg) | 3100 | 3023 | 3023 | 3023 | 2974 | 3023 | 3120 | 3047 | 3047 | 3047 | 2994 | 3047 |
| Crude Protein | 19.31 | 19.50 | 19.50 | 19.50 | 19.62 | 19.53 | 18.36 | 18.45 | 18.45 | 18.45 | 18.55 | 18.51 |
| Crude Fat | 5.33 | 4.55 | 4.55 | 4.55 | 4.46 | 4.43 | 5.41 | 5.10 | 5.10 | 5.10 | 4.58 | 4.65 |
| Fiber | 3.07 | 4.05 | 4.05 | 4.05 | 4.66 | 3.41 | 3.16 | 4.39 | 4.39 | 4.39 | 4.70 | 3.54 |
| Calcium | 0.75 | 0.55 | 0.55 | 0.55 | 0.55 | 0.75 | 0.70 | 0.50 | 0.50 | 0.50 | 0.50 | 0.70 |
| Total Phosphorus | 0.73 | 0.57 | 0.57 | 0.57 | 0.59 | 0.74 | 0.70 | 0.55 | 0.55 | 0.55 | 0.56 | 0.70 |
| Available Phosphorus | 0.32 | 0.16 | 0.16 | 0.16 | 0.17 | 0.32 | 0.30 | 0.16 | 0.16 | 0.16 | 0.16 | 0.30 |
| Phytate Phosphorus | 0.33 | 0.36 | 0.36 | 0.36 | 0.38 | 0.34 | 0.33 | 0.34 | 0.34 | 0.34 | 0.35 | 0.33 |
| Sodium | 0.17 | 0.13 | 0.13 | 0.13 | 0.13 | 0.17 | 0.17 | 0.13 | 0.13 | 0.13 | 0.13 | 0.17 |
| Chloride | 0.26 | 0.19 | 0.19 | 0.19 | 0.19 | 0.26 | 0.26 | 0.20 | 0.20 | 0.20 | 0.20 | 0.26 |
| Dig. Lys | 1.00 | 0.96 | 0.96 | 0.96 | 0.96 | 1.00 | 0.92 | 0.88 | 0.88 | 0.88 | 0.88 | 0.92 |
| Dig. Met | 0.47 | 0.43 | 0.43 | 0.43 | 0.43 | 0.47 | 0.42 | 0.39 | 0.39 | 0.39 | 0.39 | 0.42 |
| Dig. TSAA | 0.76 | 0.73 | 0.73 | 0.73 | 0.73 | 0.76 | 0.70 | 0.67 | 0.67 | 0.67 | 0.67 | 0.70 |
| Dig. Thr | 0.66 | 0.63 | 0.63 | 0.63 | 0.63 | 0.66 | 0.61 | 0.58 | 0.58 | 0.58 | 0.58 | 0.61 |
| Dig. Trp | 0.20 | 0.20 | 0.20 | 0.20 | 0.20 | 0.20 | 0.19 | 0.19 | 0.19 | 0.19 | 0.19 | 0.19 |
| Dig. Arg | 1.10 | 1.10 | 1.10 | 1.10 | 1.10 | 1.11 | 1.03 | 1.02 | 1.02 | 1.02 | 1.02 | 1.03 |
| Dig. Val | 0.80 | 0.80 | 0.80 | 0.80 | 0.80 | 0.81 | 0.77 | 0.76 | 0.76 | 0.76 | 0.76 | 0.77 |
| Dig. Ile | 0.70 | 0.69 | 0.69 | 0.69 | 0.69 | 0.70 | 0.66 | 0.65 | 0.65 | 0.65 | 0.65 | 0.66 |
| Dig. Leu | 1.32 | 1.29 | 1.29 | 1.29 | 1.28 | 1.31 | 1.25 | 1.21 | 1.21 | 1.21 | 1.21 | 1.25 |

*The phytase was produced by fermentation with a fungal (*Trichoderma reesei*) production strain expressing a biosynthetic variant of a consensus bacterial phytase gene (DuPont Nutrition and Biosciences).

When compared to the control without enzymes (PC1), when phytase and phytase+xylanase added to the diets with reduction of digestible AA, ME and Na, all test groups maintained performance parameters in each phase and during 0-42d (Table 13).

TABLE 13 effect of total replacement of inorganic P by
phytase with reduction of digestible AA, ME
and Na on performance in broilers, trial 2, part 2

| 0-10 d | BWd10 | FI | FCR |
|---|---|---|---|
| PC1 | 0.264 | 26.7 | 1.187 |
| PC2 | 0.269 | 27.4 | 1.171 |
| NC2a | 0.258 | 26.7 | 1.218 |
| NC2b | 0.259 | 27.3 | 1.213 |
| NC2c | 0.265 | 27.0 | 1.187 |
| NC2d | 0.263 | 28.2 | 1.236 |
| SEM | 0.00 | 0.38 | 0.02 |
| P values | 0.193 | 0.0685 | 0.0623 |

| 0-21 d | BWd21 | | FI | FCR | |
|---|---|---|---|---|---|
| PC1 | 0.931 | b | 58.6 | 1.394 | a |
| PC2 | 0.99 | a | 58.8 | 1.346 | b |

TABLE 13-continued

| | | | | | |
|---|---|---|---|---|---|
| NC2a | 0.96 | ab | 58.5 | 1.356 | ab |
| NC2b | 0.96 | ab | 58.3 | 1.378 | ab |
| NC2c | 0.97 | a | 59.5 | 1.370 | ab |
| NC2d | 0.96 | ab | 59.6 | 1.391 | a |
| SEM | 0.01 | | 0.60 | 0.01 | |
| P values | 0.0019 | | 0.5674 | 0.005 | |

| 0-35 d | BWd35 | | FI | FCR | |
|---|---|---|---|---|---|
| PC1 | 2.26 | b | 87.5 | 1.537 | ab |
| PC2 | 2.39 | a | 88.0 | 1.505 | b |
| NC2a | 2.32 | ab | 89.2 | 1.545 | a |
| NC2b | 2.32 | ab | 86.3 | 1.542 | ab |
| NC2c | 2.34 | a | 89.2 | 1.546 | c |
| NC2d | 2.33 | ab | 89.4 | 1.558 | a |
| SEM | 0.02 | | 1.13 | 0.01 | |
| P values | 0.0005 | | 0.3455 | 0.0059 | |

64

TABLE 13-continued

| 0-42 d | BWd42 | | FI | | FCR | | FCRc* | |
|---|---|---|---|---|---|---|---|---|
| PC1 | 2.99 | b | 113.3 | b | 1.696 | ab | 1.734 | a |
| PC2 | 3.19 | a | 116.3 | ab | 1.651 | b | 1.625 | b |
| NC2a | 3.09 | ab | 116.8 | a | 1.694 | ab | 1.700 | ab |
| NC2b | 3.12 | ab | 115.5 | ab | 1.682 | ab | 1.678 | ab |
| NC2c | 3.05 | b | 115.7 | ab | 1.716 | a | 1.735 | a |
| NC2d | 3.11 | ab | 117.4 | a | 1.701 | a | 1.700 | ab |
| SEM | 0.03 | | 0.79 | | 0.01 | | 0.02 | |
| P values | 0.0012 | | 0.0152 | | 0.0043 | | 0.001 | |

$a, b, c$ different superscript in a column indicates significantly different at $P < 0.05$

* PC1: a nutrient adequate, but not over-specified positive control diet; all NCs are with further reduction on digestible animal acids, ME and Na. NC2a: supplemented with the phytase at 1000 FTU/kg through all 4 phases. NC2b: supplemented with the phytase at 2000 FTU/kg in starter, 1500 FTU/kg in grower and 1000 FTU/kg in finisher 1 and 2; NC2c: supplemented with phytase at 3000 FTU/kg in starter, 2000 FTU/kg in grower and 1000 FTU/kg in finisher 1 and 2; NC2d: NC2b with reduction of 71 kcal/kg ME and supplemented with 2000 U/kg Danisco xylanase; PC2: reduction of 71 kcal/kg ME vs PC1, with addition of 2000 U/kg Danisco xylanase.

** FCRc: body weight corrected FCR, corrected to BW at 3.11 kg (eg. FCRc = FCR(0-42 d) + (((3.11 − BWd42, kg)*1000)/32)/100). The 3.11 kg is used for Ross 308 male broilers.

Comparison to Ross 308 Breeder Objective:

The final BW of broilers fed the PC1 diets is very close to the Ross 308 performance objective (Table 14). The phytase treatments outperformed the Ross 308 performance objective from 21d onwards, with final BW at day 42 increased on average by 3.4 and 3.6% in trial 1 and 2 respectively for NC1 diets.

TABLE 14 comparison of Ross 308 performance objective (BW, kg)
with the mean BW from trial 1 and 2 respectively

| Ross objective | | trial 1 | | | Ross | trial 2 | | |
|---|---|---|---|---|---|---|---|---|
| Age, days | Mixed male and females | BWPC1 | Mean BW NC1 | Mean BW NC2 | objective Only males | BWPC1 | Mean BW NC1 | Mean BW NC2 |
| 10 | 0.294 | 0.284 | 0.289 | 0.285 | 0.296 | 0.264 | 0.268 | 0.261 |
| 21 | 0.929 | 0.966 | 0.979 | 0.966 | 0.959 | 0.931 | 0.982 | 0.965 |
| 35 | 2.144 | 2.220 | 2.256 | 2.215 | 2.283 | 2.259 | 2.337 | 2.328 |
| 42 | 2.809 | 2.770 | 2.904 | 2.818 | 3.023 | 2.994 | 3.132 | 3.093 |

In conclusion, the results from two studies confirmed that with proper diets formulation and using an effective phytase, all inorganic phosphorus can be replaced by phytase without meat bone meal and maintain the performance of broilers. This is the first report to show a 100% vegetable total inorganic P free commercial relevant broiler diet with normal growth characteristics in all growth phases.

Economic Benefit Calculations

The data from this study showed remarkable feed cost saving with total replacement of inorganic P. The feed cost saving is up to $7.7/MT with total replacement of inorganic P and reduction in Ca. With further reduction of digestible AA, ME and Na, the feed cost saving is up to $19.8/MT. When using xylanase in combination with phytase, applying ME matrix values for xylanase, the feed cost could be reduced by $23.5/MT (Table 15).

TABLE 15

| | estimated cost savings | | | | | | | | |
|---|---|---|---|---|---|---|---|---|---|
| Trial 1 | | Cost saving when only use mineral reduction | | | | Cost saving when use dig AA and ME reduction | | | |
| cost, USD/MT | PC1 | NC1A | NC1B | NC1C | NC1D | NC2A | NC2B | NC2C | NC2D |
| Starter feed cost | 321.57 | 313.84 | 315.04 | 316.24 | 313.26 | 303.23 | 304.43 | 305.63 | 298.27 |
| diff from PC1 | | −7.73 | −6.53 | −5.33 | −8.31 | −18.34 | −17.14 | −15.94 | −23.3 |
| Grower feed cost | 315.25 | 309.81 | 310.41 | 311.01 | 308.5 | 297.51 | 298.11 | 298.71 | 293.89 |
| diff from PC1 | | −5.44 | −4.84 | −4.24 | −6.75 | −17.74 | −17.14 | 16.54 | −21.36 |
| Finisher 1 feed cost | 291.64 | 287.88 | 287.88 | 287.88 | 285.14 | 274.36 | 274.36 | 274.36 | 271.7 |
| diff from PC1 | | −3.76 | −3.76 | −3.76 | −6.5 | −17.28 | −17.28 | −17.28 | −19.94 |
| Finisher 2 feed cost | 277.44 | 273.59 | 273.59 | 273.59 | 270.29 | 264.43 | 264.43 | 264.43 | 261.97 |
| diff from PC1 | | −3.85 | −3.85 | −3.85 | −7.15 | −13.01 | −13.01 | −13.01 | −15.47 |
| Feed cost/kg BWG | 0.504 | 0.494 | 0.496 | 0.486 | 0.481 | 0.481 | 0.481 | 0.480 | 0.488 |
| diff PC1 | | −0.010 | −0.008 | −0.018 | −0.023 | −0.023 | −0.023 | −0.024 | −0.016 |
| Trial 2 | | | | | | | | | |
| Starter feed cost | 321.28 | 313.75 | 314.95 | 316.15 | 312.84 | 301.52 | 302.72 | 303.92 | 297.82 |
| diff from PC1 | | −7.53 | −6.33 | −5.13 | −8.44 | −19.76 | −18.56 | •17.36 | −23.46 |
| Grower feed cost | 315.83 | 309.81 | 310.41 | 311.01 | 308.38 | 297.19 | 297.79 | 298.39 | 293.41 |
| diff from PC1 | | −6.02 | −5.42 | −4.82 | −7.45 | −18.64 | −18.04 | −17.44 | −22.42 |
| Finisher 1 feed cost | 293.37 | 287.93 | 287.93 | 287.93 | 284.8 | 274.05 | 274.05 | 274.05 | 271.16 |
| diff from PC1 | | −5.44 | −5.44 | −5.44 | −8.57 | −19.32 | −19.32 | −19.32 | −22.21 |
| Finisher 2 feed cost | 278.18 | 273.61 | 273.61 | 273.61 | 270.09 | 264.18 | 264.18 | 264.18 | 261.67 |
| diff from PC1 | | −4.57 | −4.57 | −4.57 | −8.09 | −14 | −14 | −14 | −16.51 |
| Feed cost/kg BWG | 0.502 | 0.477 | 0.480 | 0.475 | 0.480 | 0.458 | 0.460 | 0.457 | 0.458 |
| diff PC1 | | −0.025 | −0.022 | −0.027 | −0.023 | −0.045 | −0.042 | −0.046 | −0.044 |

*feed cost is calculated based on current US price and including the cost of enzymes The feed cost/kg body weight gain can be reduced by up to 0.046 USD, with an integrator at an annual production of 500000 MT of broiler liveweight, the cost saving is more than a million dollars.

Example 3: a Novel Consensus Bacterial 6-Phytase Variant as a Total Replacement for Inorganic Phosphate in Broiler Diets Containing Xylanase This study evaluated the performance of the novel consensus 6-phytase variant (PHY-13885, "PhyG") in broiler diets by its application to diets containing xylanase and a graded reduction in phytate-P level from starter through to finisher phases, without added inorganic phosphate (Pi).

Materials and Methods

Birds, Housing and Experimental Design: The study was conducted at the Institute of Agrifood Research and Technology (IRTA) Mas Bové research facility in Catalonia, Spain. All experimental procedures were conducted in compliance with European Directive 2010/63/EU (2010) and the Spanish guidelines for the care and use of animals in research (B.O.E. number 252, Real Decreto 2010/2005). A 2×2 factorial arrangement was used including two diets and two genders. A total of 1,248 Ross 308 broiler hatchlings of mixed sex were obtained from a commercial hatchery and randomly assigned to 24 floor pens (52 birds per pen, stocking density at 42 days of age was ≤16 kg/m$^2$), with 12 pens per dietary treatment including six pens of males and 6 of females. Birds were allocated to each treatment in a randomized complete block design comprising 6 blocks corresponding to location within the animal house. Pens were lined with fresh wood shavings that had been disinfected with glutaraldehyde. Treatment diets were provided as phased diets in crumble form during starter phase (d 0 to 11) and pellet form during grower (d 11 to 22) and finisher (d 22 to 35 and d 35 to 42) phases. Diets and water were provided ad libitum for the duration of the study. Pens were situated in an environmentally controlled broiler house with a lighting regime of LD24: 0 h during d 1 to 2, LD18: 6 h during d 3 to 7, and LD14: 10 h thereafter. Temperature was initially maintained at 32 to 34° C. and then gradually reduced to 19 to 21° C. during d 3 to d 28 and maintained at that temperature thereafter, in line with breeder recommendations.

Treatment Diets: Diets were complex diets based on corn, soybean meal, wheat, rapeseed meal, rice bran, soy oil and wheat bran, and were formulated by phase (Table 16). Oat hulls were included to stimulate gizzard development and soy hulls were used as a filler material. The positive control diet (PC) was formulated to supply adequate levels of all nutrients in accordance with breeder recommendations (Aviagen NL, 2014), except ME was 71 kcal/kg lower due to the energy contribution from the xylanase. The phytate content was high during starter phase and gradually reduced during subsequent phases (phytate-P: 0.34% during starter, 0.33% during grower, 0.29% during finisher 1 and 0.28% during finisher 2 phase). The PC also contained Pi from MCP at 1.54 to 0.94% (as fed basis) dependent on the growth phase (Table 16) and 2,000 xylanase units (XU) of a commercial xylanase produced in *T. reesei* (Danisco xylanase, DuPont Animal Nutrition) per kilogram of diet in all phases. A second diet was formulated as inorganic phosphate-free (IPF) to be the same as the PC except for a 0.2 percentage point reduction in calcium (Ca) and complete absence of added Pi, supplemented with a novel consensus bacterial 6-phytase variant expressed in *T. reesei* (PhyG; DuPont Animal Nutrition) at a dose-level of 3,000 FTU/kg during d 0 to 11, 2,000 FTU/kg during d 11 to 22, and 1,000 FTU/kg during d 22 to 42. Feeds were prepared in bulk by mixing all ingredients except amino acids, vitamin and mineral premix and enzymes. Amino acids, vitamin and mineral premix were mixed with 10 kg of feed prior to addition to the mixer. Enzymes were premixed with ground corn prior to adding to diets to ensure homogenous distribution. Pelleting was conducted at 80° C.

average BW, average daily feed intake (ADFI) and average daily gain (ADG), expressed on a per pen basis. Pens were monitored daily for bird mortality which was recorded and used to calculate mortality-corrected feed conversion ratio (FCR). In addition, for the overall period only (d 0 to 42), body weight corrected FCR (FCRc) was calculated by correcting FCR values by 3 points per 100 g of BW difference from PC.

On d 11, 22 and 42, 2 birds per pen were euthanized by cervical dislocation and sampled for right and left tibia bones collected for the determination of ash content. Tibias were pooled per pen and frozen at −20° C. before analysis.

Diet samples were analyzed for DM, CP, ash, P and Ca, by IRTA Mas Bové, Spain. Phytase activity was measured by IRTA (Constantí, Spain) and xylanase was analyzed by DuPont Research Centre, Brabrand, Denmark

TABLE 16 ingredient and calculated nutrient content (%, as fed basis) of the treatment diets, by phase.

| | Starter (d 0 to 11) | | Grower (d 11 to 22) | | Finisher 1 (d 22 to 35) | | Finisher 2 (d 35 to 42) | |
|---|---|---|---|---|---|---|---|---|
| Ingredients | PC | IPF[1] | PC | IPF | PC | IPF | PC | IPF |
| Corn | 24.01 | 24.40 | 28.41 | 28.38 | 34.16 | 34.04 | 37.11 | 36.98 |
| Soybean meal, 46% CP | 29.99 | 29.95 | 29.88 | 29.81 | 28.04 | 27.95 | 26.03 | 25.99 |
| Wheat, 12.5% CP | 20.00 | 20.00 | 20.00 | 20.00 | 20.00 | 20.00 | 20.00 | 20.00 |
| Rapeseed meal | 7.00 | 7.00 | 5.63 | 5.74 | 2.72 | 2.84 | 2.66 | 2.72 |
| Rice bran | 6.00 | 6.00 | 6.00 | 6.00 | 5.00 | 5.00 | 4.50 | 4.50 |
| Soy oil | 5.19 | 5.05 | 4.01 | 4.03 | 4.40 | 4.44 | 4.26 | 4.30 |
| Wheat bran | 2.00 | 2.00 | 1.00 | 1.00 | 1.00 | 1.00 | 1.00 | 1.00 |
| Soy hulls | 0.5 | 1.69 | 0.34 | 1.52 | 0.32 | 1.48 | 0.32 | 1.45 |
| MCP | 1.54 | — | 1.16 | — | 1.02 | — | 0.94 | — |
| Limestone | 1.28 | 1.42 | 1.27 | 1.24 | 1.14 | 1.05 | 1.10 | 0.97 |
| Oat hulls | 1.00 | 1.00 | 1.00 | 1.00 | 1.00 | 1.00 | 1.00 | 1.00 |
| Vit & min premix[2] | 0.40 | 0.40 | 0.40 | 0.40 | 0.40 | 0.40 | 0.40 | 0.40 |
| NaCl | 0.39 | 0.39 | 0.39 | 0.39 | 0.37 | 0.37 | 0.37 | 0.37 |
| DL-methionine | 0.31 | 0.31 | 0.25 | 0.25 | 0.22 | 0.22 | 0.17 | 0.17 |
| L-lysine HCL | 0.30 | 0.30 | 0.18 | 0.18 | 0.16 | 0.16 | 0.13 | 0.13 |
| L-threonine | 0.08 | 0.08 | 0.06 | 0.06 | 0.05 | 0.05 | 0.02 | 0.02 |
| Phytase, FTU/kg | — | 3,000 | — | 2,000 | — | 1,000 | — | 1,000 |
| Xylanase, U/kg | 2,000 | 2,000 | 2,000 | 2,000 | 2,000 | 2,000 | 2,000 | 2,000 |
| Calculated nutrients | | | | | | | | |
| ME, kcal/kg | 2,850 | 2,850 | 2,928 | 2,928 | 3,029 | 3,029 | 3,049 | 3,049 |
| Dry matter | 89.51 | 89.35 | 89.24 | 89.12 | 89.09 | 88.98 | 88.97 | 88.87 |
| Crude protein | 22.36 | 22.48 | 21.78 | 21.9 | 20.09 | 20.2 | 19.22 | 19.33 |
| Crude fat | 7.11 | 7.01 | 6.02 | 6.05 | 6.49 | 6.55 | 6.41 | 6.47 |
| Fiber | 4.67 | 5.09 | 4.46 | 4.88 | 4.0 | 4.41 | 3.88 | 4.27 |
| Ash | 5.50 | 5.68 | 5.38 | 5.40 | 4.86 | 4.82 | 4.66 | 4.58 |
| Calcium | 0.92 | 0.72 | 0.84 | 0.64 | 0.74 | 0.54 | 0.70 | 0.50 |
| Available P[3] | 0.43 | 0.14 | 0.36 | 0.14 | 0.32 | 0.13 | 0.3 | 0.12 |
| Total P | 0.83 | 0.48 | 0.70 | 0.44 | 0.63 | 0.40 | 0.60 | 0.39 |
| Sodium | 0.19 | 0.19 | 0.19 | 0.19 | 0.18 | 0.18 | 0.18 | 0.18 |
| Chloride | 0.27 | 0.27 | 0.27 | 0.27 | 0.26 | 0.26 | 0.26 | 0.26 |
| Dig. Lys | 1.22 | 1.22 | 1.10 | 1.10 | 1.00 | 1.00 | 0.92 | 0.92 |
| Dig. Met and Cys | 0.91 | 0.91 | 0.84 | 0.84 | 0.76 | 0.76 | 0.70 | 0.70 |
| Dig. Met | 0.60 | 0.60 | 0.54 | 0.54 | 0.48 | 0.48 | 0.43 | 0.43 |
| Dig. Thr | 0.76 | 0.76 | 0.73 | 0.73 | 0.66 | 0.66 | 0.61 | 0.61 |
| Dig. Trp | 0.22 | 0.22 | 0.22 | 0.22 | 0.20 | 0.20 | 0.19 | 0.19 |
| Dig. Arg | 1.30 | 1.30 | 1.28 | 1.28 | 1.17 | 1.17 | 1.12 | 1.12 |
| Dig. Ile | 0.78 | 0.78 | 0.77 | 0.77 | 0.71 | 0.71 | 0.68 | 0.68 |
| Dig. Val | 0.86 | 0.86 | 0.84 | 0.84 | 0.78 | 0.78 | 0.74 | 0.74 |
| Phytate-P | 0.34 | 0.34 | 0.33 | 0.33 | 0.29 | 0.29 | 0.28 | 0.28 |

[1]IPF, inorganic phosphate free

[2]One kg of feed contained: Vitamin A: 10 000 IU; Vitamin $D_3$: 4 800 IU; Vitamin E: 45 mg; Vitamin $K_3$: 3 mg; Vitamin $B_1$: 3 mg; Vitamin $B_2$: 9 mg; Vitamin $B_6$: 4.5 mg; Vitamin $B_{12}$: 40 mg; Folic acid: 1.8 mg; Biotin: 150 mg; Calcium pantothenate: 16.5 mg; Niacin: 65 mg; Mn (as $MnSO_4 \cdot H_2O$): 90 mg; Zn (as ZnO): 66 mg; I (as KI): 1.2 mg; Fe (as $FeSO_4 \cdot H_2O$): 54 mg; Cu (as $CuSO_4 \cdot 5H_2O$): 12 mg; Se (as $NaSeO_3$): 0.18 mg; BHT: 25 mg; Calcium formate: 5 mg; Silicic acid, dry and precipitated: 25 mg; Calcium stearate: 25 mg; Calcium carbonate: to 4 g.

[3]Excluding contribution from phytases from basal diets.

Sampling and Measurements: Birds and feed were weighed on d 0, 11, 22, 35 and 42 and used to calculate Chemical Analyses: Right tibias were thawed prior to the removal of fibula, muscle and connective tissue. Bones were then oven dried, defatted in diethyl ether, oven dried again and then ashed, according to the method previously described by Dersjant-Li et al. (2020b). Dry matter, CP and ash in feed were analyzed according to AOAC methods 925.09, 942.05 and 968.06, respectively (AOAC, 2000). Phosphorus in feed was analyzed by IRTA (Mas Bové, Spain) according to AOAC method 965.17 (AOAC, 1990). Calcium in feed was analyzed by inductively coupled plasma mass spectrometry (ICP-MS; Agilent Technologies model 7700X) at Ofice Laboratory Castellbisbal (Barcelona, Spain) according to the method described by Pacquette et al. (2018). Phytase was determined by ISO method 30024:2009 (Animal feeding stuffs—Determination of phytase activity), where one phytase unit (FTU) was defined as the amount of enzyme that liberated 1 μmol of inorganic phosphate from phytate per minute at pH5.5 and 37° C. Xylanase activity was determined according to the method of Romero et al.

(2014), where one XU was defined as the amount of enzyme that released 0.48 μmol of reducing sugar as xylose from wheat arabinoxylan per minute at pH4.2 and 50° C. All feed analysis was conducted in duplicate.

Statistical Analysis: All data are presented by pen as the experimental unit. All data were analyzed by 2×2 factorial Analysis of Variance (ANOVA) to evaluate main effects of treatment and gender, and their interaction, on performance and bone ash measures. Where a significant interaction between factors was identified, Tukey's Test was used for separation of means. Analyses were conducted using the Fit Model platform of JMP 14.0 (JMP, 2019; SAS Institute Inc., Cary, NC). Differences were considered significant at PeP<0.10 was considered a tendency.

Results

Analyzed levels of nutrients and enzyme activities in the dietary treatments are presented in Table 17.

TABLE 17 analyzed nutrient content (% as is) and enzyme activities of the treatment diets, by phase

| | Starter (d 0 to 11) | | Grower (d 11 to 22) | | Finisher 1 (d 22 to 35) | | Finisher 2 (d 35 to 42) | |
| --- | --- | --- | --- | --- | --- | --- | --- | --- |
| | PC | IPF[1] | PC | IPF | PC | IPF | PC | IPF |
| Dry matter | 88.44 | 89.73 | 89.20 | 88.90 | 89.35 | 89.09 | 89.09 | 89.53 |
| Crude protein | 22.70 | 22.86 | 21.66 | 21.69 | 19.98 | 20.02 | 19.54 | 19.71 |
| Ash | 6.32 | 5.47 | 5.83 | 5.05 | 5.33 | 5.18 | 5.10 | 4.40 |
| Phosphorus | 0.83 | 0.52 | 0.67 | 0.41 | 0.58 | 0.36 | 0.56 | 0.36 |
| Calcium | 1.15 | 0.92 | 1.02 | 0.79 | 0.94 | 0.74 | 0.89 | 0.71 |
| Phytate-P[2] | 0.332 | 0.342 | 0.319 | 0.329 | 0.287 | 0.297 | 0.280 | 0.290 |
| Phytase, FTU/kg | 82 | 3,084 | 67 | 2,255 | 94 | 1,028 | 47 | 917 |
| Xylanase, XU/kg | 2,125 | 2,207 | 1,742 | 2,524 | 2,657 | 1,984 | 2,684 | 1,728 |

[1]IPF, inorganic phosphate free
[2]based on the analyzed phytate-P level in the ingredients Growth Performance and Mortality: The ADG, ADFI and FCR of birds who received the IPF diet was equivalent to or improved compared to, the PC during all individual growth phases (Table 18): During d 0 to 11, mean ADG, ADFI and FCR in treatment IPF were equivalent to the corresponding values produced by the PC; during d 11 to 22, ADG and ADFI were increased, and FCR was reduced in treatment IPF compared to PC (P<0.001 in all cases); during d 22 to 35, ADG in treatment IPF was increased (P<0.01), whereas ADFI and FCR did not differ from PC; during d 35 to 42 ADG was increased in treatment IPF vs. PC (P<0.05), and FCR tended to be reduced (P<0.10), compared to PC (Table 18). The positive growth performance effects of treatment IPF vs. PC were greatest during d 11 to 22 (ADG+6.02%, ADFI+4.57%, FCR—2 points, vs. PC, P<0.001, Table 18).

TABLE 18 effect of diet and gender on broiler growth performance measures, by phase, factorial analysis[1] of main and interaction effects.

| | | BW (g/bird) | ADG (g/bird) | ADFI (g/bird) | FCR (g/g) | Mortality (%) |
| --- | --- | --- | --- | --- | --- | --- |
| Starter (d 0 to 11) | | d 10 | | | | |
| Diet | PC | 270.9 | 21.0 | 23.3 | 1.111 | 0.481 |
| | IPF[2] | 271.2 | 21.0 | 23.1 | 1.102 | 1.683 |
| Gender | Female | 268.6 | 20.7 | 23.0 | 1.109 | 1.442 |
| | Male | 273.5 | 21.2 | 23.4 | 1.105 | 0.721 |
| SEM | | 2.48 | 0.225 | 0.182 | 0.005 | 0.590 |
| P-value, diet | | 0.939 | 0.960 | 0.489 | 0.246 | 0.169 |

TABLE 18-continued effect of diet and gender on broiler growth performance measures, by phase, factorial
analysis[1] of main and interaction effects.

| | | BW (g/bird) | ADG (g/bird) | ADFI (g/bird) | FCR (g/g) | Mortality (%) |
|---|---|---|---|---|---|---|
| P-value, gender | | 0.173 | 0.155 | 0.111 | 0.552 | 0.401 |
| P-value diet x gender interaction | | 0.895 | 0.932 | 0.904 | 0.687 | 0.778 |
| Grower (d 11 to 22) | | | | | | |
| Diet | PC | | $58.1^b$ | $78.7^b$ | $1.356^a$ | |
| | IPF | | $61.6^a$ | $82.3^a$ | $1.336^b$ | |
| Gender | Female | | $56.6^b$ | $76.8^b$ | $1.357^a$ | |
| | Male | | $63.1^a$ | $84.2^a$ | $1.335^b$ | |
| SEM | | | 0.442 | 0.644 | 0.003 | |
| P-value, diet | | | <0.001 | <0.001 | <0.001 | |
| P-value, gender | | | <0.001 | <0.001 | <0.001 | |
| P-value, diet x gender interaction | | | 0.851 | 0.542 | 0.041 | |
| Finisher 1 (d 22 to 35) | | | | | | |
| Diet | PC | | $94.7^b$ | 148.0 | 1.563 | |
| | IPF | | $97.3^a$ | 150.6 | 1.549 | |
| Gender | Female | | $87.9^b$ | $137.7^b$ | $1.567^a$ | |
| | Male | | $104.2^a$ | $160.9^a$ | $1.545^b$ | |
| SEM | | | 0.633 | 1.149 | 0.008 | |
| P-value, diet | | | 0.008 | 0.118 | 0.199 | |
| P•-value, gender | | | <0.001 | <0.001 | 0.050 | |
| P-value, diet x gender interaction | | | 0.754 | 0.641 | 0.302 | |
| Finisher 2 (d 35 to 42) | | | | | | |
| Diet | PC | | $80.5^b$ | 187.0 | 2.327 | |
| | IPF | | $85.5^a$ | 188.6 | 2.213 | |
| Gender | Female | | $76.6^b$ | $171.6^b$ | 2.244 | |
| | Male | | $89.4^a$ | $204.1^a$ | 2.296 | |
| SEM | | | 1.661 | 1.474 | 0.042 | |
| P-value, diet | | | 0.044 | 0.456 | 0.072 | |
| P-value, gender | | | <0.001 | <0.001 | 0.393 | |
| P-value, diet x gender interaction | | | 0.489 | 0.123 | 0.166 | |

[1]The factorial analysis was a 2 × 2 factorial Analysis of Variance (ANOVA) with 2 diets and 2 genders. All growth performance parameters (ADG, ADFI and FCR) are corrected for mortality.
[2]IPF, inorganic phosphate-free.

On a cumulative basis, compared to PC, treatment IPF improved BW, ADG, ADFI and PCR, during each of d 0 to 22 and d 0 to 35 (P<0.05 in all cases) (Table 19). For the overall period (d 0 to 42), IPF improved d 42 BW by 3.97% (P<0.01), ADG by 4.10% (P<0.01), ADFI by 1.94% (P=0.05) and reduced FCRc, by 6 points vs. PC (P<0.001) (Table 19).

TABLE 19 effect of diet and gender on broiler growth performance measures, cumulative;
factorial analysis[1] of main and interaction effects

| | | BW (g/bird) | ADG (g/bird) | ADFI (g/bird) | FCR (g/g) | Mortality (%) | FCRc[2] (g/g) | EPEF[3] | BW, % of breeder's objective[4] | FCR, % of breeder's objective[5] |
|---|---|---|---|---|---|---|---|---|---|---|
| d 0 to 22 | | | d 21 | | | | | | | |
| Diet | PC | $909.5^b$ | $39.5^b$ | $50.9^b$ | $1.289^a$ | 0.801 | | | | |
| | IPF[5] | $947.2^a$ | $41.2^a$ | $52.5^a$ | $1.274^b$ | 2.083 | | | | |
| Gender | Female | $891.3^b$ | $38.7^b$ | $49.8^b$ | $1.288^a$ | 1.763 | | | | |
| | Male | $965.4^a$ | $42.1^a$ | $53.6^a$ | $1.274^b$ | 1.123 | | | | |
| SEM | | 6.49 | 0.294 | 0.381 | 0.002 | 0.590 | | | | |
| P-••value diet | | 0.001 | 0.001 | 0.009 | <0.001 | 0.144 | | | | |
| P-value, gender | | <0.001 | <0.001 | <0.001 | <0.001 | 0.455 | | | | |
| P-value diet x gender interaction | | 0.991 | 0.996 | 0.444 | 0.002 | 0.707 | | | | |
| d 0 to 35 | | | d 35 | | | | | | d 35 | d 35 |
| Diet | PC | $2,140.5^b$ | $60.0^b$ | $86.7^b$ | $1.445^a$ | 1.282 | | | 99.84 | 106.65 |
| | IPF | $2,212.5^a$ | $62.1^a$ | $88.7^a$ | $1.430^b$ | 2.404 | | | 103.19 | 107.62 |
| Gender | Female | $2,033.3^b$ | $56.9^b$ | $82.2^b$ | $1.444^a$ | 2.083 | | | | |
| | Male | $2,319.6^a$ | $65.1^a$ | $93.2^a$ | $1.431^b$ | 1.603 | | | | |
| SEM | | 13.5 | 0.38 | 0.53 | 0.004 | 0.682 | | | | |
| P-value, diet | | 0.001 | 0.001 | 0.037 | 0.016 | 0.258 | | | | |
| P-value, gender | | <0.001 | <0.001 | <0.001 | 0.041 | 0.624 | | | | |
| P-value, diet x gender interaction | | 0.844 | 0.846 | 0.553 | 0.098 | 0.624 | | | | |

US 12,588,691 B2

73 74

TABLE 19-continued effect of diet and gender on broiler growth performance measures, cumulative;
factorial analysis[1] of main and interaction effects

| | | BW (g/bird) | ADG (g/bird) | ADFI (g/bird) | FCR (g/g) | Mortality (%) | FCRc[2] (g/g) | EPEF[3] | BW, % of breeder's objective[4] | FCR, % of breeder's objective[5] |
|---|---|---|---|---|---|---|---|---|---|---|
| d 0 to 42 | | d 42 | | | | | | | d 42 | d 42 |
| Diet | PC | 2,704.0$^b$ | 63.4$^b$ | 103.0 | 1.623$^a$ | 2.404 | 1.623$^a$ | 381.0$^b$ | 96.26 | 103.79 |
| | IPF | 2,811.3$^a$ | 66.0$^a$ | 105.0 | 1.593$^b$ | 3.526 | 1.561$^b$ | 399.6$^a$ | 100.08 | 105.57 |
| Gender | Female | 2,569.7$^b$ | 60.2$^b$ | 96.9$^b$ | 1.609 | 2.404 | 1.623$^a$ | 365.2$^b$ | | |
| | Male | 2,945.7$^a$ | 69.2$^a$ | 111.1$^a$ | 1.607 | 3.526 | 1.561$^b$ | 415.5$^a$ | | |
| SEM | | 20.6 | 0.491 | 0.697 | 0.006 | 0.859 | 0.009 | 4.230 | | |
| P-value, diet | | 0.002 | 0.002 | 0.052 | 0.002 | 0.367 | <0.001 | 0.006 | | |
| P-value, gender | | <0.001 | <0.001 | <0.001 | 0.739 | 0.367 | <0.001 | <0.001 | | |
| P-value, diet x gender interaction | | 0.603 | 0.604 | 0.393 | 0.025 | 0.896 | <0.001 | 0.275 | | |

[1]The factorial analysis was a 2 × 2 factorial Analysis of Variance (ANOVA) with 2 diets and 2 genders. All growth performance parameters (ADG, ADFI and FCR) are corrected for mortality
[2]FCRc: body weight corrected FCR, calculated by correction of FCR values by 3 points per 100 g of BW difference from the PC
[3]EPEF, European Performance Efficiency Factor (Aviagen, 2018) = ADG (g) × (100 − mortality (%))/(10 × FCR).
[4]Breeder's objective: Ross 308-Ross 308 FF Broiler Performance Objectives; Aviagen. 2019.
[5]IPF, inorganic phosphate-free.

Independent of treatment, male birds consistently exhibited higher BW, ADG, ADFI and lower FCR than female birds during the majority of individual growth phases (Table 18), and cumulatively (Table 19) (P<0.05). The exceptions to this general trend included d 0 to 11, during which there were no differences in growth performance outcome measures between male and female birds, and d 35 to 42 and overall (d 0 to 42) during which FCR was equivalent in males and females but BW, ADG and ADFI were higher in males. The gender differences were greatest during d 22 to 35 (male vs. female ADG: +18.54% (P<0.001); ADFI: +16.85% (P<0.001), FCR: −2.2 points (P=0.05)).

There was an interaction between gender and dietary treatment on FCR during d 11 to 22 (P<0.05), d 0 to 22 (P<0.01) and d 0 to 42 (P<0.05), and on FCRc for the overall period (d 0 to 42) (P<0.001). The nature of these interactions was such that the beneficial effect of the IPF diet in reducing FCR (vs. PC) was greater in males than in females (effect size difference 1.9 FCR points during d 0 to 22 and 4.0 FCR points during d 0 to 42) (FIG. 1A and FIG. 1B).

Mortality levels were at or below 3% across treatments and growth phases. There was no difference in the level of mortality by gender or by treatment during any phase (Table 18 and Table 19).

The uniformity of bird BW among birds within a pen (based on individual bird weights) by diet and by gender is presented in Table 20. Body weight CVs were consistently 12% or lower on each of d 11, 22 and 42. There were no main or interactive effects of treatment diet or gender on BW CV values, except on d 22 where there was a tendency (P<0.10) for a lower CV of BW in the IPF treatment vs. PC, and at d 42 the CV of BW was higher in males than females (P<0.05) (Table 20).

TABLE 20 uniformity (the coefficient of variation (CV))
of bird BW by diet and gender[1].

| | | d 11 | d 22 | d 42 |
|---|---|---|---|---|
| Diet | PC | 11.59 | 12.58 | 10.66 |
| | IPF[2] | 11.93 | 11.30 | 9.81 |
| Gender | Female | 11.66 | 11.79 | 9.42$^b$ |
| | Male | 11.86 | 12.10 | 11.05$^a$ |
| SEM | | 0.506 | 0.515 | 0.424 |
| P-value, diet | | 0.637 | 0.095 | 0.171 |

TABLE 20-continued uniformity (the coefficient of variation (CV))
of bird BW by diet and gender[1].

| | d 11 | d 22 | d 42 |
|---|---|---|---|
| P-value, gender | 0.788 | 0.680 | 0.013 |
| P-value, diet × gender interaction | 0.61 | 0.551 | 0.764 |

[1]Birds were weighed individually, and coefficient of variation was then calculated on a per pen basis.
[2]IPF, inorganic phosphate-free
CV, coefficient of variation = standard deviation/mean Tibia Ash and Breaking Strength: Tibia ash content at all time points (d 11, d 22 and d 42), was maintained in the IPF treatment equivalent to the PC and did not differ between males and females (Table 21).

TABLE 21 effect of PhyG in combination with xylanase
on tibia ash (% DM) at d 11, 22 and 42;
factorial analysis[1] of main and interactive effects.

| | | d 10 | d 12 | d 42 |
|---|---|---|---|---|
| Diet | PC | 48.2 | 49.4 | 43.2 |
| | IPF | 47.8 | 49.6 | 42.4 |
| Gender | Female | 48.2 | 49.4 | 43.1 |
| | Male | 47.9 | 49.6 | 42.5 |
| SEM | | 0.43 | 0.50 | 0.59 |
| P-value, diet | | 0.528 | 0.837 | 0.338 |
| P-value, gender | | 0.634 | 0.751 | 0.425 |
| P-value, diet × gender interaction | | 0.910 | 0.402 | 0.352 |

[1]The factorial analysis was a 2 × 2 factorial Analysis of Variance (ANOVA) with 2 diets and 2 genders.
IPF, inorganic phosphate-free.

In summary, addition of PhyG at the specified dosing-regime to the Pi-free, Ca-reduced diets (treatment IPF) produced growth performance measures that were equivalent to (or improved compared with) those of the PC, during all growth phases. Bone mineralization (measured by tibia ash content) was also maintained equivalent to PC. These results are complementary to those of the previous Examples in which PhyG and xylanase in combination similarly maintained or improved growth performance during all phases in Pi-free diets compared to a positive control without exogenous enzymes and provide further evidence of the efficacy of PhyG in Pi-free diets. In addition, the results provide more robust evidence of the beneficial effect of the PhyG separate to that of xylanase in the tested setting.

The d 35 and d 42 BW and FCR of birds receiving the IPF treatment were improved compared to PC, and consistently met or exceeded breeder recommendations. In the IPF treatment, BW was 103.1% (d 35) and 100.1% (d 42) of the breeder's objective, and FCR was 107.6% (d 35) or 105.6% (d 42), of the breeder's objective. In addition, the calculated European Production Efficiency Factor (EPEF; Aviagen, 2019. Ross 308/Ross 308 FF Broiler: Performance Objectives. Accessed 3 Sep. 2020), a measure of production efficiency that is based on d 0 to 42 ADG, mortality and FCR was higher for birds who received the IPF treatment compared to PC (+4.9%). Based on the measured feed intake in each phase and feed cost (including enzyme cost) calculated based on market prices for feed ingredients in 2020, it was possible to estimate the total feed cost per kilogram body weight gain (BWG) for each diet. The calculated cost was 0.416 €/kg BWG for the PC diet and 0.405 €/kg BWG for the IPF diet. On this basis, the PhyG supplemented diet represents a significant (P<0.001) feed cost saving to producers.

Without being bound to theory, the observed improvements in ADG and FCR of birds in the IPF treatment beyond the level of the PC during d 11 to 22, d 0 to 22, d 0 to 35 and d 0 to 42, and improvement in d 21, d 35 and d 42 BW, whilst tibia ash was maintained equivalent to PC, are suggestive of an "extra-phosphoric" effect of PhyG in this study, i.e. a beneficial effect on the digestion and/or retention of nutrients other than P that positively impacted on growth performance. A similar effect was observed by Marchal et al. (Poultry Science Association 109th Annual Meeting. 2020 (Abstr. 153)) for BW and FCR during d 0 to 21 with IPF diets containing PhyG dosed at 3,000 FTU/kg during starter phase, 2,000 FTU/kg during grower phase, and 1,000 FTU/kg in finisher phases (data from two trials analyzed together). Dersjant-Li et al. (Poultry Science Association 109th Annual Meeting. 2020 (Abstr. 149)) further confirmed an extra-phosphoric effect of PhyG at 1,000 FTU/kg in Pi-free broiler diets, citing improvements in AID of DM, N, GE and AA in male broilers at 15 days of age (Dersjant-Li et al., Poultry Science Association 109th Annual Meeting. 2020 (Abstr. 149)). Without being bound to theory, it is possible that the high dose-levels of PhyG utilized in the present study in starter (3,000 FTU/kg) and grower phase (2,000 FTU/kg), when bird growth rate is high, coupled with sufficient available substrate provided by the phytate content of these diets, enabled the birds to derive greater benefit from the presence of the phytase during these early growth phases.

In conclusion, a novel consensus bacterial 6-phytase variant PhyG added at decreasing dose-level by phase to complex diets containing xylanase, without added inorganic P, maintained or improved broiler growth performance equivalent to a nutritionally adequate control diet, during all growth phases. Tibia ash was also maintained equivalent to the control diet. These findings add to existing evidence on the efficacy of PhyG as a total replacement for Pi in broiler diets containing xylanase and confirm the suitability of the employed graded PhyG dose-levels and dietary phytate-P contents, by phase, in the tested dietary setting.

Example 4: Effect of a Novel Consensus Bacterial 6-Phytase Variant (PhyG) on Broiler Growth Performance and Bone Mineralization was Evaluated in Diets with or without Xylanase This Example shows the effect of a novel consensus bacterial 6-phytase variant (PHY-13885, "PhyG") on broiler growth performance and bone mineralization evaluated in diets with or without xylanase.

Materials and Methods

Birds and housing: All animal care procedures were approved by the Institutional Animal Ethics Committee of Schothorst Feed Research.

A total of 26,240 Ross 308 one-day-old broilers (mixed male and female) were obtained from a commercial hatchery and assigned to four dietary treatments across 32 floor pens with 820 birds/pen and 8 pens/treatment. Pens contained fresh wood shavings and were located in broiler houses in which ambient temperature was maintained initially at 34.5° C. decreasing to 20° C. at 37 days-old, under a light-dark cycle of 24:0 h for the first 24 h followed by 22 L: 2D h thereafter. From day 3 onwards the light-dark cycle was 8 L: 4D: 10 L: 2D. Birds were given ad libitum access to water and to diets during the trial.

Dietary treatments: Four dietary treatments were tested in a 2×2 factorial arrangement with 2 levels of xylanase and 2 levels of phytase including: 1) a positive control (PC1) based on mixed grains and oilseeds meal, containing inorganic phosphate (Pi) from monocalcium phosphate (MCP), 2) PC1 supplemented with 2,000 XU/kg xylanase and with reduction of 75 kcal/kg ME (PC2), 3) and 4) the PC1 and PC2 respectively reformulated as inorganic phosphate free (IPF) and with reduction in Ca (−0.15 percentage points), supplemented with PhyG at 3,000 FTU/kg in starter (1-10d, 0.33% phytate-P), 2000 FTU/kg in grower (10-22d, 0.31% phytate-P), and 1000 FTU/kg in finisher (22-37d, 0.26% phytate-P) (IPF1 and IPF2). The detailed composition of the diets is given in Table 22. The starter diet was fed as crumbles and the grower and finisher diets were fed as a standard pellet (3.0 mm).

TABLE 22

| | feed formulation of test diets (as is) and calculated nutrients | | | | | | | | | | | |
| | Starter diets (0-10 d) | | | | Grower diets (10-22 d) | | | | Finisher diets (22-37 d) | | | |
| Trt codes | PC1 | PC2 | IPF1 | IPF2 | PC1 | PC2 | IPF1 | IPF2 | PC1 | PC2 | IPF1 | IPF2 |
|---|---|---|---|---|---|---|---|---|---|---|---|---|
| Phytase | 0 | 0 | 3000 | 3000 | 0 | 0 | 2000 | 2000 | 0 | 0 | 1000 | 1000 |
| Xylanase | 0 | 2000 | 0 | 2000 | 0• | 2000 | 0 | 2000 | 0 | 2000 | 0 | 2000 |
| WHEAT | 20.0 | 20.0 | 20.0 | 20.0 | 25.0 | 25.0 | 25.0 | 25.0 | 25.0 | 25.0 | 25.0 | 25.0 |
| CORN | 30.8 | 30.8 | 30.8 | 30.8 | 30.3 | 30.3 | 30.3 | 30.3 | 39.9 | 39.9 | 39.9 | 39.9 |
| SOYBEAN MEAL (>48% CP) | 24.6 | 24.6 | 24.6 | 24.6 | 22.7 | 22.7 | 22.7 | 22.7 | 22.0 | 22.0 | 22.0 | 22.0 |
| SUNFLOWER MEAL (37% CP) | 11.5 | 11.5 | 11.5 | 11.5 | 9.0 | 9.0 | 9.0 | 9.0 | 4.2 | 4.2 | 4.2 | 4.2 |

TABLE 22-continued feed formulation of test diets (as is) and calculated nutrients

| Trt codes | Starter diets (0-10 d) | | | | Grower diets (10-22 d) | | | | Finisher diets (22-37 d) | | | |
|---|---|---|---|---|---|---|---|---|---|---|---|---|
| | PC1 | PC2 | IPF1 | IPF2 | PC1 | PC2 | IPF1 | IPF2 | PC1 | PC2 | IPF1 | IPF2 |
| WHEAT MIDDLINGS | 3.5 | 3.5 | 3.5 | 3.5 | 3.5 | 3.5 | 3.5 | 3.5 | 1.0 | 1.0 | 1.0 | 1.0 |
| OAT HULLS | 0.5 | 0.5 | 0.5 | 0.5 | 0.5 | 0.5 | 0.5 | 0.5 | 0.5 | 0.5 | 0.5 | 0.5 |
| SALT | 0.3 | 0.3 | 0.3 | 0.3 | 0.3 | 0.3 | 0.3 | 0.3 | 0.2 | 0.2 | 0.2 | 0.2 |
| LYSINE HCL (79%) | 0.4 | 0.4 | 0.4 | 0.4 | 0.4 | 0.4 | 0.4 | 0.4 | 0.3 | 0.3 | 0.3 | 0.3 |
| METHIONINE L/DL (99%) | 0.3 | 0.3 | 0.3 | 0.3 | 0.3 | 0.3 | 0.3 | 0.3 | 0.2 | 0.2 | 0.2 | 0.2 |
| THREONINE L (98%) | 0.1 | 0.1 | 0.1 | 0.1 | 0.1 | 0.1 | 0.1 | 0.1 | 0.1 | 0.1 | 0.1 | 0.1 |
| VALINE L (99%) | 0.1 | 0.1 | 0.1 | 0.1 | 0.1 | 0.1 | 0.1 | 0.1 | 0.1 | 0.1 | 0.1 | 0.1 |
| PALM OIL | — | — | — | — | 0.2 | 0.2 | 0.2 | 0.2 | | | | |
| SODIUM BICARBONATE | 0.1 | 0.1 | 0.1 | 0.1 | 0.1 | 0.1 | 0.1 | 0.1 | 0.2 | 0.2 | 0.2 | 0.2 |
| Vit & min premix* | 0.5 | 0.5 | 0.5 | 0.5 | 0.5 | 0.5 | 0.5 | 0.5 | 0.4 | 0.4 | 0.4 | 0.4 |
| SOYBEAN OIL | 4.4 | 3.5 | 4.4 | 3.5 | 4.5 | 3.6 | 4.5 | 3.6 | 3.5 | 2.6 | 6.5 | 2.6 |
| MONOCALCIUM PHOSPHATE | 1.2 | 1.2 | 0.0 | 0.0 | 0.8 | 0.8 | 0.0 | 0.0 | 0.7 | 0.7 | 0.0 | 0.0 |
| LIMESTONE | 1.2 | 1.2 | 1.4 | 1.4 | 1.2 | 1.2 | 1.2 | 1.2 | 1.1 | 1.1 | 1.1 | 1.1 |
| Filler (soy hulls and test product) | 0.0 | 0.9 | 1.1 | 2.0 | 0.0 | 0.9 | 0.9 | 1.8 | 0.0 | 0.9 | 0.8 | 1.7 |
| Premix Sacox ** | 0.6 | 0.6 | 0.6 | 0.6 | 0.6 | 0.6 | 0.6 | 0.6 | 0.6 | 0.6 | 0.6 | 0.6 |
| sum | 100.0 | 100.0 | 100.0 | 100.0 | 100.0 | 100.0 | 100.0 | 100.0 | 100.0 | 100.0 | 103.0 | 100.0 |
| Feed cost €/ton | 277.9 | 272.0 | 276.3 | 270.4 | 273.1 | 267.2 | 271.9 | 266.0 | 262.3 | 256.4 | 260.3 | 254.5 |
| Calculated nutrients in g/kg | | | | | | | | | | | | |
| ME-Broiler (kcal/kg) | 2800 | 2725 | 2800 | 2725 | 2875 | 2800 | 2875 | 2800 | 2950 | 2875 | 2950 | 2875 |
| CProtein | 220 | 220 | 220 | 220 | 206 | 206 | 206 | 206 | 187 | 187 | 187 | 187 |
| CFat (AH) | 72 | 63 | 72 | 63 | 74 | 65 | 74 | 65 | 64 | 55 | 64 | 55 |
| Ca | 8.00 | 8.00 | 6.50 | 6.50 | 7.20 | 7.20 | 5.70 | 5.70 | 6.50 | 6.50 | 5.00 | 5.00 |
| P | 7.17 | 7.17 | 4.49 | 4.49 | 6.05 | 6.05 | 4.22 | 4.22 | 5.16 | 5.16 | 3.61 | 3.61 |
| ret P-p | 3.80 | 3.80 | 1.52 | 1.52 | 3.00 | 3.00 | 1.44 | 1.44 | 2.60 | 2.60 | 1.28 | 1.28 |
| Phytate-P, g/kg | 3.30 | 3.30 | 3.30 | 3.30 | 3.10 | 3.10 | 3.10 | 3.10 | 2.6 | 2.6 | 2.6 | 2.6 |
| Dig LYS | 11.8 | 11.8 | 11.8 | 11.8 | 11.0 | 11.0 | 11.0 | 11.0 | 10.00 | 10.00 | 10.00 | 10.00 |
| Dig M + C | 8.7 | 8.7 | 8.7 | 8.7 | 8.0 | 8.0 | 80 | 8.0 | 7.30 | 7.30 | 7.31 | 7.31 |
| Dig THR | 7.7 | 7.7 | 7.7 | 7.7 | 7.2 | 7.2 | 7.2 | 7.2 | 6.50 | 6.50 | 6.50 | 6.50 |
| Dig TRP | 2.3 | 2.3 | 2.3 | 2.3 | 2.1 | 2.1 | 2.1 | 2.1 | 1.89 | 1.89 | 1.89 | 1.89 |
| Dig VAL | 9.4 | 94 | 9.5 | 9.5 | 8.8 | 8.8 | 8.8 | 8.8 | 8.00 | 8.00 | 8.00 | 8.00 |
| Dig ARG | 13.1 | 13.1 | 13.1 | 131 | 12.0 | 12.0 | 12.0 | 12.0 | 10.59 | 10.59 | 10.59 | 10.59 |
| Dig ILE | 7.8 | 7.8 | 7.8 | 7.8 | 7.3 | 7.3 | 7.3 | 7.3 | 6.60 | 6.60 | 6.60 | 6.60 |

*Vitamin and mineral premix supplied per kg diet (based on a 0.5% dose): Vitamin A 10,000 IU; vitamin D3 3,333 IU; vitamin E 50 mg, vitamin K3 2.5 mg; vitamin B1 2.5 mg, vitamin B2 7.5 mg; vitamin B6 5 mg; vitamin B12 25 mcg; Niacin 50 mg; D-pantothenic acid 15 mg; Choline chloride 500 mg; Folic acid 1.5 mg; Biotin 0.25 mg; Fe 50 mg (as $FeSO_4 \cdot H_2O$); Cu 12.5 mg (as $CuSO_4 \cdot 5H_2O$); Mn 75 mg (as MnO); Zn 70 mg (as $ZnSO_4 \cdot H_2O$); I 2 mg (as $Ca(IO_3)_2$); Se 0.25 mg (as $Na_2SeO_3$); antioxidants (Luctanox EF 5 mg; BHT 2.01 mg, propyl gallate 0.17 mg).
** Premix Sacox contained 12,000 mg salinomycin sodium (Huvepharma NV), delivering 70 ppm in finished feed with a 0.582% inclusion rate.

Sampling and measurements: Body weight (BW) was measured on arrival at the experimental farm (day 0) with approximate 180 birds selected at random. At day 10 and 22, BW was monitored per pen by automatic weighing scale. At day 37 all birds were weighed per pen manually since automatic weighing plateaus are not accurate for measuring BW of late-grower and finisher stage birds. Feed intake was recorded at the end of each period on a per pen basis and used to calculate FCR, corrected for mortality. On day 21 and 36, the left tibia bones of 4 male birds per pen were extracted and pooled for the determination of de-fatted tibia ash content. Adjacent tissue was removed by autoclaving the bones; tibias were dried overnight initially at 40° C. and subsequently at 70° C. Fat was extracted using 100% petroleum ether according to modified methods of Watson et al. (2006). Fat-extracted-tibias were dried for 4 h at 103° C. and ashed in a muffle furnace for 24 h at 700° C. to determine bone ash content (data to be reported). Tibia and humerus breaking strength was analyzed according to a three-point bending setup. Four hours prior to analysis the bones were removed from the freezer and they were gradually conditioned to 20° C. Width and thickness of each bone were measured. The bone was then positioned onto two supports. The distance between the supports was 40 mm for tibias that were collected on D21, 45 mm for tibias that were collected on D36, and 40 mm for humeri that were collected on D36. An increasing force was applied onto the middle of the tibia until it finally fractured. The flexural strength was measured in terms of stress (unit: MPa). The stress was calculated as (3*applied force at fracture*support length)/(2*width*thickness²)). Force was expressed in Newton; support length, width, and thickness were expressed in mm. The measurement was done according to ISO178 (determination of flexural properties of rigid plastics).

Chemical analysis: Representative samples of all treatment diets were analysed for dry matter (DM), crude protein (CP), crude fat, crude fibre, Ca, P, phytate-P and phytase. Nutritional analyses were performed by Schothorst Feed Research (Lelystad, The Netherlands).

Samples were analysed in duplicate for all analyses. Nutrients were analysed according to the following methods: moisture, NEN-ISO 6496 (1999); crude protein, NEN-EN-ISO 16634 (2008); crude fat, NEN-ISO 6492 (1999); crude fibre, NEN-ISO 6865 (2001); starch, NEN-ISO 15914 (2005); phosphorus, NEN-ISO 6491 (1999); calcium, NEN-EN-ISO 6869 (2001) and; ash, NEN-ISO 5984 (2003). Phytate phosphorus (PP [inositol hexa-phosphate (IP6)]) concentrations in diets and phytase activities in the diets were determined by DuPont Laboratories (Brabrand, Denmark), using the methods described by Yu et al. (2012). One phytase unit (FTU) was defined as the amount of enzyme that released 1 μmol of inorganic orthophosphate from a sodium phytate substrate per minute at pH 5.5 and 37° C. (AOAC, 2000).

Statistical analyses: Data were analysed based on pen as the experimental unit and analysed using JMP14. Data were analysed by 2-way ANOVA as a 2×2 factorial arrangement with 2 levels of xylanase and 2 levels of phytase and block as a random effect. The following model was used:

$$Yij=\mu+Blocki+Phytasej+Xylanasek+(Phytase\times Xylanase)jk+eijk,$$

in which: Yij=dependent variable; μ=overall mean; Blocki=effect of replicate (i=1 . . . 8); Phytasej=effect of PhyG (j=1,2); Xylanasek=effect of xylanase (k=1,2) (Phytase×Xylanase)jk=effect of interaction between PhyG and xylanase, and; eijk=residual error.

Differences between treatments were identified based on Tukey test, with significant at P<0.05 and P<0.1 was considered a tendency.

Results

There was no phytase×xylanase interaction for any of the growth performance and bone parameters (Table 23 and Table 24). The IPF treatments maintained final body weight compared to respective control group in each phase and overall 0-37 days. Factorial analysis showed phytase reduced feed intake (P<0.05) at 10 to 22 and 22 to 37 days and the cumulative 0 to 22 and 0 to 37 days. Similarly, water intake was decreased (P<0.05) by phytase supplementation at 10 to 22 and 22 to 37 days and the cumulative 0 to 37 days. Feed conversion ratio was improved (P<0.05) by phytase supplementation at 22 to 37 days and the cumulative 0 to 37 days. Feed cost per kg body weight gain was decreased (P<0.05) by phytase and xylanase supplementation at the cumulative 0 to 37 days of age.

TABLE 23 effect of total replacement of inorganic P by phytase and xylanase on dietary phase-specific and cumulative growth performance, 0-37 days of age Phase specific data

|  | Phytase | Xylanase | BW, g (d 10) | BWG, g | FI, g | FCR | WI, ml | WF, ml/g |
|---|---|---|---|---|---|---|---|---|
| | | d 0-10 | | | | | | |
| PC1 | no | no | 272.25 | 230.35 | 281.62 | 1.224 | 583.46 | 2.079 |
| PC2 | no | yes | 279.13 | 237.23 | 288.31 | 1.217 | 600.37 | 2.083 |
| IPF1 | yes | no | 275.50 | 233.60 | 284.78 | 1.220 | 591.64 | 2.078 |
| IPF2 | yes | yes | 277.50 | 235.60 | 283.41 | 1.205 | 606.89 | 2.143 |
| | Pooled SEM | | 3.458 | 3.458 | 3.915 | 0.020 | 10.147 | 0.042 |
| | no | | 275.69 | 233.79 | 284.96 | 1.220 | 591.91 | 2.081 |
| | yes | | 276.50 | 234.60 | 284.10 | 1.212 | 599.27 | 2.110 |
| | | no | 273.88 | 231.98 | 283.20 | 1.222 | 587.55 | 2.078 |
| | | yes | 278.31 | 236.41 | 285.86 | 1.211 | 603.63 | 2.113 |
| | Pooled SEM | | 2.445 | 2.445 | 2.768 | 0.014 | 7.175 | 0.030 |
| | Phytase main effect | | 0.816 | 0.816 | 0.826 | 0.692 | 0.475 | 0.489 |
| | Xylanase main effect | | 0.210 | 0.210 | 0.502 | 0.582 | 0.124 | 0.419 |
| | Phytase x Xylanase interaction | | 0.487 | 0.487 | 0.313 | 0.857 | 0.936 | 0.478 |

| | | d 10-22 | BW, g (d 22) | BWG, g | FI, g | FCR | WI, ml | WF, ml/g |
|---|---|---|---|---|---|---|---|---|
| PC1 | no | no | 1023.8 | 751.50 | 952.17 | 1.270 | 1922.5 | 2.022 |
| PC2 | no | yes | 1041.6 | 762.50 | 974.14 | 1.278 | 2004.2 | 2.059 |
| IPF1 | yes | no | 1023.8 | 748.25 | 942.24 | 1.260 | 1895.6 | 2.011 |
| IPF2 | yes | yes | 1009.1 | 731.63 | 931.24 | 1.273 | 1889.3 | 2.027 |
| | Pooled SEM | | 11.766 | 11.820 | 12.262 | 0.016 | 33.724 | 0.031 |
| | no | | 1032.7 | 757.00 | 963.16[a] | 1.274 | 1963.3[a] | 2.040 |
| | yes | | 1016.4 | 739.94 | 936.74[b] | 1.267 | 1892.5[b] | 2.019 |
| | | no | 1023.8 | 749.88 | 947.20 | 1.265 | 1909.1 | 2.017 |
| | | yes | 1025.4 | 747.06 | 952.69 | 1.276 | 1946.7 | 2.043 |
| | Pooled SEM | | 8.320 | 8.358 | 8.671 | 0.011 | 23.846 | 0.022 |
| | Phytase main effect | | 0.178 | 0.160 | 0.040 | 0.636 | 0.045 | 0.486 |
| | Xylanase main effect | | 0.891 | 0.814 | 0.658 | 0.477 | 0.273 | 0.398 |
| | Phytase x Xylanase interaction | | 0.178 | 0.252 | 0.190 | 0.883 | 0.203 | 0.729 |

| | | d 22-37 | BW, g (d 37) | BWG, g | FI, g | FCR | WI, ml | WF, ml/g |
|---|---|---|---|---|---|---|---|---|
| PC1 | no | no | 2297.4 | 1273.7 | 2025.0 | 1.592 | 3748.9 | 1.853 |
| PC2 | no | yes | 2306.6 | 1265.0 | 2042.1 | 1.615 | 3756.3 | 1.839 |

TABLE 23-continued

| | | | | | | | | |
|---|---|---|---|---|---|---|---|---|
| IPF1 | yes | no | 2298.0 | 1274.2 | 1984.4 | 1.558 | 3543.7 | 1.785 |
| IPF2 | yes | yes | 2284.4 | 1275.3 | 1952.3 | 1.534 | 3626.1 | 1.860 |
| | Pooled SEM | | 20.732 | 18.825 | 22.289 | 0.021 | 71.360 | 0.033 |
| | no | | 2302.0 | 1269.3 | 2033.6[a] | 1.603[a] | 3752.6[a] | 1.846 |
| | yes | | 2291.2 | 1274.8 | 1968.3[b] | 1.546[b] | 3584.9[b] | 1.822 |
| | | no | 2297.7 | 1273.9 | 2004.7 | 1.575 | 3646.3 | 1.819 |
| | | yes | 2295.5 | 1270.2 | 1997.2 | 1.574 | 3691.2 | 1.849 |
| | Pooled SEM | | 14.659 | 13.311 | 15.761 | 0.015 | 50.459 | 0.023 |
| | Phytase main effect | | 0.605 | 0.776 | 0.007 | 0.011 | 0.026 | 0.474 |
| | Xylanase main effect | | 0.918 | 0.842 | 0.740 | 0.979 | 0.534 | 0.362 |
| | Phytase x Xylanase interaction | | 0.587 | 0.799 | 0.279 | 0.274 | 0.604 | 0.188 |

Cumulative data

| | PhyG | Xylanase d 0-22 | FI, g | BWG, g | FCR | WI, ml | WF, ml/g |
|---|---|---|---|---|---|---|---|
| PC1 | no | no | 1233.8 | 981.85 | 1.258 | 2506.0 | 2.033 |
| PC2 | no | yes | 1262.4 | 999.73 | 1.263 | 2604.5 | 2.064 |
| IPF1 | yes | no | 1227.0 | 981.85 | 1.250 | 2487.3 | 2.027 |
| IPF2 | yes | yes | 1214.7 | 967.23 | 1.256 | 2496.2 | 2.053 |
| | Pooled SEM | | 12.692 | 11.766 | 0.011 | 40.628 | 0.029 |
| | no | | 1248.1[a] | 990.79 | 1.260 | 2555.2 | 2.048 |
| | yes | | 1220.8[b] | 974.54 | 1.253 | 2491.7 | 2.040 |
| | | no | 1230.4 | 981.85 | 1.254 | 2496.6 | 2.030 |
| | | yes | 1238.6 | 983.48 | 1.260 | 2550.4 | 2.059 |
| | Pooled SEM | | 8.975 | 8.320 | 0.008 | 28.728 | 0.021 |
| | Phytase main effect | | 0.040 | 0.178 | 0.489 | 0.129 | 0.777 |
| | Xylanase main effect | | 0.526 | 0.891 | 0.599 | 0.196 | 0.332 |
| | Phytase x Xylanase interaction | | 0.117 | 0.178 | 0.974 | 0.279 | 0.938 |

| | | d 0-37 | FI, g | BWG, g | FCR | WI, ml | WF, ml/g | MRT, % | Feed cost /kg BWG |
|---|---|---|---|---|---|---|---|---|---|
| PC1 | no | no | 3258.8 | 2255.5 | 1.445 | 6254.8 | 1.921 | 4.722 | 0.361 |
| PC2 | no | yes | 3304.6 | 2264.7 | 1.459 | 6360.9 | 1.925 | 5.057 | 0.356 |
| IPF1 | yes | no | 3211.4 | 2256.1 | 1.423 | 6031.0 | 1.877 | 5.331 | 0.354 |
| IPF2 | yes | yes | 3166.9 | 2242.5 | 1.413 | 6122.3 | 1.934 | 4.891 | 0.343 |
| | Pooled SEM | | 30.823 | 20.732 | 0.011 | 89.821 | 0.026 | 0.421 | 0.003 |
| | no | | 3281.7[a] | 2260.1 | 1.452[a] | 6307.9[a] | 1.923 | 4.889 | 0.359[a] |
| | yes | | 3189.2[b] | 2249.3 | 1.418[b] | 6076.6[b] | 1.906 | 5.111 | 0.348[b] |
| | | no | 3235.1 | 2255.8 | 1.434 | 6142.9 | 1.899 | 5.026 | 0.358[a] |
| | | yes | 3235.8 | 2253.6 | 1.436 | 6241.6 | 1.930 | 4.974 | 0.349[b] |
| | Pooled SEM | | 21.795 | 14.659 | 0.008 | 63.513 | 0.019 | 0.298 | 0.002 |
| | Phytase main effect | | 0.006 | 0.605 | 0.005 | 0.016 | 0.516 | 0.603 | 0.001 |
| | Xylanase main effect | | 0.983 | 0.918 | 0.874 | 0.281 | 0.256 | 0.901 | 0.004 |
| | Phytase x Xylanase interaction | | 0.155 | 0.587 | 0.277 | 0.935 | 0.320 | 0.365 | 0.279 |

TABLE 24 effect of total replacement of inorganic P by phytase and xylanase on bone ash (% DM) and bone strength (MPa)

| | | | Tibia bone ash (% DM) | |
|---|---|---|---|---|
| tr | Phytase | Xylanase | d 21 | d 36 |
| PC1 | no | no | 500.7 | 521.2 |
| PC2 | no | yes | 497.8 | 522.4 |
| IPF1 | yes | no | 495.5 | 520.8 |
| IPF2 | yes | yes | 500.8 | 514.1 |
| SEM | | | 3.7 | 2.7 |
| Main effect phytase | | | | |
| | No | | 499.2 | 521.8 |
| | YES | | 498.2 | 517.5 |

TABLE 24-continued

| Main effect xylanase | | | |
|---|---|---|---|
| | No | 498.1 | 521.0 |
| | YES | 499.3 | 518.3 |
| SEM | | 2.6 | 19 |
| P value phytase | | 0.77 | 0.12 |
| P value xylanase | | 0.75 | 0.32 |
| P interaction | | 0.28 | 0.16 |

| | | | Tibia bone strength (MPa) | | Humerus bone strength (MPa) |
|---|---|---|---|---|---|
| | | | d 21 | d 36 | d 36 |
| PC1 | no | no | 47.4 | 45.4 | 51.8 |
| PC2 | no | yes | 47.2 | 48.2 | 53.4 |
| IPF1 | yes | no | 51.2 | 45.9 | 57.6 |

TABLE 24-continued

| | | | | | |
|---|---|---|---|---|---|
| IPF2 | yes | yes | 49.6 | 46.6 | 49.3 |
| SEM | | | 1.2 | 0.16 | 2.9 |
| main effect phytase | | | | | |
| | No | | 47.3[b] | 46.8 | 52.6 |
| | YES | | 50.4[a] | 46.2 | 53.5 |
| main effect xylanase | | | | | |
| | No | | 49.3 | 45.6 | 54.7 |
| | YES | | 48.4 | 47.4 | 51.4 |
| SEM | | | 0.8 | 0.8 | 2.0 |
| P value phytase | | | 0.011 | 0.624 | 0.765 |

TABLE 24-continued

| | | | |
|---|---|---|---|
| P value xylanase | 0.447 | 0.139 | 0.258 |
| P interaction | 0.546 | 0.376 | 0.097 |

The IPF treatments maintained bone breaking strength at all sampling points. At day 21, tibia bone breaking strength was increased (P=0.011) by phytase supplementation.

Xylanase supplementation was able to compensate the 75 kcal ME reduction and maintained performance compared to controls, in diets with and without phytase.

The data confirmed that phytase alone or in combination with xylanase can totally replace inorganic P in broilers from day 1, as well as maintain or improve the performance and bone breaking strength of broilers under commercial settings.

We claim:

1. A method for improving poultry performance on one or more metrics selected from the group consisting of increased feed efficiency, increased weight gain, reduced feed conversion ratio, improved digestibility of nutrients or energy in a feed, improved nitrogen retention, improved ability to avoid the negative effects of necrotic enteritis, and improved immune response comprising administering an effective amount of a starter, grower, or finisher diet comprising (i) an engineered phytase polypeptide or a fragment thereof comprising phytase activity comprising at least 82% sequence identity with the amino acid sequence set forth in SEQ ID NO:1; and (ii) no inorganic phosphorus to poultry, wherein improved poultry performance is assessed by comparing to performance in poultry that are administered a starter, grower, or finisher diet that does not comprise (i) the engineered phytase polypeptide or a fragment thereof comprising phytase activity comprising at least 82% sequence identity with the amino acid sequence set forth in SEQ ID NO:1; and (ii) inorganic phosphate.

2. The method of claim 1, wherein the poultry is selected from the group consisting of turkeys, ducks, chickens, geese, pheasants, quail, and emus.

3. The method of claim 2, wherein chickens are selected from the group consisting of layers and broilers.

4. The method of claim 1, wherein said phytase polypeptide comprises an amino acid sequence selected from the group consisting of SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID:NO:33, SEQ ID NO:34, SEQ ID NO:35, SEQ ID NO:36, and SEQ ID NO:37.

5. The method of claim 1, further comprising administering one or more of (a) a direct fed microbial comprising at least one bacterial strain, (b) at least one other enzyme other than the engineered phytase polypeptide or fragment thereof, and/or (c) an essential oil.

6. The method of claim 1, wherein the starter, grower, or finisher diet further comprises a feed and the engineered phytase polypeptide or fragment thereof is present in an amount of at least about 0.1 g/ton feed.

7. The method of claim 1, wherein the starter, grower, or finisher diet further comprises digestible lysine.

8. The method of claim 1, wherein the starter, grower, or finisher diet comprises sodium from about 0.13 to 0.17%.

9. The method of claim 6, wherein the feed comprises one or more of corn, wheat, soybean meal, grapeseed, rice and/or wheat bran.

10. The method of claim 1, wherein the starter, grower, or finisher diet further comprises oat hulls.

11. The method of claim 1, wherein the starter, grower, or finisher diet lacks meat and/or bone meal.

12. The method of claim 5, wherein the at least one other enzyme is selected from the group consisting of a xylanase, a protease, an amylase, and a glucoamylase.

13. The method of claim 1, wherein the diet is a starter diet.

14. The method of claim 1, wherein the diet is a grower diet.

15. The method of claim 1, wherein the diet is a finisher diet.

\* \* \* \* \*